US012691375B2

(12) United States Patent
Koriyama et al.

(10) Patent No.: US 12,691,375 B2
(45) Date of Patent: Jul. 28, 2026

(54) GAME CONTROLLER

(71) Applicant: NINTENDO CO., LTD., Kyoto (JP)

(72) Inventors: Kazuhiko Koriyama, Kyoto (JP);
Shinji Hirose, Kyoto (JP); Kazuki Ebihara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 19/384,476

(22) Filed: Nov. 10, 2025

(65) Prior Publication Data

US 2026/0061307 A1      Mar. 5, 2026

Related U.S. Application Data

(63) Continuation of application No. PCT/JP2023/028162, filed on Aug. 1, 2023.

(51) Int. Cl.
*A63F 13/24*          (2014.01)
*A63F 13/23*          (2014.01)

(52) U.S. Cl.
CPC .............. *A63F 13/24* (2014.09); *A63F 13/23* (2014.09)

(58) Field of Classification Search
None
See application file for complete search history.

(56) References Cited

U.S. PATENT DOCUMENTS

| | | |
|---|---|---|
| 3,850,271 A | 11/1974 | Hillmann |
| 5,046,739 A | 9/1991 | Reichow |

| | | |
|---|---|---|
| 5,052,937 A | 10/1991 | Glen |
| 5,276,733 A | 1/1994 | Uno et al. |
| 5,477,415 A | 12/1995 | Mitcham et al. |
| 5,515,174 A | 5/1996 | Abe et al. |
| 5,627,974 A | 5/1997 | Watts et al. |
| 5,657,459 A | 8/1997 | Yanagisawa et al. |
| 5,667,220 A | 9/1997 | Cheng |
| 5,677,827 A | 10/1997 | Yoshioka |

(Continued)

FOREIGN PATENT DOCUMENTS

| | | |
|---|---|---|
| CA | 2746481 | 8/2011 |
| CA | 2775338 | 2/2013 |

(Continued)

OTHER PUBLICATIONS

US 10,226,694 B2, 03/2019, Iwao et al. (withdrawn)

(Continued)

*Primary Examiner* — Jason T Yen
(74) *Attorney, Agent, or Firm* — Nixon & Vanderhye PC

(57) ABSTRACT

A game controller is removably attachable to a main body apparatus including a recess and first and second magnets. The game controller includes a first input portion, a projection, a first button, and a second button. The first input portion is provided on a front surface. The projection projects from a first side surface and extends along a longitudinal direction of the first side surface. The projection is configured to be matched with the recess. The first button and the second button are provided along the longitudinal direction on a top surface of the projection. The first button and the second button are to be pressed down by a user. The first button is to be attracted to the first magnet by magnetic force. The second button is to be attracted to the second magnet by magnetic force.

30 Claims, 48 Drawing Sheets

(56) References Cited

U.S. PATENT DOCUMENTS

| | | | |
|---|---|---|---|
| 5,702,305 | A | 12/1997 | Norman et al. |
| 6,257,984 | B1 | 7/2001 | Gershon |
| 6,512,511 | B2 | 1/2003 | Willner et al. |
| 6,530,570 | B2 | 3/2003 | Ku |
| 6,530,838 | B2 | 3/2003 | Ha |
| 6,580,420 | B1 | 6/2003 | Wang |
| 6,720,949 | B1 | 4/2004 | Pryor et al. |
| 6,788,285 | B2 | 9/2004 | Paolucci et al. |
| 6,795,304 | B1 | 9/2004 | Lam |
| 6,946,988 | B2 | 9/2005 | Edwards et al. |
| 6,989,818 | B2 | 1/2006 | Biheller et al. |
| 7,095,442 | B2 | 8/2006 | Van |
| 7,107,018 | B2 | 9/2006 | Jellicoe |
| 7,402,100 | B2 | 7/2008 | Hammond et al. |
| 7,407,439 | B1 | 8/2008 | Ochoa |
| 7,684,185 | B2 | 3/2010 | Farrugia |
| 7,733,637 | B1 | 6/2010 | Lam |
| 7,833,097 | B1 | 11/2010 | Maddox et al. |
| 8,057,309 | B1 | 11/2011 | Mead et al. |
| 8,087,115 | B2 | 1/2012 | Barber et al. |
| 8,143,848 | B2 | 3/2012 | Navid |
| 8,143,850 | B2 | 3/2012 | Erickson |
| 8,153,881 | B2 | 4/2012 | Coppard et al. |
| 8,298,084 | B2 | 10/2012 | Yee |
| 8,308,563 | B2 | 11/2012 | Ikeda et al. |
| 8,384,565 | B2 | 2/2013 | Urata et al. |
| 8,457,769 | B2 | 6/2013 | Merrill |
| 8,469,815 | B2 | 6/2013 | Hovseth |
| 8,493,326 | B2 | 7/2013 | Martinez et al. |
| 8,497,659 | B2 | 7/2013 | Navid |
| 8,529,357 | B2 | 9/2013 | Joynes et al. |
| 8,602,891 | B2 | 12/2013 | Kondo et al. |
| 8,740,708 | B2 | 6/2014 | Karacal et al. |
| 8,810,536 | B2 | 8/2014 | Mcdermid |
| 8,842,423 | B2 | 9/2014 | Griffin |
| 8,845,425 | B2 | 9/2014 | Nogami et al. |
| 8,858,329 | B2 | 10/2014 | Kim |
| 8,858,335 | B2 | 10/2014 | Helmes et al. |
| 8,882,597 | B2 | 11/2014 | Nicholson |
| 8,905,845 | B2 | 12/2014 | Willis |
| 8,926,414 | B1 | 1/2015 | Kirkpatrick |
| 8,939,838 | B2 | 1/2015 | Alten et al. |
| 8,957,835 | B2 | 2/2015 | Hoellwarth |
| 8,972,617 | B2 | 3/2015 | Hirschman |
| 8,988,869 | B2 | 3/2015 | Ogatsu |
| 9,116,555 | B2 | 8/2015 | Nakayama et al. |
| 9,126,119 | B2 | 9/2015 | Joynes et al. |
| 9,176,538 | B2 | 11/2015 | Boulanger |
| 9,216,349 | B2 | 12/2015 | South |
| 9,407,100 | B2 | 8/2016 | Joynes et al. |
| 9,459,457 | B2 | 10/2016 | Murray et al. |
| 9,529,194 | B2 | 12/2016 | Yoo et al. |
| 9,529,447 | B2 | 12/2016 | Hodges et al. |
| 9,539,507 | B2 | 1/2017 | Schoenith et al. |
| 9,551,873 | B2 | 1/2017 | Zalewski |
| 9,711,980 | B2 | 7/2017 | Hodges et al. |
| 9,724,601 | B2 | 8/2017 | Fujita et al. |
| 9,751,008 | B2 | 9/2017 | Fujita et al. |
| 9,757,647 | B2 | 9/2017 | Fujita et al. |
| 9,776,081 | B2 | 10/2017 | Fujita et al. |
| 9,776,082 | B2 | 10/2017 | Iwao et al. |
| 9,782,671 | B2 | 10/2017 | Fujita et al. |
| 9,914,060 | B1 | 3/2018 | Corigliano |
| 10,010,789 | B2 | 7/2018 | Koizumi et al. |
| 10,092,829 | B2 | 10/2018 | Ikuta et al. |
| 10,118,093 | B2 | 11/2018 | Koizumi et al. |
| 10,198,074 | B2 | 2/2019 | Grant et al. |
| 10,258,879 | B2 | 4/2019 | Iwao et al. |
| 10,328,350 | B2 | 6/2019 | Furuike et al. |
| 10,481,656 | B2 | 11/2019 | Casparian et al. |
| 10,543,423 | B2 | 1/2020 | Koizumi et al. |
| 10,583,356 | B2 | 3/2020 | Koizumi et al. |
| 10,596,454 | B2 | 3/2020 | Ikuta et al. |
| 10,610,776 | B2 | 4/2020 | Iwao et al. |
| 10,661,160 | B2 | 5/2020 | Fujita et al. |
| 10,909,564 | B2 | 2/2021 | Pahls et al. |
| 11,013,991 | B1 | 5/2021 | Seibert |
| 11,045,723 | B1 * | 6/2021 | Lee ........................ A63F 13/23 |
| 11,110,344 | B2 | 9/2021 | Koizumi et al. |
| 11,141,654 | B2 | 10/2021 | Fujita et al. |
| 11,724,178 | B2 | 8/2023 | Fujita et al. |
| 11,951,386 | B2 | 4/2024 | Koizumi et al. |
| 12,059,611 | B2 | 8/2024 | Fujita et al. |
| 2001/0003708 | A1 | 6/2001 | Aizu et al. |
| 2001/0045938 | A1 | 11/2001 | Willner et al. |
| 2002/0061739 | A1 | 5/2002 | Nakamura et al. |
| 2002/0098887 | A1 | 7/2002 | Himoto et al. |
| 2002/0119819 | A1 | 8/2002 | Kunzle et al. |
| 2002/0145590 | A1 | 10/2002 | Paolucci et al. |
| 2002/0155890 | A1 | 10/2002 | Ha et al. |
| 2002/0167696 | A1 | 11/2002 | Edwards et al. |
| 2003/0083130 | A1 | 5/2003 | Toyoshima |
| 2003/0100263 | A1 | 5/2003 | Tanaka et al. |
| 2003/0100340 | A1 | 5/2003 | Cupps et al. |
| 2003/0109314 | A1 | 6/2003 | Ku |
| 2003/0171146 | A1 | 9/2003 | Mayer |
| 2004/0001307 | A1 | 1/2004 | Takakusaki |
| 2004/0082361 | A1 | 4/2004 | Rajagopalan |
| 2004/0090416 | A1 | 5/2004 | Biheller |
| 2004/0263471 | A1 | 12/2004 | Hsieh |
| 2005/0012711 | A1 | 1/2005 | Paolucci et al. |
| 2005/0059438 | A1 | 3/2005 | Jellicoe |
| 2005/0085301 | A1 | 4/2005 | Hammond et al. |
| 2006/0117623 | A1 | 6/2006 | Watanabe |
| 2006/0152484 | A1 | 7/2006 | Rolus |
| 2006/0176277 | A1 | 8/2006 | Daniel et al. |
| 2006/0237209 | A1 | 10/2006 | Horinouchi et al. |
| 2006/0279039 | A1 | 12/2006 | Krieger et al. |
| 2007/0021210 | A1 | 1/2007 | Tachibana |
| 2007/0045392 | A1 | 3/2007 | Youens et al. |
| 2007/0049374 | A1 | 3/2007 | Ikeda et al. |
| 2007/0072680 | A1 | 3/2007 | Ikeda |
| 2007/0111801 | A1 | 5/2007 | Haber et al. |
| 2007/0112989 | A1 | 5/2007 | Iwaki |
| 2007/0131727 | A1 | 6/2007 | Martuccio |
| 2007/0178966 | A1 | 8/2007 | Pohlman et al. |
| 2007/0200727 | A1 | 8/2007 | Sakamoto |
| 2007/0218988 | A1 | 9/2007 | Lucich |
| 2007/0293318 | A1 | 12/2007 | Tetterington et al. |
| 2008/0002350 | A1 | 1/2008 | Farrugia |
| 2008/0015017 | A1 | 1/2008 | Ashida et al. |
| 2008/0064500 | A1 | 3/2008 | Satsukawa |
| 2008/0113798 | A1 | 5/2008 | Miyanaga et al. |
| 2008/0153593 | A1 | 6/2008 | Ikeda et al. |
| 2008/0167740 | A1 | 7/2008 | Merrill |
| 2008/0214305 | A1 | 9/2008 | Addington et al. |
| 2009/0005164 | A1 | 1/2009 | Chang |
| 2009/0036189 | A1 | 2/2009 | Wang |
| 2009/0069096 | A1 | 3/2009 | Nishimoto |
| 2009/0070093 | A1 | 3/2009 | Nakanishi et al. |
| 2009/0072784 | A1 | 3/2009 | Erickson |
| 2009/0079705 | A1 | 3/2009 | Sizelove |
| 2009/0093307 | A1 | 4/2009 | Miyaki |
| 2009/0111508 | A1 | 4/2009 | Yeh et al. |
| 2009/0291760 | A1 | 11/2009 | Hepburn et al. |
| 2009/0312098 | A1 | 12/2009 | Chang |
| 2009/0318227 | A1 | 12/2009 | Nakajima |
| 2010/0007528 | A1 | 1/2010 | Urata et al. |
| 2010/0009754 | A1 | 1/2010 | Shimamura et al. |
| 2010/0064883 | A1 | 3/2010 | Gynes |
| 2010/0118195 | A1 | 5/2010 | Eom et al. |
| 2010/0178981 | A1 | 7/2010 | Holcomb et al. |
| 2010/0195279 | A1 | 8/2010 | Michael |
| 2010/0216547 | A1 | 8/2010 | Coppard et al. |
| 2010/0267454 | A1 | 10/2010 | Navid |
| 2010/0304873 | A1 | 12/2010 | Markowitz |
| 2011/0018867 | A1 | 1/2011 | Shibamiya et al. |
| 2011/0035079 | A1 | 2/2011 | Allen et al. |
| 2011/0059795 | A1 | 3/2011 | Kondo et al. |
| 2011/0190052 | A1 | 8/2011 | Takeda et al. |
| 2011/0216495 | A1 | 9/2011 | Marx |
| 2011/0230261 | A1 | 9/2011 | Kim |
| 2011/0260969 | A1 | 10/2011 | Workman |
| 2011/0263328 | A1 | 10/2011 | Yamashita et al. |

(56) References Cited

U.S. PATENT DOCUMENTS

| | | |
|---|---|---|
| 2011/0266231 A1 | 11/2011 | Tsunezumi et al. |
| 2011/0298713 A1 | 12/2011 | Wu |
| 2012/0058821 A1 | 3/2012 | Lan |
| 2012/0063625 A1 | 3/2012 | Barber et al. |
| 2012/0088582 A1 | 4/2012 | Wu et al. |
| 2012/0106041 A1 | 5/2012 | Ashida et al. |
| 2012/0106042 A1 | 5/2012 | Ashida et al. |
| 2012/0113034 A1 | 5/2012 | Mcdermid |
| 2012/0176369 A1 | 7/2012 | Suzuki et al. |
| 2012/0188691 A1 | 7/2012 | Zhou |
| 2012/0188694 A1 | 7/2012 | Sakakibara et al. |
| 2012/0196680 A1 | 8/2012 | Provitt |
| 2012/0202597 A1 | 8/2012 | Yee et al. |
| 2012/0224708 A1 | 9/2012 | Sugiyama |
| 2012/0231881 A1 | 9/2012 | Matsunaga |
| 2012/0271967 A1 | 10/2012 | Hirschman |
| 2012/0302347 A1 | 11/2012 | Nicholson |
| 2012/0302348 A1 | 11/2012 | Karacal et al. |
| 2012/0326984 A1 | 12/2012 | Ghassabian |
| 2013/0058659 A1 | 3/2013 | Umezu et al. |
| 2013/0076286 A1 | 3/2013 | Patton et al. |
| 2013/0095925 A1 | 4/2013 | Xu |
| 2013/0106687 A1 | 5/2013 | Baum et al. |
| 2013/0109267 A1 | 5/2013 | Schweikardt et al. |
| 2013/0109476 A1 | 5/2013 | Baum et al. |
| 2013/0120258 A1 | 5/2013 | Maus |
| 2013/0130800 A1 | 5/2013 | Sirilux |
| 2013/0154542 A1 | 6/2013 | Joynes et al. |
| 2013/0154943 A1 | 6/2013 | Joynes et al. |
| 2013/0157477 A1 | 6/2013 | Mccormack |
| 2013/0178285 A1 | 7/2013 | Joynes et al. |
| 2013/0194190 A1 | 8/2013 | Lysenko |
| 2013/0215024 A1 | 8/2013 | Nakayama et al. |
| 2013/0221923 A1 | 8/2013 | Robertson |
| 2013/0225288 A1 | 8/2013 | Levin et al. |
| 2013/0267318 A1 | 10/2013 | Pryor |
| 2013/0267322 A1 | 10/2013 | South |
| 2013/0279106 A1 | 10/2013 | Ergun et al. |
| 2013/0335904 A1 | 12/2013 | Griffin |
| 2013/0341214 A1 | 12/2013 | King |
| 2014/0028247 A1 | 1/2014 | Du |
| 2014/0121023 A1 | 5/2014 | Tahara et al. |
| 2014/0152531 A1 | 6/2014 | Murray et al. |
| 2014/0188308 A1 | 7/2014 | Allen |
| 2014/0200085 A1 | 7/2014 | Bares et al. |
| 2014/0206451 A1 | 7/2014 | Helmes et al. |
| 2014/0221098 A1 | 8/2014 | Boulanger |
| 2014/0235359 A1 | 8/2014 | Navid |
| 2014/0247246 A1 | 9/2014 | Maus |
| 2014/0274394 A1 | 9/2014 | Willis |
| 2014/0315642 A1 | 10/2014 | Grant et al. |
| 2014/0370988 A1 | 12/2014 | Shimamura et al. |
| 2014/0374457 A1 | 12/2014 | Piccolo |
| 2014/0376182 A1 | 12/2014 | Motoishi et al. |
| 2015/0018101 A1 | 1/2015 | Schoenith et al. |
| 2015/0031452 A1 | 1/2015 | Rundell et al. |
| 2015/0084900 A1 | 3/2015 | Hodges et al. |
| 2015/0118101 A1 | 4/2015 | Cauley |
| 2015/0138645 A1 | 5/2015 | Yoo |
| 2015/0149668 A1 | 5/2015 | Joynes et al. |
| 2015/0234189 A1 | 8/2015 | Lyons |
| 2015/0273325 A1 | 10/2015 | Falc |
| 2015/0281422 A1 | 10/2015 | Kessler et al. |
| 2015/0348327 A1 | 12/2015 | Zalewski |
| 2016/0001176 A1 | 1/2016 | Chen |
| 2016/0062489 A1 | 3/2016 | Li |
| 2016/0077589 A1 | 3/2016 | Chataignier et al. |
| 2016/0107082 A1 | 4/2016 | Song et al. |
| 2016/0149426 A1 | 5/2016 | Hodges et al. |
| 2016/0231773 A1 | 8/2016 | Inoue et al. |
| 2016/0317918 A1 | 11/2016 | Gassoway et al. |
| 2016/0360644 A1 | 12/2016 | Bains |
| 2016/0361627 A1 | 12/2016 | Fujita et al. |
| 2016/0361632 A1* | 12/2016 | Fujita .................. A63F 13/23 |
| 2016/0361633 A1 | 12/2016 | Fujita et al. |
| 2016/0361635 A1 | 12/2016 | Schmitz |
| 2016/0361640 A1 | 12/2016 | Owao |
| 2016/0361641 A1 | 12/2016 | Koizumi et al. |
| 2017/0052750 A1 | 2/2017 | Koizumi |
| 2017/0128830 A1 | 5/2017 | Fujita et al. |
| 2017/0136352 A1 | 5/2017 | Fujita et al. |
| 2017/0136353 A1 | 5/2017 | Koizumi |
| 2017/0144062 A1 | 5/2017 | Iwao et al. |
| 2017/0168531 A1 | 6/2017 | Casparian et al. |
| 2017/0242486 A1 | 8/2017 | Grant |
| 2017/0282061 A1 | 10/2017 | Fujita et al. |
| 2017/0361223 A1 | 12/2017 | Gohara |
| 2018/0099218 A1 | 4/2018 | Ikuta et al. |
| 2018/0099225 A1* | 4/2018 | Furuike .................. A63F 13/98 |
| 2018/0133602 A1 | 5/2018 | Miwa et al. |
| 2018/0250584 A1 | 9/2018 | Obayashi |
| 2018/0250588 A1 | 9/2018 | Winick |
| 2018/0326298 A1 | 11/2018 | Ikuta et al. |
| 2018/0345130 A1 | 12/2018 | Wells |
| 2019/0262702 A1 | 8/2019 | Fujita |
| 2020/0019258 A1 | 1/2020 | Akama |
| 2020/0061455 A1 | 2/2020 | Muramatsu et al. |
| 2020/0139232 A1 | 5/2020 | Koizumi et al. |
| 2020/0179800 A1 | 6/2020 | Fujita et al. |
| 2020/0310556 A1 | 10/2020 | Duan et al. |
| 2020/0398155 A1 | 12/2020 | Niwa |
| 2021/0197079 A1 | 7/2021 | Seibert |
| 2021/0402288 A1 | 12/2021 | Koizumi et al. |
| 2022/0072417 A1 | 3/2022 | Fujita et al. |
| 2022/0094379 A1 | 3/2022 | Balderston |
| 2023/0182006 A1 | 6/2023 | Hu et al. |
| 2023/0338831 A1 | 10/2023 | Fujita et al. |
| 2024/0278112 A1 | 8/2024 | Koizumi et al. |
| 2024/0359089 A1 | 10/2024 | Fujita et al. |

FOREIGN PATENT DOCUMENTS

| | | |
|---|---|---|
| CA | 2938895 | 8/2015 |
| CN | 2211084 | 10/1995 |
| CN | 1127150 | 7/1996 |
| CN | 1395159 | 2/2003 |
| CN | 2729796 | 9/2005 |
| CN | 1891322 | 1/2007 |
| CN | 201015711 | 2/2008 |
| CN | 100434131 | 11/2008 |
| CN | 101601931 | 12/2009 |
| CN | 101961554 | 2/2011 |
| CN | 202259500 | 5/2012 |
| CN | 101332363 | 6/2012 |
| CN | 102598126 | 7/2012 |
| CN | 102600611 | 7/2012 |
| CN | 202342834 | 7/2012 |
| CN | 202355828 | 8/2012 |
| CN | 202355829 | 8/2012 |
| CN | 102671376 | 9/2012 |
| CN | 102681612 | 9/2012 |
| CN | 202817305 | 3/2013 |
| CN | 202817828 | 3/2013 |
| CN | 103049041 | 4/2013 |
| CN | 202860081 | 4/2013 |
| CN | 103328058 | 9/2013 |
| CN | 103736275 | 4/2014 |
| CN | 203773491 | 8/2014 |
| CN | 104014129 | 9/2014 |
| CN | 104043245 | 9/2014 |
| CN | 203816200 | 9/2014 |
| CN | 104107539 | 10/2014 |
| CN | 104258565 | 1/2015 |
| CN | 104307172 | 1/2015 |
| CN | 104353239 | 2/2015 |
| CN | 104368149 | 2/2015 |
| CN | 204147522 | 2/2015 |
| CN | 104383683 | 3/2015 |
| CN | 104436646 | 3/2015 |
| CN | 204182121 | 3/2015 |
| CN | 204208280 | 3/2015 |
| CN | 204246818 | 4/2015 |
| CN | 104645613 | 5/2015 |
| CN | 204380232 | 6/2015 |

(56)  References Cited

FOREIGN PATENT DOCUMENTS

| | | |
|---|---|---|
| CN | 102606855 | 11/2015 |
| CN | 205375273 | 7/2016 |
| CN | 107206280 | 7/2019 |
| CN | 110280015 | 9/2019 |
| CN | 210992943 | 7/2020 |
| CN | 112451964 | 3/2021 |
| CN | 114849247 | 8/2022 |
| CN | 217908920 | 11/2022 |
| CN | 218485143 | 2/2023 |
| CN | 219625992 | 9/2023 |
| DE | 69225097 | 10/1998 |
| DE | 10330773 | 4/2005 |
| EP | 0 682 350 | 11/1995 |
| EP | 0 695 566 | 12/1996 |
| EP | 0587162 | 2/2002 |
| EP | 1 266 678 | 12/2002 |
| EP | 1 475 131 | 11/2004 |
| EP | 1 759 745 | 3/2007 |
| EP | 2 018 030 | 1/2009 |
| EP | 2 258 456 | 12/2010 |
| EP | 2 446 944 | 5/2012 |
| EP | 2 772 825 | 9/2014 |
| EP | 3 269 434 | 1/2018 |
| EP | 3 406 309 | 1/2020 |
| EP | 3 586 935 | 1/2020 |
| ES | 2231856 | 5/2005 |
| FR | 3019058 | 3/2016 |
| GB | 2 310 481 | 8/1997 |
| GB | 2411452 | 3/2008 |
| GB | 201310373 | 7/2013 |
| GB | 2 522 008 | 7/2015 |
| HK | 1184322 | 1/2014 |
| JP | 54-112123 | 9/1979 |
| JP | 562185 | 1/1981 |
| JP | S57-117615 | 7/1982 |
| JP | S62-165373 | 10/1987 |
| JP | 63-53873 | 3/1988 |
| JP | 64-37986 | 2/1989 |
| JP | 04-126443 | 4/1992 |
| JP | 6-77387 | 10/1994 |
| JP | H06-336139 | 12/1994 |
| JP | 07-030429 | 6/1995 |
| JP | 07-155465 | 6/1995 |
| JP | 3028834 | 9/1996 |
| JP | H08-227096 | 9/1996 |
| JP | H09-092525 | 4/1997 |
| JP | 11-39063 | 2/1999 |
| JP | 11-076617 | 3/1999 |
| JP | 2604748 | 3/2000 |
| JP | 3054306 | 4/2000 |
| JP | 3170961 | 3/2001 |
| JP | 2002-018131 | 1/2002 |
| JP | 2002-157085 | 5/2002 |
| JP | 2002-157086 | 5/2002 |
| JP | 2002-182856 | 6/2002 |
| JP | 3089139 | 7/2002 |
| JP | 3356757 | 10/2002 |
| JP | 2003-018275 | 1/2003 |
| JP | 2003-140811 | 5/2003 |
| JP | 3442758 | 6/2003 |
| JP | 2003-236246 | 8/2003 |
| JP | 2004-33371 | 2/2004 |
| JP | 2004-038332 | 2/2004 |
| JP | 2004-146986 | 5/2004 |
| JP | 2004-201728 | 7/2004 |
| JP | 2004-313492 | 11/2004 |
| JP | 2004-336723 | 11/2004 |
| JP | 3619517 | 2/2005 |
| JP | 2006-031720 | 2/2006 |
| JP | 3857566 | 12/2006 |
| JP | 3866163 | 1/2007 |
| JP | 2007-021065 | 2/2007 |
| JP | 2007-025060 | 2/2007 |
| JP | 2007-54114 | 3/2007 |
| JP | 2007-83013 | 4/2007 |
| JP | 2007-103380 | 4/2007 |
| JP | 2007-127935 | 5/2007 |
| JP | 2007-213121 | 8/2007 |
| JP | 3994112 | 10/2007 |
| JP | 2007-330389 | 12/2007 |
| JP | 4036246 | 1/2008 |
| JP | 4203476 | 1/2009 |
| JP | 4255510 | 2/2009 |
| JP | 2009-075861 | 4/2009 |
| JP | 4262726 | 5/2009 |
| JP | 2009-189169 | 8/2009 |
| JP | 2010-000257 | 1/2010 |
| JP | 2010-020742 | 1/2010 |
| JP | 4457885 | 4/2010 |
| JP | 2010-277508 | 12/2010 |
| JP | 2011-108256 | 6/2011 |
| JP | 4749245 | 8/2011 |
| JP | 4798809 | 10/2011 |
| JP | 2011-227804 | 11/2011 |
| JP | 2011-234744 | 11/2011 |
| JP | 4805633 | 11/2011 |
| JP | 4849829 | 1/2012 |
| JP | 4906391 | 3/2012 |
| JP | 4907128 | 3/2012 |
| JP | 4989105 | 8/2012 |
| JP | 2012-232025 | 11/2012 |
| JP | 2012-249923 | 12/2012 |
| JP | 5089060 | 12/2012 |
| JP | 2013-020500 | 1/2013 |
| JP | 5122659 | 1/2013 |
| JP | 5134224 | 1/2013 |
| JP | 5153122 | 2/2013 |
| JP | 2013-054548 | 3/2013 |
| JP | 5161338 | 3/2013 |
| JP | 5202013 | 6/2013 |
| JP | 5204381 | 6/2013 |
| JP | 2013-128744 | 7/2013 |
| JP | 5227910 | 7/2013 |
| JP | 5265159 | 8/2013 |
| JP | 5294085 | 9/2013 |
| JP | 5325492 | 10/2013 |
| JP | 5379176 | 12/2013 |
| JP | 5392863 | 1/2014 |
| JP | 2014-041528 | 3/2014 |
| JP | 2014-089578 | 5/2014 |
| JP | 5501582 | 5/2014 |
| JP | 2014-102813 | 6/2014 |
| JP | 5520457 | 6/2014 |
| JP | 5550433 | 7/2014 |
| JP | 2014-200620 | 10/2014 |
| JP | 2014-209373 | 11/2014 |
| JP | 2015-503246 | 1/2015 |
| JP | 5662696 | 2/2015 |
| JP | 5668114 | 2/2015 |
| JP | 2015-041465 | 3/2015 |
| JP | 5755943 | 7/2015 |
| JP | 5792971 | 10/2015 |
| JP | 5837325 | 12/2015 |
| JP | 5840844 | 1/2016 |
| JP | 2016-511885 | 4/2016 |
| JP | 5926773 | 5/2016 |
| JP | 5937998 | 6/2016 |
| JP | 2016-148903 | 8/2016 |
| JP | 6051016 | 12/2016 |
| JP | 2017-000757 | 1/2017 |
| JP | 2017-000758 | 1/2017 |
| JP | 2017-004523 | 1/2017 |
| JP | 6121034 | 4/2017 |
| JP | 6132613 | 5/2017 |
| JP | 6153238 | 6/2017 |
| JP | 2017-146971 | 8/2017 |
| JP | 2017-535002 | 11/2017 |
| JP | 2017-221427 | 12/2017 |
| JP | 2018-057650 | 4/2018 |
| JP | 6327669 | 5/2018 |
| JP | 2018-099430 | 6/2018 |
| JP | 2018-129084 | 8/2018 |
| JP | 3219062 | 11/2018 |
| JP | D1634208 | 6/2019 |

(56)                References Cited

FOREIGN PATENT DOCUMENTS

| JP | 2019-146737 | 9/2019 |
| JP | 2019-184766 | 10/2019 |
| JP | 6635597 | 1/2020 |
| JP | 2020-514009 | 5/2020 |
| JP | 2021-504817 | 2/2021 |
| JP | 2021-509861 | 4/2021 |
| JP | 3240323 | 12/2022 |
| JP | 2023-087637 | 6/2023 |
| KR | 20030021435 | 3/2003 |
| KR | 100436429 | 6/2004 |
| KR | 100743786 | 7/2007 |
| KR | 20080024679 | 3/2008 |
| KR | 20100054032 | 5/2010 |
| KR | 200462443 | 9/2012 |
| KR | 101364826 | 2/2014 |
| KR | 20140127171 | 11/2014 |
| RU | 2010131174 | 2/2012 |
| SE | 540658 | 10/2018 |
| TW | 470688 | 1/2002 |
| TW | 474553 | 1/2002 |
| TW | 587901 | 5/2004 |
| TW | M242791 | 9/2004 |
| TW | 341482 | 5/2011 |
| TW | 201216123 | 4/2012 |
| TW | I440496 | 6/2014 |
| TW | M494020 | 1/2015 |
| TW | I541051 | 7/2016 |
| TW | I565504 | 1/2017 |
| WO | 2007/095314 | 8/2007 |
| WO | 2010/123514 | 10/2010 |
| WO | 2011/073992 | 6/2011 |
| WO | 2012/020409 | 2/2012 |
| WO | 2012/105098 | 8/2012 |
| WO | 2013/056112 | 4/2013 |
| WO | 2013/059759 | 4/2013 |
| WO | 2013/095703 | 6/2013 |
| WO | 2013/157054 | 10/2013 |
| WO | 2014/123828 | 8/2014 |
| WO | 2014/133558 | 9/2014 |
| WO | 2015/006680 | 1/2015 |
| WO | 2015/014663 | 2/2015 |
| WO | 2013-103082 | 5/2015 |
| WO | 2016/199887 | 12/2016 |
| WO | 2017/088739 | 6/2017 |
| WO | 2017/211475 | 12/2017 |
| WO | 2018/179180 | 10/2018 |
| WO | 2020/208649 | 10/2020 |
| WO | 2021/246258 | 12/2021 |

OTHER PUBLICATIONS

Ark Staff H, "Start deal of mobile terminal game controller GAMEVICE products", Aug. 21, 2018, retrieved on internet on Jul. 25, 2023, URL: https://www.arkpc.jp/news/article/3002238.
4gamer.net[online], "Domestic advance orders for "ONEXPLAYER 2," which is a portable game PC with a removable game pad, are now accepted. A unique product usable in a plurality of styles", Feb. 9, 2023, URL:https://www.4gamer.net/games/550/G055070/20230208094/.
Akiba PC Hotline![online], "Android game machine "GPD XP" resembling Nintendo Switch has been put on sale; accompanied by a replaceable grip, the price being 42,600 yen", Nov. 26, 2021, URL:https://akibapc.watch.impress.co.jp/docs/news/1369251.html.
Cocole [online],"Easy charging with Joy Pro PON capable of charging of Nintendo Switch controller", Aug. 15, 2022, URL:https://cocole.jp/nintendoswitch-2/.
YouTube [online] [video], "[Can play for life] I bought a Joy-Con charging grip [Nintendo Switch]", Feb. 9, 2025, Retrieved from the Internet:URL:https://www.youtube.com/watch?v=yZEEWDX3SQ [retrieved on Jan. 26, 2024].
Lenovo StoryHub, "Gaming on the Go: Lenovo Unveils a New Legion Gaming Handheld Device and Accessories that Untether PC Gaming," Sep. 1, 2023, pp. 1-17.

YouTube [online] [video], "Lenovo Legion Go—OMG This is so Cool," Sep. 1, 2023, Retrieved from the Internet; URL: https://www.youtube.com/watch?v=hq16doE-Ccw [retrieved on Jan. 12, 2026] (1 page).
International Search Report issued in PCT/JP2023/028162, dated Sep. 12, 2023, pp. 1-3.
Ebihara et al., U.S. Appl. No. 19/403,680, filed Nov. 28, 2025.
Takei et al., U.S. Appl. No. 19/209,576, filed May 15, 2025.
Koriyama et al., U.S. Appl. No. 19/429,541, filed Dec. 22, 2025.
Amano et al., U.S. Appl. No. 19/446,479, filed Jan. 12, 2026.
Hirose et al., U.S. Appl. No. 19/446,204, filed Jan. 12, 2026.
Anonymous, "Wii Remote Configurations/Wii/Support/Nintendo", Nov. 20, 2006.
O-iPower, Sony Official Cradle, Jan. 2, 2015, https://www.youtube.com/watch?v=lly5pOxOPmU, (1 page).
Phonejoy Play smartphone game controller hits Kickstarter, http://www.slashgear.com/phonejoy-play-smartphonegame-controller-hits-kickstarter-05259565/; downloaded Nov. 10, 2016, 9 pages.
Wikipad Gaming Tablet, http://www.gizorama.com/2013/news/wikipad-gaming-tablet-available-june-11; downloaded Nov. 10, 2016, 4 pages.
iFrogz's Caliber Advantage, https://www.engadget.com/2013/01 /11 /ifrogz-caliber-advantage-iphone-gaming-case-hands-on/; downloaded Nov. 10, 2016, 7 pages.
Moga Ace Power iOS Game Controller, http://www.ign.com/articles/2013/11/20/moga-ace-power-ios-game-controller-now-available; downloaded Nov. 10, 2016, 6 pages.
PowerShell Controller+ Battery, http://support.logitech.com/en_us/product/powershell-controller-and-battery; downloaded Nov. 10, 2016, 2 pages.
Game grip STG-ONE, http://gamegrip-stgone.com/en/index.php; downloaded Nov. 10, 2016, 7 pages
PG-9023, http://www.ipega.hk/index.php?option=com_phocagallery&view=detail&catid=11%3Aiphone&id=1100%3Abluetooth-stretch-controller&Itemid=4&lang=en; downloaded Nov. 10, 2016, 2 pages
Mad Catz Gamepads for Android and IOS, http://madcatz.com/gamesmart_lynx_9/; downloaded Nov. 10, 2016, 4 pages.
Gametel bluetooth controller for Android and iOS, https://www.engadget.com/2012/01 /09/gametel-bluetooth-controller-for-android-and-ios-hands-on/; downloaded Nov. 10, 2016, 7 pages.
SMACON-GP, http://dragonquestgame.net/use-bluetooth-controller-smacon/; downloaded Nov. 10, 2016, 9 pages.
Samsung Galaxy S4 Game Pad, http://www.geeky-gadgets.com/samsung-galaxy-s4-game-pad-21-03-2013/; downloaded Nov. 10, 2016, 5 pages.
Power A's Moga Pro . . . , http://venturebeat.com/2013/01 /14/poweras-moga-pro-gives-you-a-console-gaming-experience-experiencewherever-you-go -hands-on-video/; downloaded Nov. 10, 2016, 5 pages.
IPEGA PG-9017 Wireless Bluetooth Controller, http://www.infinityreviews.com/2013/04/ipega-bluetooth-controller-review.html; downloaded Nov. 10, 2016, 13 pages.
BladePad, http://www.bladepad.com/; downloaded Nov. 10, 2016, 2 pages.
Razer Goes Mobile with Junglecat iOS Gaming Controller, http://www.razerzone.com/press/detail/press-releases/razer-goes-mobile-with-junglecat-ios-gaming-controller; downloaded Nov. 10, 2016, 5 pages.
Capsule Hard Case for iPhone 5: a case with cute home button which can encase iPhone completely, AppBankiPhone, Let's find enjoyment of Smartphone, Jun. 1, 2013, searched on Sep. 26, 2019, URL, https://web.archive.org/web/20130601175553/http://www.appbank.net/2013/02/17/goods-books/547011.php, 9 pages (with machine translation).
Yukiko Sato, "At last storing/sharing of screen shot with Xbox One is available due tothe update in March", IT Media News [online], Feb. 19, 2015, [searched on May 27, 2020], Internet, 3 pages. https://www.itmedia.co.in ews/articles/1502/19/news088.html (with machine translation).
Try a cradle that turns your PSP into a "stationary player", AV Watch [online], May 2, 2008, Internet <URL:https:/av.watch.i docs/20080502/psp.htm, 4 pages, with English-language machine translation.

(56)         References Cited

OTHER PUBLICATIONS

Wikipedia The Free Encyclopedia, Webpage regarding DualShock 1 and 2, https://en.wikipedia.org/wiki/DualShock, downloaded on Feb. 17, 2023, 4 pages.
[HotHot Review] Fujitsu "Arrows Tab QH77 /M F ARQ77M", PC Watch [online], Dec. 25, 2013, Internet <URL: https://pc.watch.impress.co.jp/docs/column/hothot/628829.html>, 14 pages (with machine translation).

* cited by examiner

UPWARD-
DOWNWARD
DIRECTION

LEFT-RIGHT
DIRECTION

R1
R2
R3
R4

T3,T5
T10,T11

UPWARD-
DOWNWARD
DIRECTION

LEFT-RIGHT
DIRECTION

FRONT-REAR
DIRECTION

R6

LEFT-RIGHT
DIRECTION

UPWARD-DOWNWARD DIRECTION

LEFT-RIGHT DIRECTION

FIG.29

UPWARD-
DOWNWARD
DIRECTION

R2

R3 ←———→ R1

R4

LEFT-RIGHT
DIRECTION

UPWARD-
DOWNWARD
DIRECTION

R2

R3 ◄──►── R1

R4

LEFT–RIGHT
DIRECTION

REAR

DOWN ←→ UP

FRONT

REAR

LEFT ←→ RIGHT

FRONT

REAR

UP ←→ DOWN

FRONT

GAME CONTROLLER

This nonprovisional application claims priority on and is a continuation of International Patent Application PCT/JP 2023/028162 filed on Aug. 1, 2023, with the Japan Patent Office, the entire contents of which are hereby incorporated by reference.

FIELD

The present disclosure relates to a game controller.

BACKGROUND AND SUMMARY

An exemplary embodiment provides a game controller that is removably attachable to a main body apparatus including a recess and first and second magnets at a bottom of the recess and being capable of performing game processing. The game controller includes a first input portion, a projection, a first button, and a second button. The first input portion is provided on a front surface. The projection projects from a first side surface and extends along a longitudinal direction of the first side surface. The projection is configured to be matched with the recess. The first button and the second button are to be pressed down by a user provided on a top surface of the projection along the longitudinal direction. The first button is to be attracted by magnetic force to the first magnet. The second button is to be attracted by magnetic force to the second magnet.

According to the game controller according to the above, the first button and the second button may be comprised of a magnet, a soft magnetic material, or a combination of the magnet and the soft magnetic material.

According to the game controller according to the above, the first button and the second button may include, at least in part, a magnet or a soft magnetic material.

According to the game controller according to the above, at least a portion of each of the first button and the second button exposed from the top surface of the projection may be comprised of the magnet or the soft magnetic material.

According to the game controller according to the above, the first button and the second button may each include a magnet or a soft magnetic material provided at a back of the exposed portion and moving integrally with the exposed portion.

According to the game controller according to the above, the exposed portion may be coated with a non-magnetic material.

According to the game controller according to the above, a portion of each of the first button and the second button that is comprised of a magnet or a soft magnetic material and is conductive may be connected to a ground of an electronic circuit in the game controller.

According to the game controller according to the above, the first button and the second button may be comprised of a soft magnetic material.

According to the game controller according to the above, the first button and the second button may include a soft magnetic material at least in part, and do not have to include a magnet.

According to the game controller according to the above, the first button and the second button may be configured as being movable in a direction opposite to a direction of pressing-down from an initial position by magnetic force of the first magnet and the second magnet, respectively, the initial position being a position while the first button and the second button are not pressed down by the user.

According to the game controller according to the above, the projection may include in the top surface, a first opening and a second opening through which a button top surface of the first button and a button top surface of the second button are exposed, respectively. Each of the first button and the second button may include respective sidewalls that extend from the button top surfaces through the first opening and the second opening to inside of the projection, respectively, and respective flanges that extend outward from portions of the sidewalls of the buttons located in the projection.

The game controller may further include a first biasing component and a second biasing component that are arranged under the first button and the second button and bias the first button and the second button in the opposite direction at least when the first button and the second button are pressed down, respectively, and a first elastically deformable body and a second elastically deformable body arranged between the respective flanges of the first button and the second button and a first inner surface which is a surface of the inside of the projection opposed to upper surfaces of the respective flanges, the first elastically deformable body and the second elastically deformable body allowing movement of the first button and the second button in the opposite direction from the initial position, respectively.

According to the game controller according to the above, the first elastically deformable body and the second elastically deformable body may be fixed to the first inner surface.

According to the game controller according to the above, the first elastically deformable body and the second elastically deformable body may be provided on a side closer to a second inner surface than the sidewalls, the second inner surface being a surface of the inside of the projection opposed to the sidewalls.

According to the game controller according to the above, a part of each of the first elastically deformable body and the second elastically deformable body may project from an opening provided on an outer peripheral surface of the projection.

According to the game controller according to the above, a height of each of the button top surfaces of the first button and the second button at the initial position from the first side surface may be lower than a highest height of the top surface of the projection from the first side surface. The first button and the second button may be configured as being movable such that the height of each of the button top surfaces from the first side surface attains to the highest height or to a position higher than the highest height.

According to the game controller according to the above, a height of each of the button top surfaces of the first button and the second button at the initial position from the first side surface may be lower than a highest height of the top surface of the projection from the first side surface. The first button and the second button may be configured as being movable such that the height of each of the button top surfaces is close to the highest height of the top surface of the projection.

According to the game controller according to the above, a height of each of the button top surfaces of the first button and the second button at the initial position from the first side surface may be lower than a highest height of the top surface of the projection from the first side surface. The first button and the second button may be configured as being movable such that the button top surfaces are closer to the bottom of the recess by magnetic force of the first magnet and the second magnet when the game controller is attached to the main body apparatus.

According to the game controller according to the above, the first button and the second button may be configured as being movable until the button top surfaces come in contact with the bottom of the recess owing to the magnetic force of the first magnet and the second magnet when the game controller is attached to the game device.

The game controller according to the above may further include a height-raised portion provided as being integrated with the top surface of the projection or provided by placement of a separate component on the top surface of the projection. The highest height may be a highest height of the projection inclusive of the height-raised portion.

According to the game controller according to the above, the projection may decrease in width of the top surface toward an end, at least in an end area in the longitudinal direction.

According to the game controller according to the above, a height from the first side surface, of at least one end area in the longitudinal direction in the top surface of the projection may be higher than a height from the first side surface, of areas where the first button and the second button are provided, respectively.

According to the game controller according to the above, a terminal accommodation portion where a terminal is accommodated may open at the top surface of the projection. A height from the first side surface, of an area where the terminal accommodation portion opens at the top surface of the projection may be higher than a height from the first side surface, of areas where the first button and the second button are provided, respectively.

According to the game controller according to the above, a terminal accommodation portion where a terminal is accommodated may open at the top surface of the projection. A height from the first side surface, of at least one end area in the longitudinal direction in the top surface of the projection may be higher than a height from the first side surface, of an area where the terminal accommodation portion opens.

According to the game controller according to the above, a highest height of the top surface of the projection from the first side surface may be greater than a depth of the recess.

According to the game controller according to the above, to the game controller, an apparatus provided with an engagement element may removably be attachable. The game controller may include an engagement hole with which the engagement element can be engaged, at at least one end surface in the longitudinal direction on an outer peripheral surface of the projection.

The game controller according to the above may include a first engagement hole at at least one end surface in the longitudinal direction on an outer peripheral surface of the projection. To the game controller, an apparatus provided with a first engagement element corresponding to the first engagement hole may removably be attachable.

The game controller according to the above may include a second engagement hole at the other end surface in the longitudinal direction on the outer peripheral surface of the projection. To the game controller, an apparatus further provided with a second engagement element corresponding to the second engagement hole may removably be attachable.

According to the game controller according to the above, the first engagement hole and the second engagement hole may be different from each other in shape.

The game controller according to the above may further include an elastically deformable body on a back surface side of an outer peripheral surface of the projection.

The game controller according to the above may further include an elastically deformable body on an outer peripheral surface of the projection. The elastically deformable body may be provided adjacently to the first side surface.

The game controller according to the above may further include an operation portion to be operated by a user and a pusher configured to be projected through a third opening provided on the top surface of the projection in accordance with an operation on the operation portion.

According to the game controller according to the above, the operation portion may be provided on a rear surface.

The game controller according to the above may further include a raised portion that projects from the rear surface. The operation portion may be arranged on a surface of the raised portion on a side of the first side surface.

According to the game controller according to the above, an operation direction of the operation portion may be opposite to a projection direction of the projection. The operation portion may be configured to be buried in the raised portion by being operated.

According to the game controller according to the above, the operation direction may be opposite to the projection direction of the projection and a direction toward the rear surface.

According to the game controller according to the above, a highest height of the operation portion from a rear surface may be lower than a highest height of a raised portion from the rear surface.

According to the game controller according to the above, a shoulder button may be arranged on the raised portion.

According to the game controller according to the above, an operation direction of the operation portion may be opposite to a projection direction of the projection.

According to the game controller according to the above, the first button may be arranged on a side of one end relative to a center in the longitudinal direction of the top surface of the projection. The second button may be arranged on a side of the other end relative to the center. The third opening may be provided on a side of the one end relative to the first button or a side of the other end relative to the second button, in the longitudinal direction.

According to the game controller according to the above, the third opening may be provided on an upper side of one of the first button and the second button, and the one of the first button and the second button may be located on an upper side of the other in a state of use where the game controller is attached to the game device.

According to the game controller according to the above, the third opening may be provided on an area where a height from the first side surface is highest, the area being at the top surface of the projection.

The game controller according to the above may further include a rotation shaft to which the operation portion is connected and a pusher actuator connected to the rotation shaft, the pusher actuator abutting on the pusher to have the pusher project in accordance with the operation on the operation portion.

According to the game controller according to the above, a length from the rotation shaft to an end of the operation portion may be longer than a distance from the rotation shaft to a portion of abutment between the pusher actuator and the pusher.

According to the game controller according to the above, a distance from the rotation shaft to a portion of abutment between the pusher actuator and the pusher may be longer when an amount of projection of the pusher is large than when the amount of projection of the pusher is small.

According to the game controller according to the above, the main body apparatus may further include a main-body-apparatus-side terminal provided in the recess. A terminal may be provided between the first button and the second button when viewed in a direction facing the top surface of the projection and may be configured to electrically be connected to the main-body-apparatus-side terminal.

According to the game controller according to the above, the terminal may have an upper end arranged at a position where a height from the first side surface is lower than the top surface of the projection.

According to the game controller according to the above, the main body apparatus may further include a main-body-apparatus-side terminal provided in the recess. The projection may be provided with a fourth opening between the first button and the second button. The game controller may further include a terminal being configured to be electrically connected to the main-body-apparatus-side terminal, in the projection accessed through the fourth opening.

According to the game controller according to the above, the main body apparatus may further include a main-body-apparatus-side terminal provided in the recess. The projection may be provided with a fourth opening between the first button and the second button, the fourth opening being an opening of a terminal accommodation portion. The game controller may further include a terminal being configured to be electrically connected to the main-body-apparatus-side terminal, the terminal being provided along an inner peripheral surface of the terminal accommodation portion.

The game controller according to the above may further include a light emission portion on a front surface side of an outer peripheral surface of the projection.

According to the game controller according to the above, the light emission portion may be provided between the first button and the second button in the longitudinal direction.

The game controller according to the above may further include a light emission portion in a surface on a front surface side of an outer peripheral surface of the projection.

The light emission portion may be provided at a position superimposed on the fourth opening in the longitudinal direction.

According to the game controller according to the above, a terminal may be provided along a rear-surface-side inner peripheral surface of a terminal accommodation portion, and an inner peripheral surface of the terminal accommodation portion may include a front-surface-side inner peripheral surface and the rear-surface-side inner peripheral surface.

According to the game controller according to the above, the top surface of the projection may be provided with a fifth opening. The game controller may further include a light emitter configured to emit light outward through the fifth opening and a light reception sensor configured to detect reflected light of light emitted from the light emitter, the reflected light being received through the fifth opening and varying with movement relative to a grounding surface.

According to the game controller according to the above, the projection may be provided with a first opening and a second opening on the top surface, through which button top surfaces of the first button and the second button are exposed, respectively.

According to the game controller according to the above, the fifth opening may be provided between the first opening and the second opening.

According to the game controller according to the above, the main body apparatus may further include a main-body-apparatus-side terminal provided in the recess. The top surface of the projection may be provided with a fourth opening between the first button and the second button. The game controller may further include a terminal being configured to be electrically connected to the main-body-apparatus-side terminal, in the projection accessed through the fourth opening. The fifth opening may be provided between the first opening and the fourth opening.

According to the game controller according to the above, the projection may be provided with a sixth opening through which a button configured to be operated by a user is exposed, the sixth opening being located between the second opening and the fourth opening.

According to the game controller according to the above, a height from the first side surface, of an area in the top surface of the projection where the fifth opening is provided may be higher than a height from the first side surface, of areas where the first button and the second button are provided.

The game controller according to the above may further include a mouse skate placed on the top surface of the projection, the mouse skate being configured to be grounded to the grounding surface when the game controller is placed such that the top surface of the projection is opposed to the grounding surface.

According to the game controller according to the above, the mouse skate may be provided with a through hole. The game controller may further include an operation portion configured to be operated by a user and a pusher configured to be projected through a third opening provided on the top surface of the projection, in accordance with an operation on the operation portion. The mouse skate may be placed such that the through hole communicates with the third opening.

The game controller according to the above may further include a second input portion on a side surface different from the first side surface.

The game controller according to the above may further include a third input portion on a rear surface.

According to the game controller according to the above, the first input portion may include a cross-shaped key or a set of four buttons, and a joystick.

According to the game controller according to the above, the first input portion may include a third button configured to be pressed down by a user and a joystick. The game controller may further include a second input portion on a side surface different from the first side surface.

According to the game controller according to the above, when viewed in a manner of use with the first side surface facing up, the first button and the second button may be arranged in symmetry, the joystick may be provided on a left of the third button, and the second input portion may be provided on a side surface contiguous from a right end of the first side surface.

According to the game controller according to the above, when viewed in a manner of use with the first side surface facing up, the first button and the second button may be arranged in symmetry, the joystick may be provided on a left of the third button, and the second input portion may be provided on a side surface contiguous from a left end of the first side surface.

According to the game controller according to the above, the main body apparatus may be in a horizontally long shape and the game controller may be configured to be attached and removed with the first side surface being opposed to a side surface of the main body apparatus.

According to the game controller according to the above, the recess may be provided at both of a first side surface and a second side surface of the main body apparatus. The projection may be configured to be matched with each of the recess in the first side surface and the recess in the second side surface.

An exemplary embodiment provides a game controller that is removably attachable to a main body apparatus including a recess and first and second magnets at a bottom of the recess and being capable of performing game processing. The game controller includes an input portion, a projection, a first pressed-down portion, and a second pressed-down portion. The input portion is provided on a front surface. The projection projects from a first side surface and extends along a longitudinal direction of the first side surface. The projection is configured to be matched with the recess. The first pressed-down portion and the second pressed-down portion are provided along the longitudinal direction on a top surface of the projection. The first pressed-down portion and the second pressed-down portion are moved by being pressed down by a user. The first pressed-down portion is to be attracted by magnetic force to the first magnet. The second pressed-down portion is to be attracted by magnetic force to the second magnet.

An exemplary embodiment provides a game controller that is removably attachable to a game device including a recess and first and second magnets at a bottom of the recess. The game controller includes a first input portion, a first projection, a second projection, a first button, and a second button. The first input portion is provided on a front surface. The first projection and the second projection project from a first side surface and are arranged along a longitudinal direction of the first side surface. The first projection and the second projection are configured to be matched with the recess.

The first button is provided on a top surface of the first projection. The first button is to be pressed down by a user. The first button is to be attracted by magnetic force to the first magnet. The second button is provided on a top surface of the second projection. The second button is to be pressed down by the user. The second button is to be attracted by magnetic force to the second magnet.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 20 shows an exemplary illustrative non-limiting drawing of a schematic cross-sectional view along the line XX in FIG. 17.

FIG. 24 shows an exemplary illustrative non-limiting drawing of a schematic bottom side view showing a state in which the game controller is used as a mouse.

FIG. 25 shows an exemplary illustrative non-limiting drawing of a schematic diagram showing a state of use of the mouse with both hands.

FIG. 26 shows an exemplary illustrative non-limiting drawing of a schematic rear view showing the configuration in the first manner of the game controller.

FIG. 29 shows an exemplary illustrative non-limiting drawing of a schematic cross-sectional view showing a state in which an operation portion is operated.

FIG. 37 shows an exemplary illustrative non-limiting drawing of a schematic conceptual diagram showing a state of connection of a terminal in a first connected state.

FIG. 40 shows an exemplary illustrative non-limiting drawing of a schematic conceptual diagram showing a second example of a state of connection of a terminal.

DETAILED DESCRIPTION OF NON-LIMITING EXAMPLE EMBODIMENTS

Figure 1:
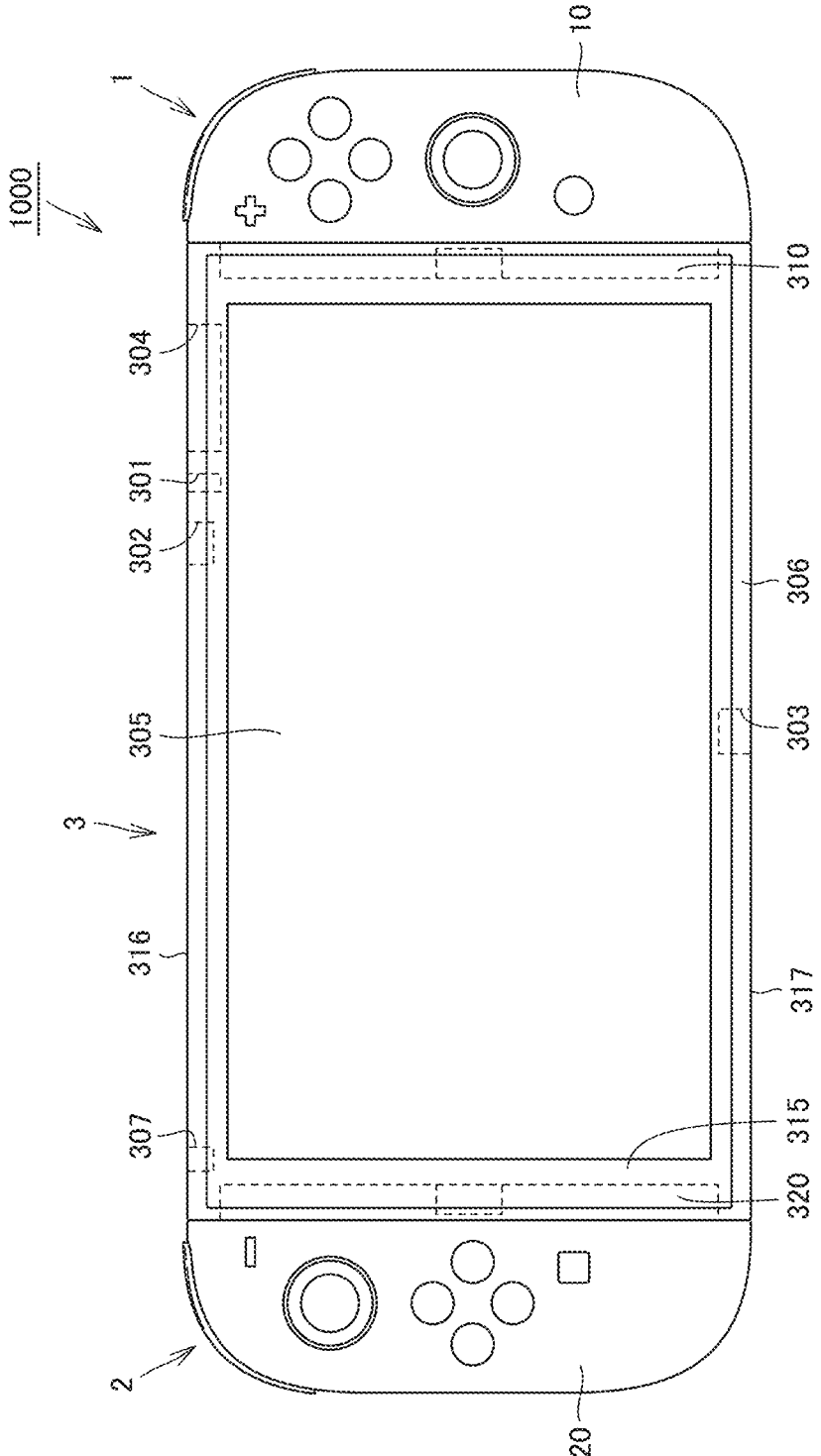
FIG. 1 shows an exemplary illustrative non-limiting drawing of a schematic front view showing an exemplary configuration of an information processing apparatus according to the present embodiment.

An embodiment of the present disclosure (which is also referred to as the present embodiment) will be described in detail with reference to the drawings. The same or corresponding elements in the drawings have the same reference characters allotted and description thereof will not be repeated.

[First Manner]

<Information Processing Apparatus>

An exemplary configuration of an information processing apparatus 1000 according to the present embodiment will initially be described. FIG. 1 is a schematic front view showing an exemplary configuration of information processing apparatus 1000 according to the present embodiment.

As shown in FIG. 1, information processing apparatus 1000 according to the present embodiment includes a first game controller 1, a second game controller 2, and a main body apparatus 3. First game controller 1 or second game controller 2 is collectively also simply referred to as a game controller below. Main body apparatus 3 is generally in a shape of a parallelepiped, and an upper side surface and a lower side surface are longer than a right side surface and a left side surface. Main body apparatus 3 is configured to perform game processing. The game processing is performed based on an input to the game controller. First game controller 1 and second game controller 2 are attachable to and removable from main body apparatus 3. In an attached state shown in FIG. 1, first game controller 1 is attached to the right side surface of main body apparatus 3 and second game controller 2 is attached to the left side surface of main body apparatus 3.

Figure 2:
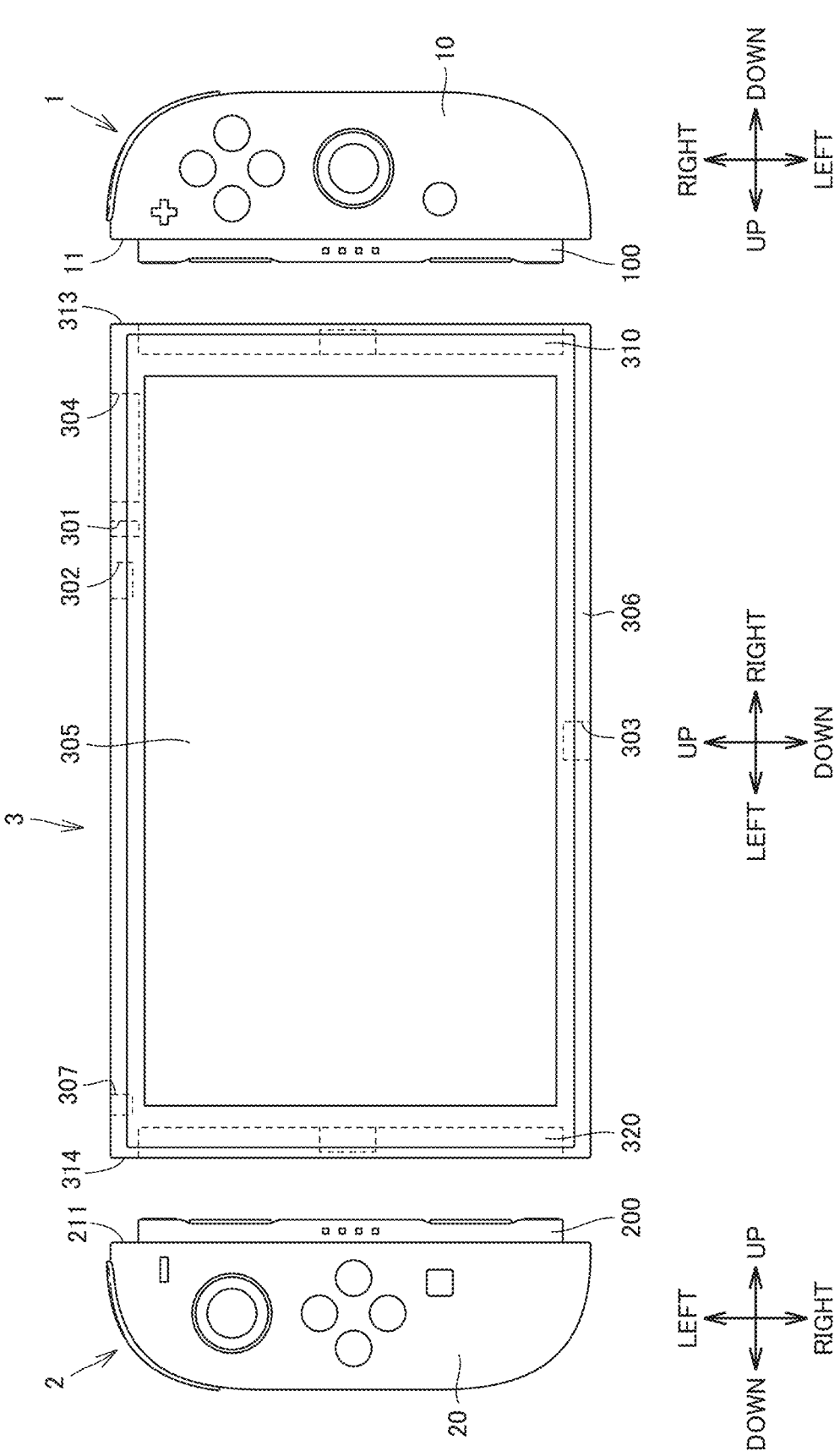
FIG. 2 shows an exemplary illustrative non-limiting drawing of a schematic front view showing a state in which each of a first game controller and a second game controller has been removed from a main body apparatus.

FIG. 2 is a schematic front view showing a state in which each of first game controller 1 and second game controller 2 has been removed from main body apparatus 3.

Figure 3:
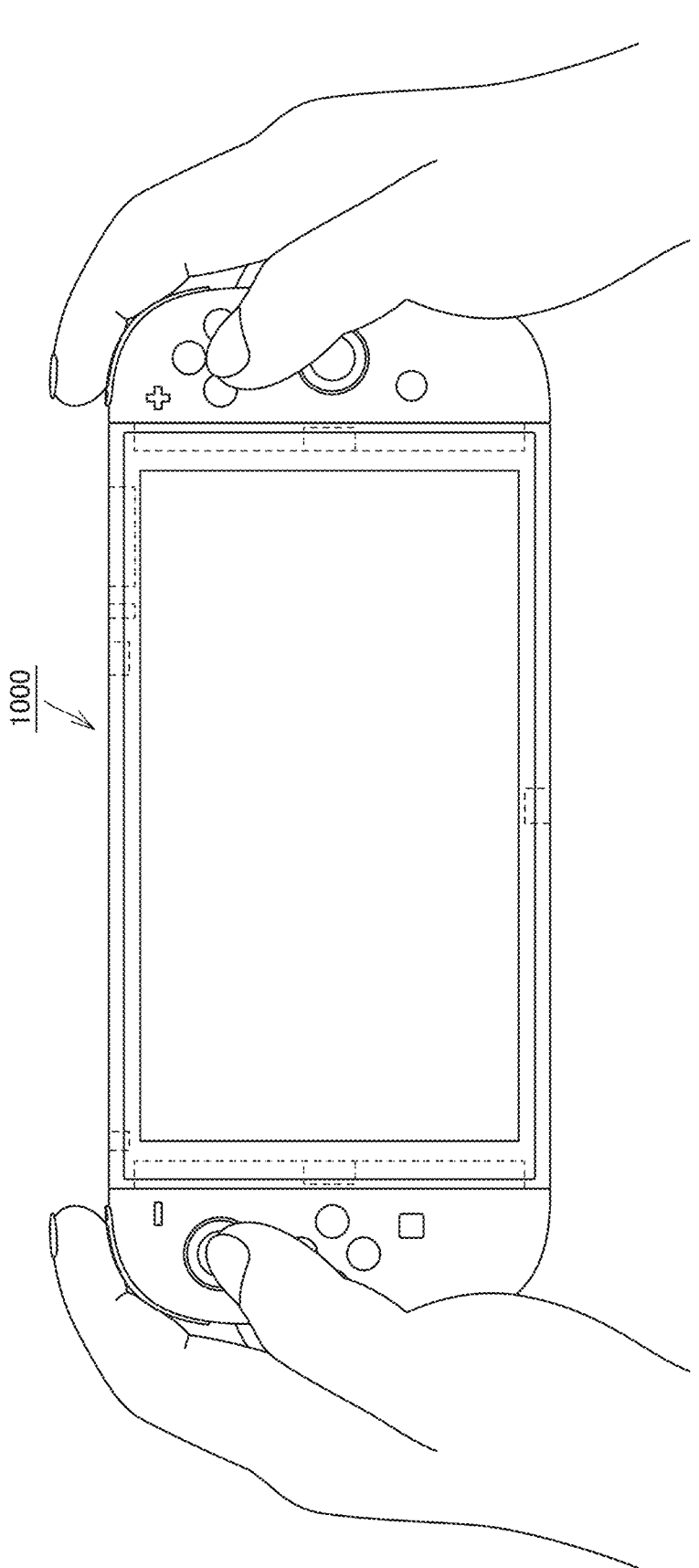
FIG. 3 shows an exemplary illustrative non-limiting drawing of a diagram showing an exemplary state in which the information processing apparatus is operated as being held.
Figure 4:
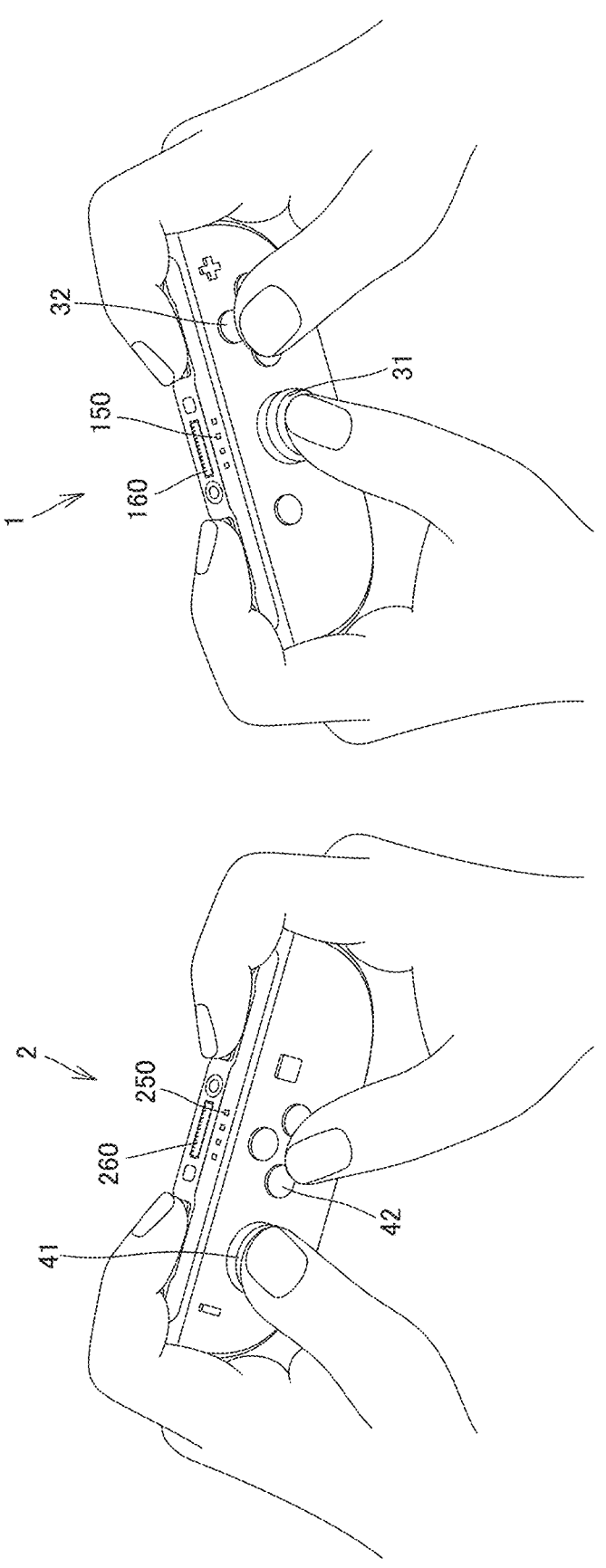
FIG. 4 shows an exemplary illustrative non-limiting drawing of a diagram showing an exemplary state in which a controller is operated as being horizontally held.
Figure 5:
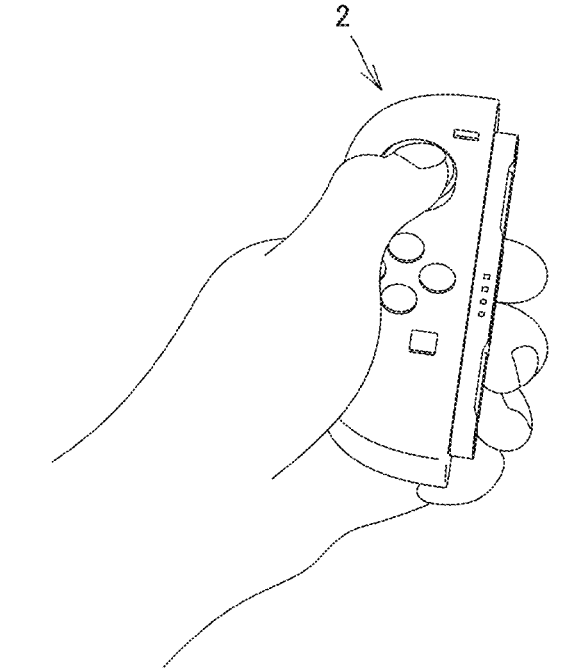
FIG. 5 shows an exemplary illustrative non-limiting drawing of a diagram showing an exemplary state in which the controller is operated as being vertically held.
Figure 5:
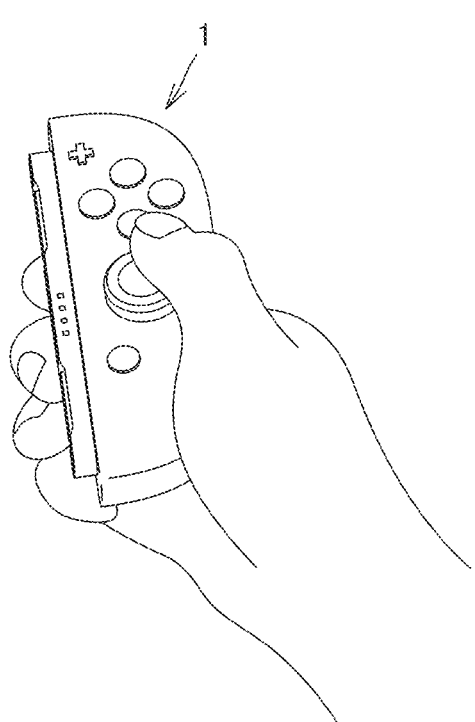

As shown in FIGS. 3, 4, and 5, the game controller can be used in each of a state in which the game controller is attached to main body apparatus 3 and a state in which the game controller is not attached to main body apparatus 3.

As shown in FIG. 3, while the game controller is attached to main body apparatus 3, the game controller is used in such a manner that a longitudinal direction thereof extends in an upward-downward direction. As shown in FIG. 4, on the other hand, while the game controller is not attached to main body apparatus 3, the game controller is used in such a manner that the longitudinal direction thereof extends in a left-right direction (from another point of view, a direction in parallel to the ground).

In the example shown in FIG. 4, different users operate first game controller 1 and second game controller 2, respectively.

When directions (upward-downward and left-right directions) of the game controller are mentioned in the description hereafter, description will be given, with a state of use in which the game controller is not attached to main body apparatus 3 and the longitudinal direction extends in the left-right direction being defined as the reference. When directions of main body apparatus 3 and directions of information processing apparatus 1000 in which the game controller is attached to main body apparatus 3 are mentioned in the description hereafter, description will be given, with a state of use in which a direction of connection between side surfaces of main body apparatus 3 to which the game controllers are attached extends in the left-right direction being defined as the reference.

As shown in FIG. 5, while the game controller is not attached to main body apparatus 3, the game controller is used also in such a manner that the longitudinal direction thereof extends in the upward-downward direction (from another point of view, a direction perpendicular to the ground). In the example shown in FIG. 5, a single user operates both of first game controller 1 and second game controller 2. Different users may operate respective controllers.

In the following, the state of use shown in FIG. 3 is also called an integrally held state, the state of use shown in FIG. 4 is also called a horizontally held state, and the state of use shown in FIG. 5 is also called a vertically held state.

As shown in FIG. 2, first game controller 1 includes a projection 100 in an upper side surface 11, projection 100 projecting from the upper side surface. Upper side surface 11 of first game controller 1 is a side surface that extends along the longitudinal direction of first game controller 1. Projection 100 extends in the longitudinal direction of upper side surface 11. Similarly, second game controller 2 includes a projection 200 in an upper side surface 211, projection 200 projecting from the upper side surface and extending in the longitudinal direction of the upper side surface. Upper side surface 211 of second game controller 2 is a side surface that extends along the longitudinal direction of second game controller 2. Projection 200 extends in the longitudinal direction of upper side surface 211.

As shown in FIGS. 1 and 2, main body apparatus 3 is provided with a recess 310 in a main body right side surface 313. Recess 310 extends in the longitudinal direction of main body right side surface 313. Recess 310 extends along the upward-downward direction of main body right side surface 313. A main body left side surface 314 of main body apparatus 3 is provided with a recess 320. Recess 320 extends in the longitudinal direction of main body left side surface 314. Recess 320 extends along the upward-downward direction of main body left side surface 314 of main body apparatus 3. Recess 310, 320 is a recess in an elongated shape that extends along the longitudinal direction of main body right side surface 313 or main body left side surface 314.

As shown in FIG. 1, first game controller 1 is attached to main body apparatus 3 such that projection 100 is matched with recess 310. First game controller 1 is attached to main body apparatus 3 such that upper side surface 11 of first game controller 1 is opposed to main body right side surface 313 of main body apparatus 3 and the longitudinal direction of upper side surface 11 of first game controller 1 extends along the longitudinal direction of main body right side surface 313 of main body apparatus 3. Similarly, second game controller 2 is attached to main body apparatus 3 such that projection 200 is matched with recess 320. Second game controller 2 is attached to main body apparatus 3 such that upper side surface 211 of second game controller 2 is opposed to main body left side surface 314 of main body apparatus 3 and the longitudinal direction of upper side surface 211 of second game controller 2 extends along the longitudinal direction of main body left side surface 314 of main body apparatus 3.

Each of first game controller 1 and second game controller 2 includes a joystick and a set of four buttons. In attachment to main body apparatus 3, first game controller 1 is attached such that the four buttons are located above and the joystick is located below. Second game controller 2 is attached to main body apparatus 3, on the other hand, such that the joystick is located above and the four buttons are located below.

<Main Body Apparatus>

As shown in FIG. 1, a display 305 is provided on a main body front surface 315 of main body apparatus 3. Display 305 has a display surface exposed through an opening provided on main body front surface 315. Display 305 may be placed on a surface of main body front surface 315. Display 305 may be any display apparatus such as a liquid crystal display or an OLED. A touch panel may be provided on the display surface of display 305. Any touch detection method may be adopted for the touch panel. For example, an image obtained or generated by main body apparatus 3 is shown on display 305. The image may be still images or moving images.

Main body apparatus 3 includes an audio input and output terminal 301. Audio input and output terminal 301 is provided on a main body upper side surface 316 of main body apparatus 3. Audio input and output terminal 301 is, for example, a headphone jack. A headphone or a microphone can be attached to audio input and output terminal 301. Main body apparatus 3 may include a volume button adjacent to audio input and output terminal 301. The volume button is a button for giving an instruction for adjustment of a volume of sound outputted from main body apparatus 3.

Main body apparatus 3 includes a lower terminal 303. Lower terminal 303 is provided on a main body lower side surface 317 of main body apparatus 3. Lower terminal 303 may be provided on a center in the left-right direction of main body lower side surface 317. Lower terminal 303 is, for example, a terminal for communication with an external apparatus. Lower terminal 303 implements, for example, a universal serial bus (USB) connector. Main body apparatus 3 may externally be supplied with electric power through lower terminal 303. Main body apparatus 3 may output an image to the outside through lower terminal 303. When main body apparatus 3 is placed on a cradle from a side of the main body lower side surface, lower terminal 303 may be connected to a terminal of the cradle.

These components of main body apparatus 3 are by way of example. These components may be provided on another side surface of main body apparatus 3. A plurality of these components may be provided. For example, main body apparatus 3 may include an upper terminal 302 on main body upper side surface 316, in addition to lower terminal 303. Upper terminal 302 may be provided at a position displaced from a position in symmetry with respect to main body front surface 315. Main body apparatus 3 does not have to include these components. Main body apparatus 3 may include another component in addition to or instead of these components. For example, main body apparatus 3 may include a power button 307 or a storage medium slot 304 on main body upper side surface 316. Main body apparatus 3 may perform game processing by executing a game application stored in a storage medium inserted in storage medium slot 304. Main body apparatus 3 may include on a main body rear surface, a stand to allow main body apparatus 3 to stand. The stand allows main body apparatus 3 to stand on a placement surface with main body upper side surface 316 facing up. By way of example, the stand may be connected as being rotatable with respect to a main body housing 306 and may rotate away from main body housing 306 during use.

Figure 6:
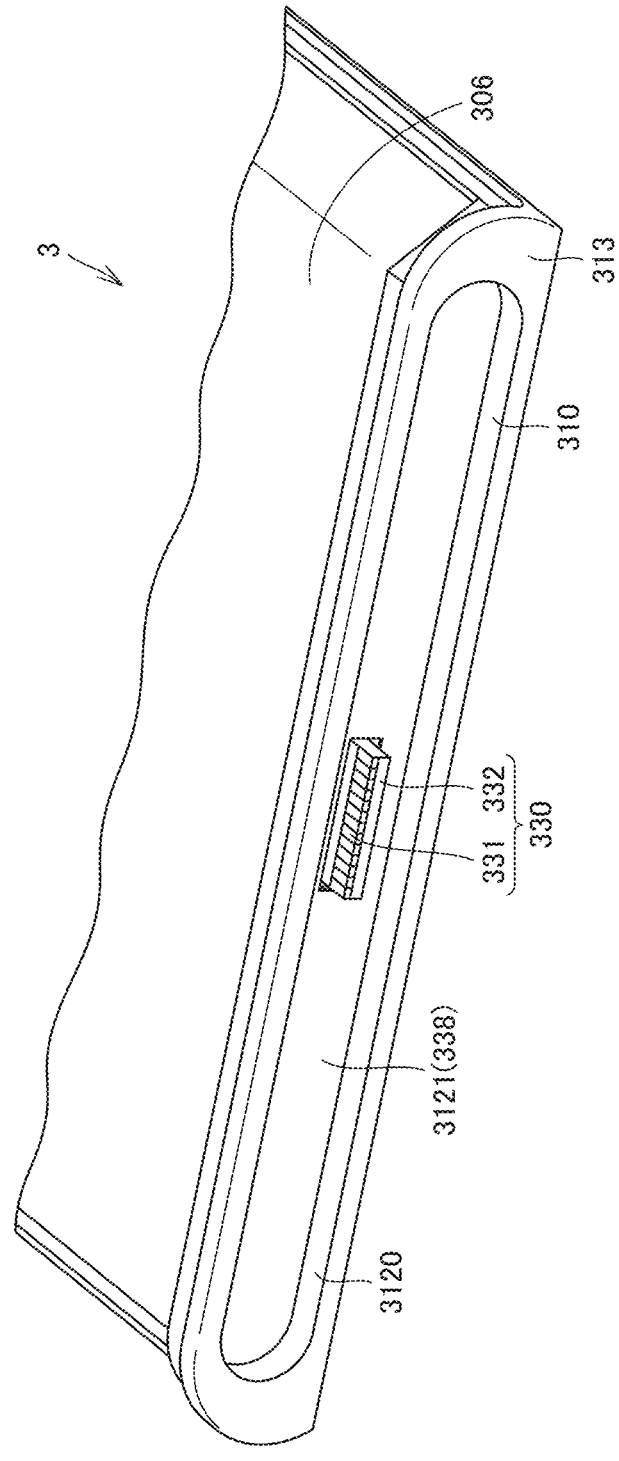
FIG. 6 shows an exemplary illustrative non-limiting drawing of a schematic perspective assembly diagram showing a configuration of a right side surface of the main body apparatus.
Figure 7:
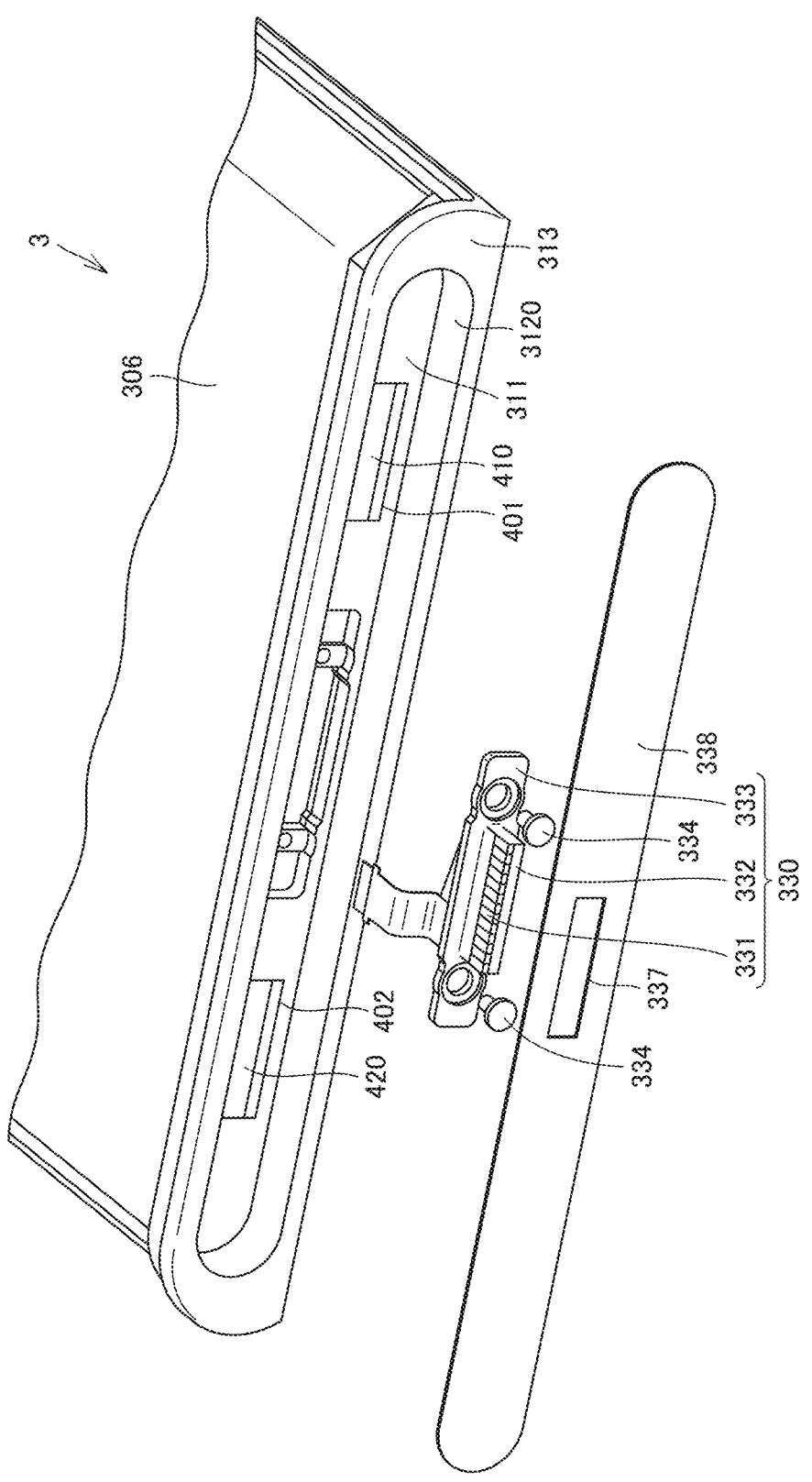
FIG. 7 shows an exemplary illustrative non-limiting drawing of a schematic perspective exploded view showing the configuration of the right side surface of the main body apparatus.

FIG. 6 is a schematic perspective assembly diagram showing a configuration of the right side surface of main body apparatus 3. FIG. 7 is a schematic perspective exploded view showing the configuration of the right side surface of main body apparatus 3. Main body apparatus 3 is similar in configuration also on a side of a left side surface.

As shown in FIG. 6, recess 310 is provided on main body right side surface 313 of main body apparatus 3. Recess 310 is a recessed portion on main body right side surface 313. Recess 310 includes a bottom surface 3121 and an inner peripheral surface 3120 that surrounds bottom surface 3121. In the present example, a portion of main body housing 306 that forms the right side surface of main body apparatus 3 is recessed to form inner peripheral surface 3120 and a base surface (a base surface 311 which will be described later) which serves as the base of the bottom surface. As a cover 338 is placed over the base surface, a surface of cover 338 forms bottom surface 3121 of recess 310. Cover 338 does not have to be provided, and in that case, a bottom surface formed by main body housing 306 defines bottom surface 3121 of recess 310.

As shown in FIG. 6, bottom surface 3121 of recess 310 extends in the longitudinal direction of main body right side surface 313. A side on a front surface side of bottom surface 3121 and a side on a rear surface side thereof are substantially linear and extend substantially in parallel. In the present embodiment, an upper area and a lower area of bottom surface 3121 decrease in width toward respective ends. More specifically, the upper area and the lower area of bottom surface 3121 decrease in width in a curved manner. The upper area and the lower area of bottom surface 3121 may linearly decrease in width. Alternatively, the upper area and the lower area of bottom surface 3121 may be constant in width. Alternatively, only one of the upper area and the lower area of bottom surface 3121 may decrease in width toward the end.

As shown in FIG. 7, main body apparatus 3 includes a first plug connector 330, cover 338, a set of shoulder screws 334, and two magnetic elements 410 and 420 provided along the longitudinal direction of recess 310. First magnetic element 410 is arranged above and second magnetic element 420 is arranged below. First magnetic element 410 is arranged in an area above a center in the longitudinal direction of main body right side surface 313 and second magnetic element 420 is arranged in an area below the center. Magnetic elements 410 and 420 may both be arranged in the area above or below. Though a material for cover 338 is not particularly limited, for example, an insulating raw material may be employed. A material for cover 338 may be, for example, a raw material that is not attracted to a magnet. For example, plastic may be employed as the material for cover 338.

Figure 8:
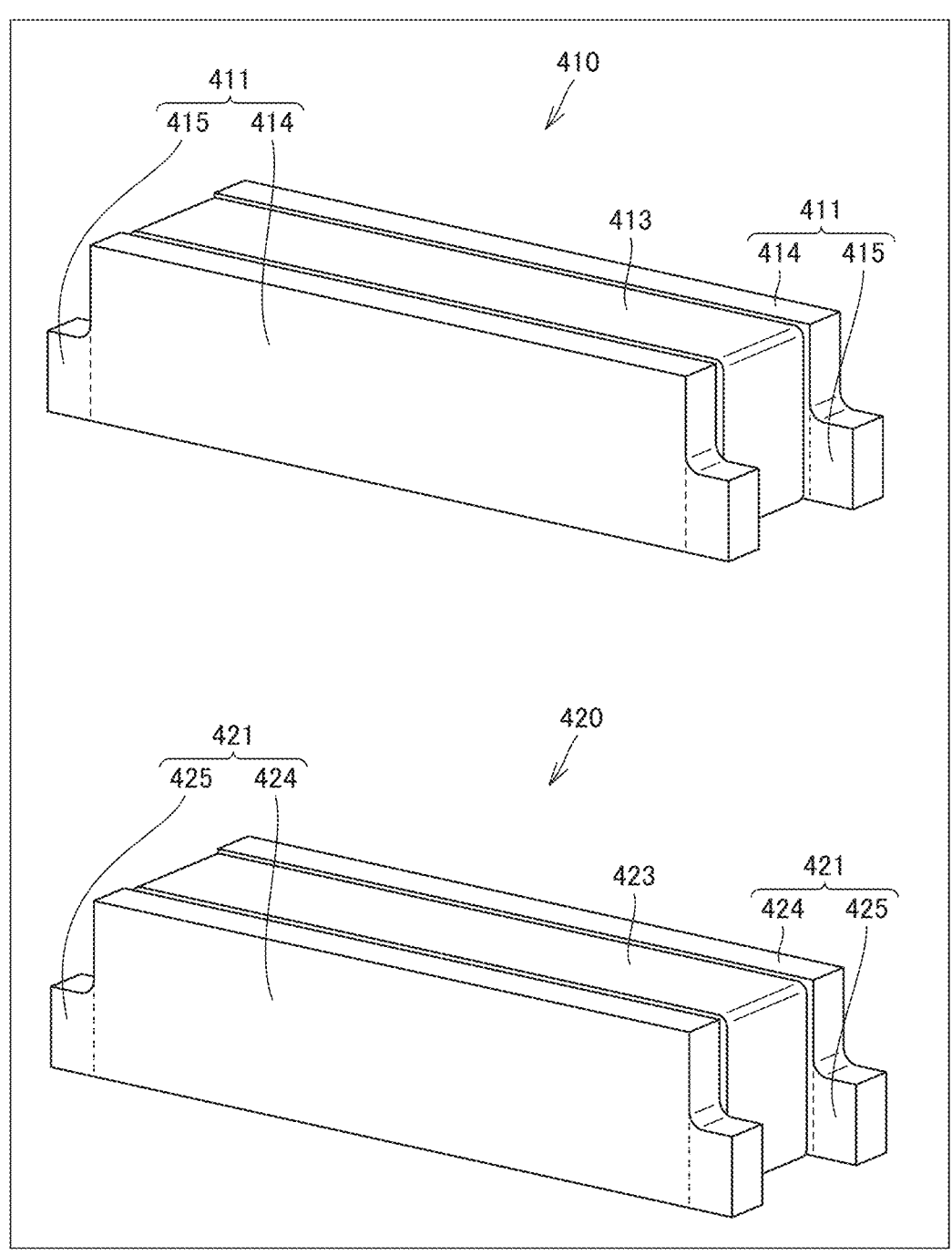
FIG. 8 shows an exemplary illustrative non-limiting drawing of a schematic perspective view showing a configuration of a first magnetic element and a second magnetic element.

FIG. 8 is a schematic perspective view showing a configuration of first magnetic element 410 and second magnetic element 420. The magnetic element is a component attracted to a magnet by magnetic force. The magnetic element includes a component comprised of a magnet or a raw material which is not a magnet but is attracted to the magnet such as a soft magnetic material. As shown in FIG. 8, first magnetic element 410 includes a pair of yokes 411 and a magnet 413. In other words, first magnetic element 410 includes a magnet. A material for magnet 413 is not particularly limited. Magnet 413 is, for example, a neodymium magnet. A material for yoke 411 is not particularly limited. For example, a soft magnetic material is employed as a material for yoke 411, and for example, iron is employed. In another manner, magnetic element 410 may include magnet 413 without including yoke 411. Alternatively, magnetic element 410 may include a component comprised of a soft magnetic material without including magnet 413.

Magnet 413 lies between a pair of yokes 411. Magnet 413 and the pair of yokes 411 are fixed, for example, with an adhesive. Magnet 413 is in a parallelepiped shape. Each of the pair of yokes 411 includes a main body portion 414 and a pair of flange portions 415. Magnet 413 is sandwiched between main body portions 414. One of the pair of flange portions 415 projects from a lower area of a surface at one end of main body portion 414 (more specifically, a surface at one end in the longitudinal direction of first main body portion 414). The other one of the pair of first flange portion 415 projects from a lower area of the surface at the other end of first main body portion 414 (more specifically, the surface at the other end in the longitudinal direction of first main body portion 414). Second magnetic element 420 is also similarly configured.

As shown in FIG. 7, a portion of main body housing 306 that forms the right side surface is recessed to form base surface 311 that serves as the base of the bottom surface of recess 310 and inner peripheral surface 3120. As described above, the surface of cover 338 placed on base surface 311 defines bottom surface 3121. Cover 338 is fixed to base surface 311. Though a method of fixing cover 338 is not particularly limited, for example, cover 338 may be fixed to base surface 311 with an adhesive. Alternatively, cover 338 may be fixed to base surface 311 with an adhesive tape. In an example where the adhesive or the adhesive tape is used, a raw material therefor is not limited. For example, an insulating raw material or a raw material that is not attracted to a magnet may be applicable. In the present example, base surface 311 and cover 338 are substantially the same in shape. In another manner, base surface 311 and cover 338 may be different in shape. By way of example, cover 338 may be in such a shape as covering at least first magnetic element 410, second magnetic element 420, a first hole 401, and a second hole 402. Cover 338 may include a plurality of cover components, rather than being comprised of a single cover component. Though inner peripheral surface 3120 surrounds the entire periphery of base surface 311 in the present example, it does not have to surround the entire periphery. Inner peripheral surface 3120 is contiguous to base surface 311 and main body right side surface 313. Inner peripheral surface 3120 has an upper end (a right side end of main body apparatus 3) connected to main body right side surface 313. From another point of view, recess 310 is recessed relative to main body right side surface 313. In the present example, inner peripheral surface 3120 is generally in a shape of an outer peripheral surface of a frustum of a pyramid, with bottom surface 3121 being defined as an upper base side. In other words, inner peripheral surface 3120 is in a shape spreading from the bottom surface toward the upper end. As will be described later, an end area in the longitudinal direction may be rounded. From another point of view, when recess 310 is viewed from a side of the opening (that is, the right side), bottom surface 3121 and inner peripheral surface 3120 that surrounds bottom surface 3121 are seen. In another manner, inner peripheral surface 3120 may extend in parallel to the left-right direction. The shape of recess 310 is not limited to the shape of the outer peripheral surface of the frustum of the pyramid. By way of example, recess 310 may be in a shape of an outer peripheral surface of a frustum of a cone or a shape of an outer peripheral surface of a parallelepiped. An opposite side of main body apparatus 3 is also similarly configured.

Base surface 311 is provided with first hole 401 and second hole 402 for accommodation of magnetic elements 410 and 420. First hole 401 and second hole 402 are aligned in the longitudinal direction of main body right side surface 313. In other words, first hole 401 and second hole 402 are aligned in the longitudinal direction of base surface 311. Though details will be described later, first game controller 1 also includes a magnetic element. As magnetic elements on a side of first game controller 1 are attracted to magnetic elements 410 and 420, the game controller is attached to main body apparatus 3. As the entirety or a part of magnetic elements 410 and 420 enter respective holes 401 and 402 from the inside of main body housing 306, the magnetic elements on the side of first game controller 1 attached to main body apparatus 3 come closer to magnetic elements 410 and 420 and magnetic force for attraction can be strengthened.

A portion of first magnetic element 410 above flange portion 415 is accommodated in first hole 401. A top surface of first magnetic element 410 is substantially flush with base surface 311. A portion of first magnetic element 410 not accommodated in first hole 401 (that is, a portion of flange portion 415 and main body portion 414 that is located below an upper end of flange portion 415) is located in main body housing 306. A length of the portion of first magnetic element 410 including flange portion 415 is longer than a length of an opening of first hole 401 in main body housing 306. Therefore, flange portion 415 suppresses entry of the entirety of first magnetic element 410 into first hole 401 and suppresses detachment thereof to the outside of main body housing 306. The top surface of first magnetic element 410 may be located at a position deeper than base surface 311. The top surface of first magnetic element 410 may project from base surface 311. Second magnetic element 420 is also similar.

First magnetic element 410, second magnetic element 420, first hole 401, and second hole 402 are covered with cover 338. Specifically, first magnetic element 410 and second magnetic element 420 are covered with cover 338 that defines bottom surface 3121 of recess 310. In the present example, the magnetic element is buried in the bottom of recess 310 owing to cover 338 as a manner of provision of the magnetic element at the bottom of recess 310. In another manner of provision of the magnetic element at the bottom of recess 310, the magnetic element may be arranged on bottom surface 3121 of recess 310. The magnetic element may be arranged as being exposed through an opening of a hole provided on bottom surface 3121 of recess 310 or a position deep in the hole. As first magnetic element 410, second magnetic element 420, first hole 401, and second hole 402 together with base surface 311 are covered with cover 338, for example, unintended direct attraction to first magnetic element 410 or second magnetic element 420, of an object that is attracted to a magnet or entry of such an object into first hole 401 or second hole 402 is suppressed. When such an object is attracted to first magnetic element 410 with cover 338 being interposed as well, such an object can be moved over cover 338 in a direction away from first magnetic element 410. Being sufficiently distant from first magnetic element 410, such an object can readily be moved in the direction away from cover 338.

Second magnetic element 420 is similar in configuration to first magnetic element 410. A part of second magnetic element 420 is accommodated in second hole 402 similarly to first magnetic element 410. Magnetic elements 430 and 440 provided on recess 320 in the left side surface and respective holes where magnetic elements 430 and 440 are accommodated are also similar in configuration.

As shown in FIG. 7, first plug connector 330 includes a support portion 333, a first tongue-shaped body 332 that projects from support portion 333, and a main body first terminal 331 provided along a surface of first tongue-shaped body 332. Support portion 333 and first tongue-shaped body 332 may be integrated with or separate from each other.

First plug connector 330 is provided between first magnetic element 410 and second magnetic element 420 in the longitudinal direction of main body right side surface 313 when viewed from the side of the bottom of recess 310. Therefore, main body first terminal 331 is provided between first magnetic element 410 and second magnetic element 420 in the longitudinal direction of main body right side surface 313. A tip end of first tongue-shaped body 332 (a right end of first tongue-shaped body 332) does not project from recess 310. In other words, first tongue-shaped body 332 does not project to the outside of main body right side surface 313 and is provided within recess 310. Therefore, main body first terminal 331 provided on first tongue-shaped body 332 is also provided within recess 310. In another manner, first tongue-shaped body 332 and main body first terminal 331 may project as being higher than main body right side surface 313.

First plug connector 330 is attached to base surface 311 with a set of shoulder screws 334. First plug connector 330 can slightly move with respect to base surface 311 by being attached to base surface 311 with the set of shoulder screws 334. In other words, first plug connector 330 is a floating connector. Since first plug connector 330 is the floating connector, connection of the connector is readily maintained even when first game controller 1 attached to main body apparatus 3 is slightly moved with respect to main body apparatus 3. First plug connector 330 may freely be movable around an axial direction of shoulder screw 334 or movable in the axial direction. The set of shoulder screws 334 and support portion 333 are covered with cover 338. First tongue-shaped body 332 and main body first terminal 331 are exposed through a through hole 337 provided on cover 338.

<Controller>

Figure 9:
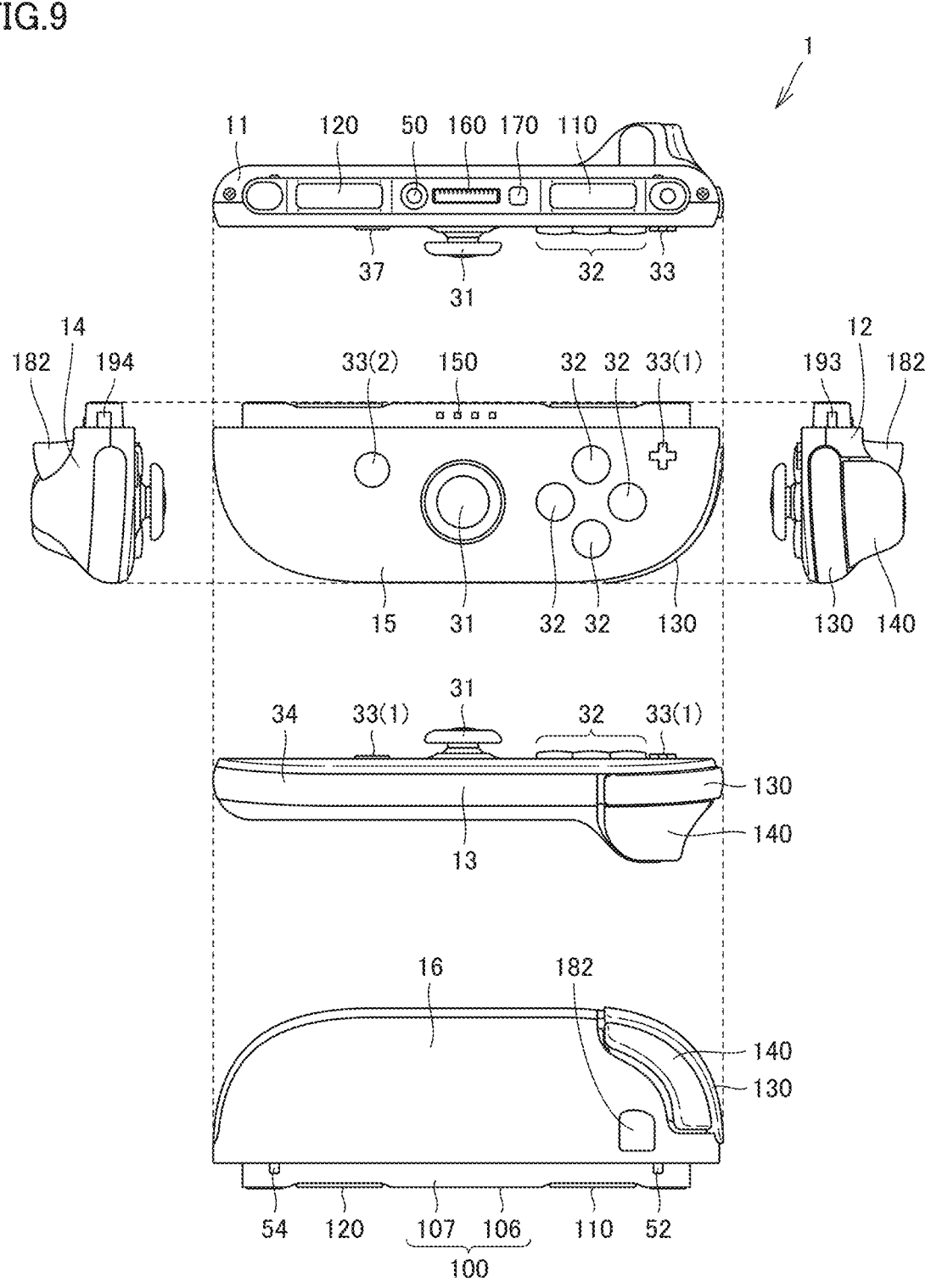
FIG. 9 shows an exemplary illustrative non-limiting drawing of a schematic six-view drawing showing a configuration in a first manner of a first game controller.

FIG. 9 is a schematic six-view drawing showing a configuration in a first manner of first game controller 1. Second game controller 2 will be described later.

As shown in FIG. 9, first game controller 1 in the present embodiment includes in a front surface thereof, a joystick 31 which represents an exemplary direction input portion, a set of four buttons 32, a +button 33 (1), and a home button 33 (2). Though the set of four buttons 32 is arranged as being aligned in a cross shape, it may be arranged in another manner. First game controller 1 includes an upper-surface button (right) 110 and an upper-surface button (left) 120, a synchronization button 50, a shoulder button (right) 130, and a Z shoulder button (right) 140. Though details will be described later, upper-surface button (right) 110, upper-surface button (left) 120, and synchronization button 50 are provided on projection 100. These are exemplary input portions and all of them do not have to be provided. First game controller 1 may include another input portion such as a touch panel or a pressure sensor instead of or in addition to these input portions.

While first game controller 1 is attached to main body apparatus 3, operation information from the input portion is transmitted to main body first terminal 331 of main body apparatus 3 through a first terminal 160 which will be described later and processed in accordance with a program by a CPU of main body apparatus 3. In a manner of use where the game controller is not attached to main body apparatus 3, operation information from the input portion is transmitted to the CPU of main body apparatus 3 through a wireless chip included in the game controller and a wireless chip included in main body apparatus 3. Information processing apparatus 1000 does not have to include first terminal 160 and main body first terminal 331, and in that case, information is transmitted through the wireless chips also while the game controller is attached to main body apparatus 3.

As shown in FIG. 9, first game controller 1 includes a front surface 15, a rear surface 16, an upper side surface 11, a right side surface 12, a lower side surface 13, and a left side surface 14. Front surface 15 is a surface opposed to a user who uses first game controller 1 in the integrally held state, the horizontally held state, and the vertically held state. Rear surface 16 is located opposite to front surface 15. Front surface 15 and rear surface 16 are each contiguous to upper side surface 11, right side surface 12, lower side surface 13, and left side surface 14.

A direction of normal to upper side surface 11 is also referred to as a first direction R1. First direction R1 is a direction in which projection 100 projects and also referred to as an upper side or a projection direction or an upward direction. Projection 100 is located on a side of first direction R1 of upper side surface 11. A direction opposite to first direction R1 is also referred to as a third direction R3. Third direction R3 is also referred to as a lower side or a downward direction. First direction R1 and third direction R3 are also collectively referred to as an upward-downward direction.

A direction toward right side surface 12 which is perpendicular to the upward-downward direction is also referred to as a second direction R2. Second direction R2 is also referred to as a right side or a right direction. A direction opposite to second direction R2 is also referred to as a fourth direction R4. Fourth direction R4 is also referred to as a left side or a left direction. Second direction R2 and fourth direction R4 are also collectively referred to as a left-right direction.

A direction normal to front surface 15 is also referred to as a fifth direction R5. Fifth direction R5 is also referred to as a front surface side or a front direction. A direction opposite to the fifth direction is also referred to as a sixth direction R6. Sixth direction R6 is also referred to as a rear surface side or a rear direction. Fifth direction R5 and sixth direction R6 are also collectively referred to as a front-rear direction.

As described above, upper side surface 11 is located on a side of the upward direction with respect to the front surface. Upper side surface 11 is a side surface that extends in the longitudinal direction of front surface 15. In the present embodiment, the longitudinal direction of front surface 15 corresponds to the left-right direction of front surface 15. Upper side surface 11 extends in the left-right direction. Lower side surface 13 is located opposite to upper side surface 11. Lower side surface 13 is located on a side of third direction R3 of upper side surface 11. Lower side surface 13 extends in the left-right direction. Right side surface 12 is a side surface that is contiguous to a right end of upper side surface 11 and extends in a direction away from upper side surface 11. An end of the right side surface distant from upper side surface 11 is contiguous to a right end of lower side surface 13. Left side surface 14 is a side surface that is contiguous to a left end of upper side surface 11 and extends in a direction away from upper side surface 11. An end of the left side surface distant from upper side surface 11 is contiguous to a left end of lower side surface 13. The right side surface is located on a side of second direction R2, of the left side surface.

As shown in FIG. 9, front surface 15 of the first controller is provided with+button 33 (1), the set of four buttons 32, joystick 31, and home button 33 (2) from the right side in the left-right direction. One set of four buttons 43 and joystick 31 are adjacent to each other. In the upward-downward direction, joystick 31 is located between an upper button and a lower button in the set of four buttons 32 in the upward-downward direction. In the left-right direction, joystick 31 is located substantially on an extension of a straight line that connects the button on the right side and the button on the left side in the set of four buttons to each other.

Joystick 31 is tiltable in directions around 360 degrees and may be tiltable in any direction including first direction R1 to fourth direction R4. Joystick 31 may be tiltable only in at least one direction. Joystick 31 may be pushed in. Joystick 31 may be slidable in each direction, instead of being tilted. Main body apparatus 3 may perform processing in accordance with a signal indicating an operation direction, in an executed program, as a result of an operation on joystick 31 by the user. The game controller may include another input portion instead of or in addition to joystick 31 as the direction input portion. For example, the game controller may include a cross-shaped key or buttons arranged in a cross shape.

Main body apparatus 3 may perform prescribed corresponding processing based on pressing down of +button 33 (1) and the set of four buttons 32 in an executed program. Main body apparatus 3 may call a home menu in response to an input on home button 33 (2).

Shoulder button (right) 130 is a button, for example, used in the integrally held state, and arranged at an upper right portion of first game controller 1 in the integrally held state. Shoulder button (right) 130 may be used in the vertically held state. Shoulder button (right) 130 includes a curved operation surface. Shoulder button (right) 130 extends in a direction away from upper side surface 11. Shoulder button (right) 130 is generally provided on a lower right portion of first game controller 1 in the horizontally held state. At least a part of shoulder button (right) 130 may be provided on right side surface 12. The operation surface of shoulder button (right) 130 is generally curved along the lower right portion of first game controller 1. Main body apparatus 3 performs prescribed processing in accordance with pressing down of the shoulder button (right).

Z shoulder button (right) 140 is, for example, a button used in the integrally held state and provided on a rear surface side of shoulder button (right) 130. Z shoulder button (right) 140 may be used also in the vertically held state. Z shoulder button (right) 140 includes a curved operation surface. Shoulder button (right) 130 extends in a direction away from upper side surface 11. Z shoulder button (right) 140 is provided generally in the lower right portion of first game controller 1 in the horizontally held state. At least a part of Z shoulder button (right) 140 may be provided on right side surface 12. At least a part of Z shoulder button (right) 140 may be provided on rear surface 16. The operation surface of Z shoulder button (right) 140 is curved generally along the lower right portion of first game controller 1. Z shoulder button (right) 140 may entirely be provided on the rear surface. Main body apparatus 3 performs prescribed processing based on pressing down of Z shoulder button (right) 140 in an executed program.

Figure 10:
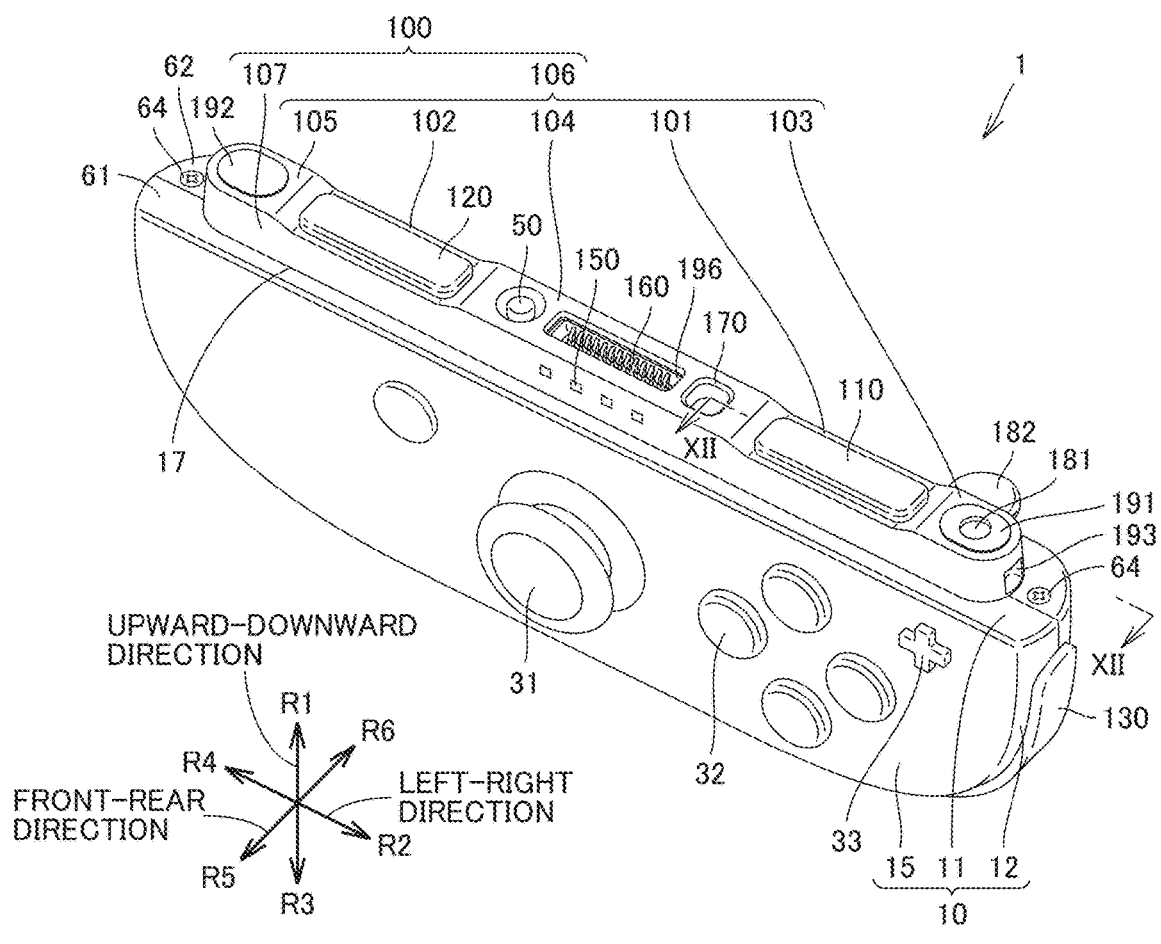
FIG. 10 shows an exemplary illustrative non-limiting drawing of a schematic perspective view showing a detailed configuration in the first manner of the first game controller.
Figure 11:
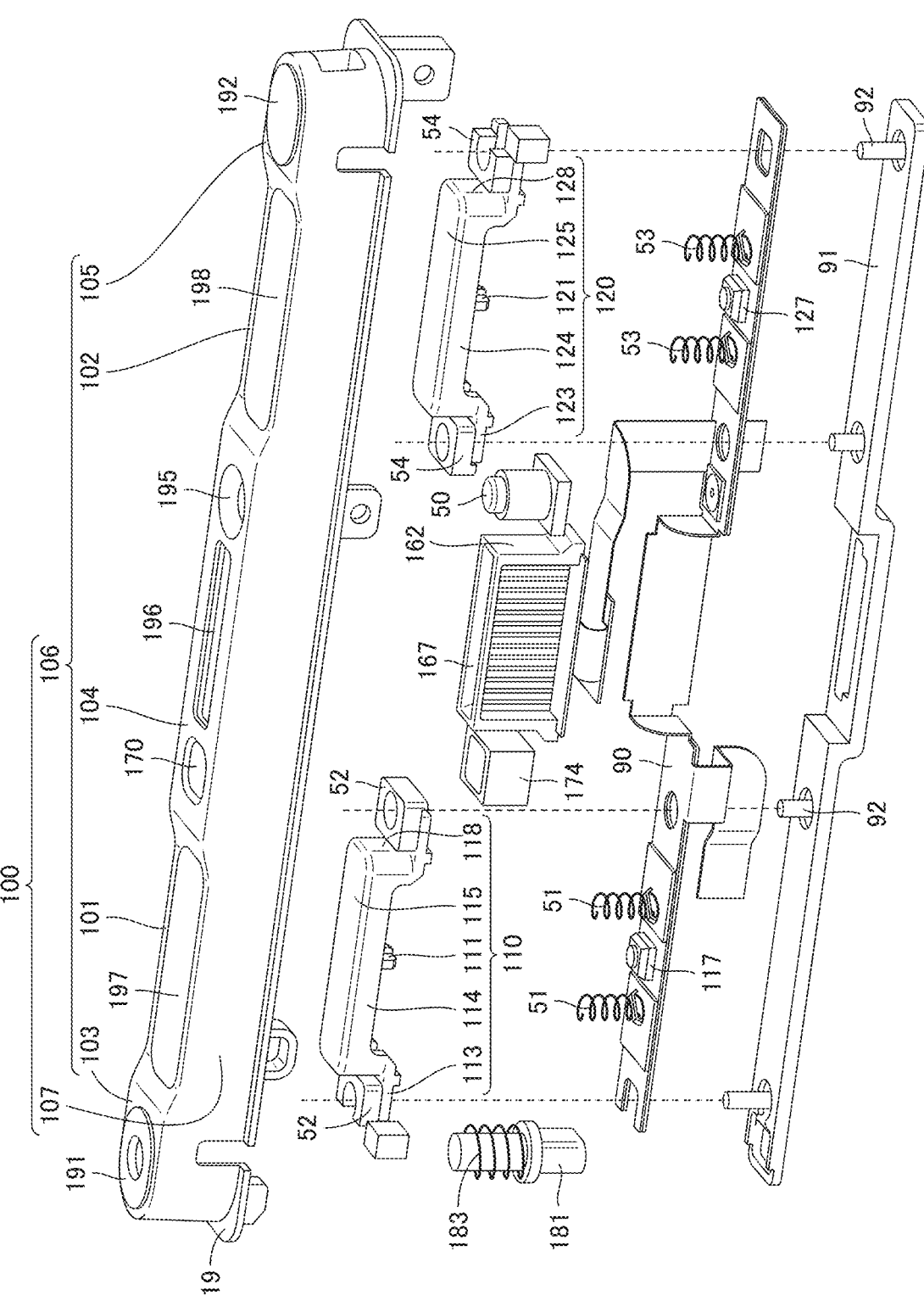
FIG. 11 shows an exemplary illustrative non-limiting drawing of a schematic perspective exploded view including a projection.

FIG. 10 is a schematic perspective view showing a detailed configuration in the first manner of first game controller 1. FIG. 11 is a schematic perspective exploded view including projection 100.

As shown in FIG. 10, first game controller 1 includes, in addition to already-described features, a light emission portion 150 that gives a notification of an identification number of the game controller, first terminal 160 configured to be connected to main body first terminal 331 of main body apparatus 3, a mouse sensor opening 170 that guides light to a mouse operation sensor 174 which will be described later, a mouse skate 191, a mouse skate 192, and an operation portion 182 that implements a removal mechanism for removal of projection 100 from main body apparatus 3.

As shown in FIG. 10, projection 100 projects upward from upper side surface 11. From another point of view, projection 100 projects in first direction R1 from upper side surface 11. Projection 100 extends along the longitudinal direction of upper side surface 11 (that is, a length in the longitudinal direction is longer than lengths in other directions). Projection 100 does not have to extend in a manner as exactly coinciding with the longitudinal direction of upper side surface 11 but should only extend along the longitudinal direction. In other words, the longitudinal direction of projection 100 extends along the longitudinal direction of upper side surface 11. The longitudinal direction of projection 100 does not have to exactly coincide with the longitudinal direction of upper side surface 11. Projection 100 is a projection in an elongated shape that extends along the longitudinal direction of upper side surface 11. Projection 200 of second controller 2 is also similar in configuration to projection 100. The configuration of projection 100 of first controller 1 will mainly be described below.

Projection 100 includes a top surface (which is also referred to as a top surface 106 below) and a peripheral surface (which is also referred to as an outer peripheral surface 107 below) that extends downward from the top surface. Top surface 106 is distant from upper side surface 11. Outer peripheral surface 107 is provided between top surface 106 and upper side surface 11 and extends from top surface 106 to upper side surface 11. Outer peripheral surface 107 is contiguous to top surface 106 as surrounding an outer edge of top surface 106. Top surface 106 extends along the longitudinal direction of upper side surface 11. Projection 100 extends along the longitudinal direction of upper side surface 11 when viewed in a top surface 106 direction. A length in the left-right direction of top surface 106 is longer than a length in the front-rear direction of top surface 106. A surface of top surface 106 does not have to be planar as a result of graining, or may be planar.

In the present example, projection 100 is in a shape of a frustum of a pyramid decreasing in cross-section toward top surface 106. An end area in the longitudinal direction may be rounded as will be described later. From another point of view, when projection 100 is viewed from a side of top surface 106 (that is, an upper side), top surface 106 and outer peripheral surface 107 that surrounds top surface 106 are seen. The shape of projection 100 is not limited to the shape of the frustum of the pyramid. By way of example, projection 100 may be in a shape of a frustum of a cone or a parallelepiped.

A length in the left-right direction of projection 100 (that is, the length in the longitudinal direction of projection 100) may be, for example, at least two times or at least five times as long as the length in the front-rear direction of projection 100. The length in the left-right direction of projection 100 may be, for example, at least fifty percent or at least seventy percent as long as the length in the left-right direction of upper side surface 11. The length in the left-right direction of projection 100 may be, for example, at most twenty-five times or at most fifteen times as long as the length in the front-rear direction of projection 100.

Increase in length in the left-right direction of projection 100 can lead to increase in length in the left-right direction of top surfaces (operation surfaces) of upper button (right) 110 and upper button (left) 120 and better operability. Arrangement of mouse sensor opening 170, mouse skate 191, mouse skate 192, and the like on the top surface of projection 100 can also be facilitated.

As shown in FIG. 10, projection 100 lies between a front-surface-side housing 61 and a rear-surface-side housing 62 that form a controller housing 10. Upper side surface 11 is provided with a housing opening 17 defined by an end surface of front-surface-side housing 61 and an end surface of rear-surface-side housing 62. Projection 100 projects through housing opening 17 from the inside of controller housing 10.

As shown in FIG. 11, projection 100 includes a projection flange 19. Projection flange 19 extends outward (more specifically, in the left-right direction and the front-rear direction) from a lower end of a wall portion that defines outer peripheral surface 107. An area above projection flange 19 of projection 100 is exposed through housing opening 17. A lower area including projection flange 19 of projection 100 is located in controller housing 10. Projection flange 19 functions as a stopper that prevents projection 100 from coming off. In another manner, projection 100 may be comprised of a plurality of components. In yet another manner, projection 100 may be a part of controller housing 10. For example, projection 100 may be formed from at least one of front-surface-side housing 61 and rear-surface-side housing 62.

Projection 100 is configured to be matched with recess 310 in the front direction of the recess (a right direction of main body apparatus 3). The shape of projection 100 is configured as being compatible with the shape of recess 310. From another point of view, the shape of top surface 106 and outer peripheral surface 107 of the projection is compatible with the shape of bottom surface 3121 and inner peripheral surface 3120 of recess 310. While first game controller 1 is attached to main body apparatus 3, top surface 106 is opposed to bottom surface 3121 as abutting thereon or in proximity thereto and outer peripheral surface 107 is opposed to inner peripheral surface 3120 as abutting thereon or in proximity thereto. Therefore, for example, when the user attaches first game controller 1 to main body apparatus 3, first game controller 1 is guided to an appropriate attachment position. For example, position displacement of first game controller 1 attached to main body apparatus 3 in the upward-downward direction or the front-rear direction in main body apparatus 3 is suppressed. By way of example, even when force is applied to the game controller in the front-rear direction or the upward-downward direction with an operation input by the user in the integrally held state, great position displacement of the game controller from main body apparatus 3 is suppressed.

Projection 100 and recess 310 do not have to exactly coincide with each other. For example, in the present example, the shape of projection 100 and the shape of recess 310 do not exactly coincide with each other. For example, in the present embodiment, an angle of inclination of outer peripheral surface 107 with respect to top surface 106 is different from an angle of inclination of inner peripheral surface 3120 with respect to bottom surface 3121. Specifically, inclination of outer peripheral surface 107 with respect to top surface 106 is smaller than inclination of inner peripheral surface 3120 with respect to bottom surface 3121. A clearance in matching of projection 100 with recess 310 is thus produced and there is a sufficient margin for an angle of approach. The inclination of outer peripheral surface 107 with respect to top surface 106 may be the same as the inclination of inner peripheral surface 3120 with respect to bottom surface 3121. While first game controller 1 is attached to main body apparatus 3, top surface 106 and bottom surface 3121 do not have to always be in contact with each other, or may always be in contact with the same, and outer peripheral surface 107 and inner peripheral surface 3120 do not have to always be in contact with each other, or may always be in contact with the same.

As shown in FIGS. 10 and 11, projection 100 decreases in width in the front-rear direction toward the longitudinal end. From another point of view, in an area including at least the end in the longitudinal direction (which is called an end area below), projection 100 has top surface 106 decreasing in width toward the end. By way of example, the longitudinal end of projection 100 is rounded. Therefore, when first game controller 1 is attached obliquely to main body apparatus 3 (that is, with upper side surface 11 (the side surface where projection 100 is located) of first game controller 1 being inclined with respect to the right side surface of main body apparatus 3, first game controller 1 is inserted into recess 310 from a narrow end, which facilitates attachment of first game controller 1. Projection 100 may include an expanding area increasing in width in the front-rear direction, in an area other than the end area in the longitudinal direction. Only one of longitudinal ends of first projection 100 (for example, only an end located below at the time of attachment) may be rounded.

As shown in FIGS. 9 to 11, outer peripheral surface 107 of projection 100 includes a first engagement hole 193 and a second engagement hole 194 in respective longitudinal end surfaces. First engagement hole 193 is provided on a first end surface of projection 100. Second engagement hole 194 is provided on a second end surface of projection 100. First engagement hole 193 is different in shape from second engagement hole 194. In the front-rear direction, first engagement hole 193 may be different in length from second engagement hole 194. In the upward-downward direction, first engagement hole 193 may be different in length from second engagement hole 194.

A not-shown peripheral device is removably attachable to first game controller 1. Examples of the peripheral device include a strap attachment formed from a strap wrapped around the wrist during use of first game controller 1 and a housing to which the strap is connected. Such a peripheral device is provided with a recess similar to recess 310 in main body apparatus 3. A magnetic element may be provided on the recess. According to such a configuration, the peripheral device is attached to first game controller 1 (similarly to main body apparatus 3). An engagement element corresponding to first engagement hole 193 is provided on an inner peripheral surface at one end in the longitudinal direction of the recess of the peripheral device and/or an engagement element corresponding to second engagement hole 194 is provided on an inner peripheral surface at the other end, to thereby firmly attach the peripheral device to first game controller 1. The peripheral device does not have to include the magnetic element, and in that case, attachment can be achieved with the use of the engagement hole and the engagement element.

Engagement holes 193 and 194 are located on the respective end surfaces in the longitudinal direction. Therefore, when first game controller 1 is obliquely inserted into the recess of the peripheral device from the side of engagement holes 193 and 194, the peripheral device can readily be attached to first game controller 1 while the engagement element and the engagement hole are engaged with each other. In particular, in an example where the longitudinal end of projection 100 is rounded, insertion into the recess from the longitudinal end is easy. Difference in shape between first engagement hole 193 and second engagement hole 194 can permit attachment only in a prescribed direction (or can make attachment in the other direction difficult) depending on the shape of the engagement element on the side of a peripheral apparatus. First engagement hole 193 and second engagement hole 194 may be identical in shape. First game controller 1 may include only one of first engagement hole 193 and second engagement hole 194. In another manner, first game controller 1 does not have to include an engagement hole either, or may include an engagement element. Though main body apparatus 3 does not include an engagement element in the present embodiment, main body apparatus 3 may include an engagement element in another manner.

As shown in FIGS. 10 and 11, upper-surface button (right) 110 and upper-surface button (left) 120 are provided on projection 100. Upper-surface button (right) 110 and upper-surface button (left) 120 are buttons to be pressed down by the user and they are components moved downward by the pressing-down operation. A ground connection portion 51 is connected under upper-surface button (right) 110. A tact switch 117 is provided under upper-surface button (right) 110. As upper-surface button (right) 110 is moved downward by the pressing-down operation by the user, tact switch 117 is pressed down by upper-surface button (right) 110. Upper-surface button (right) 110 and tact switch 117 form a button switch. Upper-surface button (left) 120 and a tact switch 127 form a button switch.

Upper-surface button (right) 110 is exposed through a first opening 197 provided on top surface 106. Exposed portions (110 and 120 in FIG. 9) of upper-surface buttons 110 and 120 each form an operation portion to be pressed down by the user. A ground connection portion 53 is connected under upper-surface button (left) 120. Tact switch 127 is provided under upper-surface button (left) 120. Tact switch 127 is pressed down by upper-surface button (left) 120. On signals from tact switch 117 and tact switch 127 are transmitted to main body apparatus 3 and processing in accordance with pressing-down of upper-surface button (right) 110 and upper-surface button (left) 120 is performed in an executed program.

Synchronization button 50 is provided on projection 100. Synchronization button 50 is pressed down by the user. Synchronization button 50 is provided between upper-surface button (right) 110 and upper-surface button (left) 120 in the longitudinal direction of projection 100. More specifically, synchronization button 50 is provided between first terminal 160 and upper-surface button (left) 120 in the longitudinal direction of projection 100. Synchronization button 50 may be used for an instruction for setting processing relating to wireless communication between first game controller 1 and main body apparatus 3.

First game controller 1 includes a terminal accommodation portion 167. First terminal 160 is provided along an inner peripheral surface of terminal accommodation portion 167. First terminal 160 extends along the upward-downward direction. Top surface 106 is provided with a terminal opening 196. Terminal accommodation portion 167 communicates with terminal opening 196. In other words, terminal accommodation portion 167 opens at top surface 106. Therefore, first terminal 160 can be accessed from the outside of top surface 106.

Terminal opening 196 is provided on top surface 106, between upper-surface button (right) 110 and upper-surface button (left) 120. Therefore, terminal accommodation portion 167 opens at top surface 106 between upper-surface button (right) 110 and upper-surface button (left) 120. First terminal 160 is provided between upper-surface button (right) 110 and upper-surface button (left) 120 in the longitudinal direction of projection 100. First terminal 160 should only at least partially be located between upper-surface button (right) 110 and upper-surface button (left) 120 in the left-right direction, and does not have to be located between upper-surface button (right) 110 and upper-surface button (left) 120 in the front-rear direction and the upward-downward direction. From another point of view, the terminal is provided between upper-surface button (right) 110 and upper-surface button (left) 120 when viewed in the top surface direction of projection 100. First terminal 160 is provided on projection 100. At least an upper end of first terminal 160 is arranged as high as or below top surface 106, or arranged below top surface 106, in the projection direction of projection 100. The upper end of first terminal 160 may be provided between top surface 106 and upper side surface 11. A lower end of first terminal 160 may be arranged under upper side surface 11, that is, in controller housing 10.

Mouse operation sensor 174 is provided in an accommodation portion that opens through mouse sensor opening 170 provided on top surface 106. Mouse sensor opening 170 is provided between upper-surface button (right) 110 and upper-surface button (left) 120 in the longitudinal direction of projection 100. More specifically, mouse sensor opening 170 is provided between first terminal 160 and upper-surface button (right) 110 in the longitudinal direction of projection 100.

Light emission portion 150 is provided on outer peripheral surface 107 of projection 100. More specifically, light emission portion 150 is provided on the front surface side of outer peripheral surface 107. From another point of view, an area of outer peripheral surface 107 where light emission portion 150 is provided faces the front surface side. When the user views front surface 15 of first game controller 1, the user can visually recognize light from light emission portion 150. Light emission portion 150 typically allows emission of light emitted by an LED to the outside.

Light emission portion 150 can notify the user of prescribed information. Light emission portion 150 may show to the user, information for identification of each game controller when main body apparatus 3 communicates with a plurality of game controllers. Light emission portion 150 may show another type of information to the user. The number of light emission portions 150 is not particularly limited, and for example, four light emission portions 150 are provided. In the present embodiment, four light emission portions 150 are arranged as being aligned in the left-right direction. For example, among four light emission portions 150, light emission portion 150 in a portion corresponding to an identification number provided to a game controller may be turned on, or light emission portion(s) 150 in number corresponding to the identification number may be turned on.

Light emission portion 150 is provided between upper-surface button (right) 110 and upper-surface button (left) 120 in the longitudinal direction of projection 100. Light emission portion 150 is provided between synchronization button 50 and mouse sensor opening 170 in the longitudinal direction of projection 100. Light emission portion 150 is provided at a position superimposed on first terminal 160 in the longitudinal direction of projection 100. From another point of view, when viewed from the front surface side, light emission portion 150 is located under terminal opening 196.

On top surface 106 of projection 100, a first mouse skate 191 and a second mouse skate 192 which are mouse skates are placed. A height of a top surface of each of first mouse skate 191 and second mouse skate 192 from upper side surface 11 is higher than a height of top surface 106 of projection 100 from upper side surface 11. From another point of view, mouse skates 191 and 192 raise the height of the top surface of projection 100. Mouse skates 191 and 192 do not have to be provided.

First game controller 1 can be used as a mouse by being placed in such a manner that the top surface of projection 100 is opposed to a grounding surface, for example, a desktop. At this time, mouse skate 191 and mouse skate 192 themselves come in contact with the grounding surface to suppress direct contact with the grounding surface, of a portion of top surface 106 of projection 100 where the mouse skate is not provided. The top surfaces of mouse skate 191 and mouse skate 192 come in contact with bottom surface 3121 of recess 310 when first game controller 1 is attached to main body apparatus 3.

Regarding the height from upper side surface 11, the height of the top surfaces of mouse skate 191 and mouse skate 192 is equal to or higher than a highest height of top surface 106 of projection 100. From another point of view, the top surfaces of mouse skate 191 and mouse skate 192 are located at an uppermost position in first game controller 1. Mouse skate 191 is not particularly limited in shape, and it may be, for example, in a circular shape, an elliptical shape, or a rectangular shape. Mouse skate 191 may be provided with a through hole. Mouse skate 191 and mouse skate 192 may be the same or different in shape.

In the longitudinal direction of projection 100, mouse skate 191 is located closer to right side surface 12 than upper-surface button (right) 110. In the longitudinal direction of projection 100, upper-surface button (right) 110 is located between first terminal 160 and mouse skate 191. More specifically, in the longitudinal direction of projection 100, upper-surface button (right) 110 is located between mouse sensor opening 170 and mouse skate 191.

In the longitudinal direction of projection 100, mouse skate 192 is located closer to left side surface 14 than upper-surface button (left) 120. In the longitudinal direction of projection 100, upper-surface button (left) 120 is located between first terminal 160 and mouse skate 192. More specifically, in the longitudinal direction of projection 100, upper-surface button (left) 120 is located between synchronization button 50 and mouse skate 192.

In first game controller 1, upper-surface button (right) 110 and upper-surface button (left) 120 are arranged in symmetry. By way of example, upper-surface button (right) 110 and upper-surface button (left) 120 are arranged in symmetry with respect to the center in the left-right direction of controller housing 10. By way of example, upper-surface button (right) 110 and upper-surface button (left) 120 are arranged in symmetry with respect to the center in the left-right direction of upper side surface 11. By way of example, upper-surface button (right) 110 and upper-surface button (left) 120 are arranged in symmetry with respect to the center in the left-right direction of projection 100. By way of example, upper-surface button (right) 110 and upper-surface button (left) 120 are arranged in symmetry with respect to the center in the left-right direction of terminal opening 196. In the present embodiment, the center of controller housing 10, the center of upper side surface 11, the center of projection 100, and the center of terminal opening 196 coincide in the left-right direction. In another manner, positions of these centers may all be different from one another, or a position of at least one of them may be different.

Figure 12:
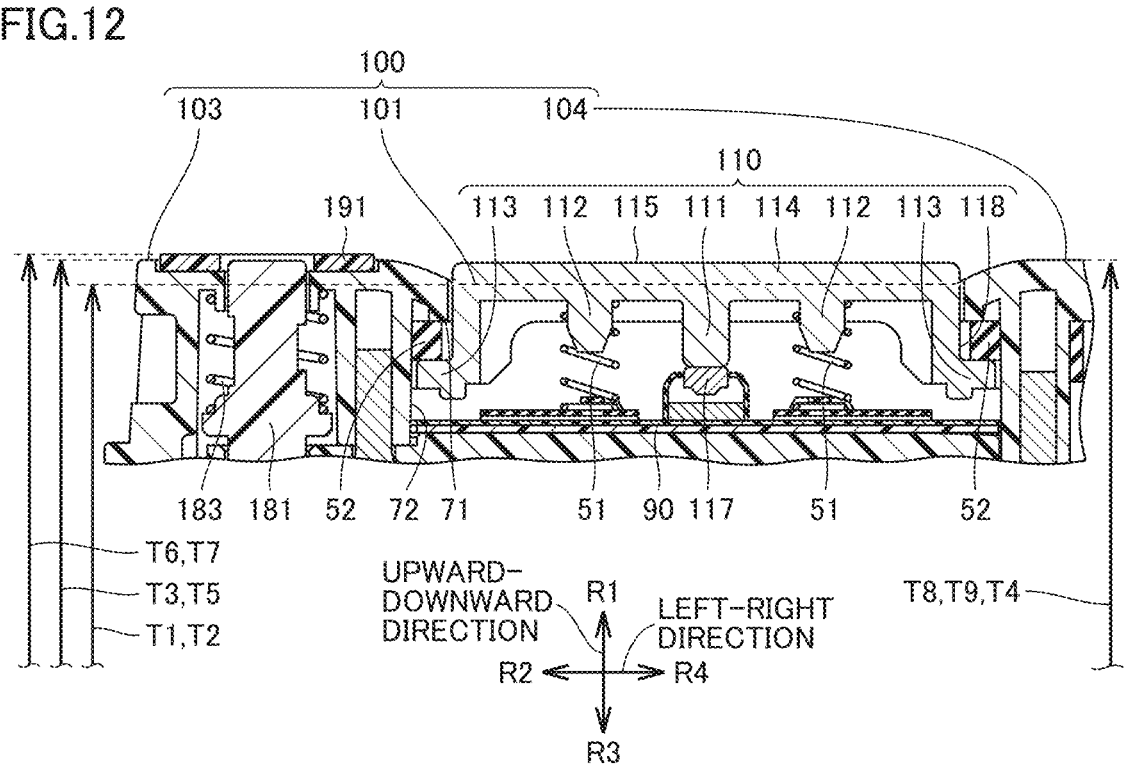
FIG. 12 shows an exemplary illustrative non-limiting drawing of a schematic cross-sectional view along the line XII-XII in FIG. 10.

FIG. 12 is a schematic cross-sectional view along the line XII-XII in FIG. 10. A structure of upper-surface button (right) 110 and surroundings will be described in detail below. In the present embodiment, a structure of upper-surface button (left) 120 and surroundings and the structure of upper-surface button (right) 110 and the surroundings are substantially in symmetry in the left-right direction.

As shown in FIG. 12, a portion of upper-surface button (right) 110 that is exposed from the top surface of projection 100 forms an operation surface 115 which is a surface operated by the user. Upper-surface button (right) 110 includes a main body portion 114 including operation surface 115, a sidewall 118, a flange 113, a first protruding portion 111, and a second protruding portion 112. Operation surface 115 extends along the longitudinal direction of projection 100 at top surface 106 of projection 100. In other words, the longitudinal direction of operation surface 115 extends in the left-right direction. From another point of view, the longitudinal direction of operation surface 115 coincides with the longitudinal direction of projection 100.

In the present embodiment, upper-surface button (right) 110 is comprised of a single component and the entirety thereof is comprised of a raw material which is not a magnet but is attracted to the magnet. A material for upper-surface button (right) 110 is not particularly limited, and it may be comprised of a soft magnetic material. For example, iron may be adopted as the material for upper-surface button (right) 110, and by way of example, steel plate cold commercial (SPCC) may be adopted. The material for upper-surface button (right) 110 may contain iron. By way of example, iron to which silicon and/or nickel is added may be adopted as the material for upper-surface button (right) 110. By way of example, upper-surface button (right) 110 may be comprised of a single component made of a resin-molded soft magnetic material.

In another manner, upper-surface button (right) 110 may be comprised of a magnet or a combination of a magnet and a soft magnetic material.

In yet another manner, only a part of upper-surface button (right) 110 may be comprised of a soft magnetic material or a magnet. In this case, at least a portion of projection 100 exposed from top surface 106 may be comprised of a soft magnetic material or a magnet. Alternatively, at least a portion that forms operation surface 115 may be comprised of a soft magnetic material or a magnet. Upper-surface button (right) 110 does not have to include a magnet and only a part thereof may be comprised of a soft magnetic material.

In another manner, upper-surface button (right) 110 may be comprised of a plurality of components and at least one of the components may be comprised of a soft magnetic material or a magnet. In this case, the plurality of components that make up upper-surface button (right) 110 are fixed to one another by such a method as bonding or caulking, and movable in an integrated manner. At least a component exposed from top surface 106 of projection 100 among the plurality of components may be comprised of a soft magnetic material or a magnet. Alternatively, a component that forms operation surface 115 may be comprised of a soft magnetic material or a magnet. In another manner, a component comprised of a magnet or a soft magnetic material may be arranged on a back side of a component exposed from top surface 106 of projection 100, and the component may be moved integrally with a component exposed from top surface 106 of projection 100. Alternatively, a component comprised of a magnet or a soft magnetic material may be arranged on a back side of a component that forms operation surface 115, and may be moved integrally with the component that forms operation surface 115. In this case, the component that forms operation surface 115 does not have to be comprised of a soft magnetic material. Alternatively, a component comprised of a magnet or a soft magnetic material may be fixed to a front surface of operation surface 115. Upper-surface button (right) 110 does not have to include a magnet, may be comprised of a plurality of components, and at least one of the components may be comprised of a soft magnetic material.

By way of example, upper-surface button (right) 110 includes a first component (generally in a shape like component 110 shown in FIG. 11) including a main body portion including an operation surface, a sidewall that extends from the main body portion to the inside of the controller housing, and a flange that extends outward from the sidewall and a second component arranged such that an upper surface and a side surface thereof are surrounded by the first component (in other words, arranged on an inner side of the first component). The second component is configured to be moved integrally with the first component. A method of configuration may be bonding of the second component to the first component. For example, however, a lid may be provided at a lower end of the first component and the second component may be arranged in a space surrounded by the first component and the lid. The first component and the second component may both be comprised of a soft magnetic material or a magnet. The first component may be smaller in thickness than the second component. The first component smaller in thickness may define a shape of a portion including the operation surface, and the second component like a block by way of example for strengthening magnetic force may be arranged therein. The first component may be comprised of a non-magnetic material such as resin.

In another example, upper-surface button (right) 110 may include a first component in a hollow prismatic shape, a part of an outer peripheral surface thereof defining an operation surface, a second component arranged in the first component, and a flange component provided to extend outward from an opening in the hollow first component. The first component and the second component may both be comprised of a soft magnetic material or a magnet. The first component may be smaller in thickness than the second component. The flange component may be comprised of a non-magnetic material such as resin. The first component may be comprised of a non-magnetic material such as resin.

Remainder of the plurality of components may be comprised of a non-magnetic material or of a soft magnetic material or a magnet. Operation surface 115 of upper-surface button (right) 110 may be covered with a sheet or the like which is comprised of a non-magnetic material, or coated with a non-magnetic coating agent.

In each of manners described above, at least a part of upper-surface button (right) 110 or upper-surface button (left) 120 includes a magnet or a soft magnetic material. Thus, in attachment of first game controller 1 to main body apparatus 3, the magnet or the soft magnetic material of first game controller 1 is located near magnetic element 410 or 420 of main body apparatus 3 and hence first game controller 1 can be attached to main body apparatus 3 with strong magnetic force.

If upper-surface button 110 or 120 does not include a magnet or a soft magnetic material, a magnetic element to be attracted by magnetic force to magnetic element 410 or 420 provided in recess 310 in main body apparatus 3 should separately be provided on top surface 106 of projection 100 or upper side surface 11 of first game controller 1. In that case, a size or a position of the operation surface of upper-surface button 110 or 120 is restricted. In other words, the operation surface of upper-surface button 110 or 120 should avoid a position corresponding to magnetic element 410 or 420 provided in recess 310. As upper-surface button 110 or 120 includes the magnetic element as above, a degree of freedom in design in consideration of operability in connection with the position or the size of the operation surface of upper-surface button 110 or 120 can be enhanced.

In the present embodiment, upper-surface buttons 110 and 120 are comprised of a soft magnetic material. In other words, upper-surface buttons 110 and 120 do not include a magnet. On the other hand, magnetic elements 410 and 420 provided on main body apparatus 3 include a magnet, so that upper-surface buttons 110 and 120 are attracted to the magnetic elements. Upper-surface buttons 110 and 120 are provided on top surface 106 of projection 100. Therefore, while first game controller 1 is not attached to main body apparatus 3, upper-surface buttons 110 and 120 may be in proximity to or in contact with an object around first game controller 1. Since upper-surface buttons 110 and 120 do not include a magnet, they do not inadvertently attract an object therearound that is attracted to the magnet. Magnetic elements 410 and 420 of main body apparatus 3, on the other hand, are provided at the bottom of recess 310. Therefore, even when there is an object to be attracted to the magnet around main body apparatus 3, a distance from main body right side surface 313 to the bottom of recess 310 keeps the main body apparatus away from such an object, and unintended attraction of an object nearby is suppressed. Main body right side surface 313 around recess 310 suppresses entry of such an object into recess 310.

Operation surface 115 is the operation surface of upper-surface button (right) 110 exposed through first opening 197 and pressed down by the user. Operation surface 115 faces first direction R1. Operation surface 115 extends in the left-right direction. A length in the left-right direction of operation surface 115 may be at least ten percent or at least twenty percent as long as the length in the left-right direction of top surface 106 of projection 100. The length in the left-right direction of operation surface 115 may be at least ten percent or at least twenty percent as long as the length in the left-right direction of upper side surface 11 of projection 100.

As shown in FIG. 12, tact switch 117 is provided below first protruding portion 111. Tact switch 117 is arranged on a flexible printed circuit 90 (which is also called an FPC 90 below). An upper portion of tact switch 117 is a leaf spring.

While upper-surface button (right) 110 is not pressed down by the user, first protruding portion 111 is supported by tact switch 117 from below. When the user presses down upper-surface button (right) 110, upper-surface button (right) 110 is moved downward from an initial position. First protruding portion 111 of upper-surface button (right) 110 moved downward presses down the upper portion of tact switch 117. The upper portion of tact switch 117 is pressed down to deform as sinking downward. A switch is thus turned on in the tact switch. When the user removes his/her hand from upper-surface button (right) 110, the upper portion of tact switch 117 returns to an original shape. As the upper portion of tact switch 117 returns to the original shape, first protruding portion 111 is pushed back upward. Therefore, upper-surface button (right) 110 is moved to the initial position. In other words, when upper-surface button (right) 110 is pressed down, tact switch 117 biases upper-surface button (right) 110 in a direction opposite to a direction of pressing-down. Tact switch 117 may bias upper-surface button (right) 110 in the direction opposite to the direction of pressing-down also while upper-surface button (right) 110 is not pressed down.

In another manner, upper-surface button (right) 110 may be biased upward by a biasing body such as a spring. In other words, upper-surface button (right) 110 may be distant from tact switch 117 by being biased upward by the biasing body such as a spring at least when it is pressed down by the user (also when it is not pressed down by the user). In another manner, a rubber switch may be employed instead of tact switch 117.

Second protruding portion 112 protrudes in third direction R3 from the rear surface of main body portion 114. The number of second protruding portions 112 is not particularly limited. In the present embodiment, two second protruding portions 112 are provided with first protruding portion 111 lying therebetween in the left-right direction. A ground electrode is provided on FPC 90 below second protruding portion 112. Ground connection portion 51 is provided between second protruding portion 112 and the ground electrode in the upward-downward direction. Ground connection portion 51 is conductive. A shape and a material for ground connection portion 51 are not particularly limited, and a coil spring made of iron is employed in the present embodiment. An upper end of ground connection portion 51 is in contact with the rear surface of main body portion 114 and conducts to the main body portion. A lower end of second protruding portion 112 is surrounded by ground connection portion 51 formed from the coil spring. A lower end of ground connection portion 51 is in contact with the ground electrode. A method of fixing ground connection portion 51 is not particularly limited, and may be fixed to the ground electrode by solder. The upper end of ground connection portion 51, on the other hand, does not have to be fixed to the rear surface of main body portion 114. Ground connection portion 51 may be assembled as being compressed so as to always be in contact with the rear surface of main body portion 114 even when main body portion 114 is moved up and down. Alternatively, ground connection portion 51 may be connected to a ground electrode of an electronic circuit different from FPC 90. Alternatively, ground connection portion 51 may be in contact with another area of upper-surface button (right) 110.

In the present embodiment, upper-surface button (right) 110 is soft magnetic material, comprised of iron by way of example, and hence it is conductive. Therefore, if a charged object comes in contact with upper-surface button (right) 110, a potential of upper-surface button (right) 110 may vary, which may affect an internal electronic component in projection or controller housing 10. In the present embodiment, however, the potential of upper-surface button (right) 110 attains to a ground potential owing to electrical connection of upper-surface button (right) 110 to the ground electrode through ground connection portion 51. Therefore, even when a charged object comes in contact with upper-surface button (right) 110, possibility of influence on the internal electronic component is suppressed. In the present embodiment, upper-surface button (right) 110 itself does not perform an electrical function such as transmission of a signal or supply and reception of electric power to and from the outside through upper-surface button (right) 110. In another manner, upper-surface button (right) 110 may perform such a function.

Since ground connection portion 51 is made up of the coil spring in the compressed state in the present embodiment, upper-surface button (right) 110 is biased upward by the coil spring. Since biasing force of the coil spring is weak in the present embodiment, upper-surface button (right) 110 is in contact with the upper portion of tact switch 117 at the initial position. In another manner, upper-surface button (right) 110 may be distant from tact switch 117 at the initial position by biasing force of the coil spring which is ground connection portion 51. In another manner, first game controller 1 does not have to include ground connection portion 51.

As shown in FIGS. 11 and 12, upper-surface button (right) 110 includes main body portion 114 the surface of which defines the operation surface, sidewall 118 that extends from a lower surface of main body portion 114, and flange 113 that extends outward from sidewall 118. Sidewall 118 extends into projection 100 through first opening 197.

Flange 113 extends outward from sidewall 118 in projection 100. The flange may extend outward from the lower end of sidewall 118. Flange 113 includes a flange portion that projects to the right from a right end of sidewall 118 and a flange portion that extends to the left from a left end of sidewall 118. An upper surface of flange 113 is opposed to a part of a surface of the inside of projection 100 (which is called a first inner surface 71 below) in the direction opposite to the direction of pressing-down of upper-surface button (right) 110. First inner surface 71 does not have to be an inner surface of projection 100 itself. The upper surface of flange 113 is located in the direction of pressing-down of upper-surface button (right) 110, with respect to first inner surface 71. Therefore, flange 113 performs a function to prevent upper-surface button (right) 110 from coming off, by being directly or indirectly caught by first inner surface 71.

The outer peripheral surface of sidewall 118 is opposed to a part of the surface of the inside of projection 100 (which is called a second inner surface 72 below) in the left-right direction. Second inner surface 72 does not have to be the inner surface of projection 100 itself. The outer peripheral surface of sidewall 118 is located in a direction perpendicular to the direction of pressing-down of upper-surface button (right) 110, with respect to second inner surface 72.

First game controller 1 includes a first elastically deformable body 52 between the upper surface of flange 113 and first inner surface 71. First elastically deformable body 52 is elastically deformed by application of force and elastically returns by removal of application of force. A material for first elastically deformable body 52 is not particularly limited, and for example, rubber may be employed.

First elastically deformable body 52 may be fixed to first inner surface 71. First elastically deformable body 52 may be fixed to first inner surface 71, for example, with the use of an adhesive material or by being fitted in a hole provided on first inner surface 71.

When upper-surface button (right) 110 is located at the initial position, first elastically deformable body 52 is in contact with first inner surface 71 and flange 113. At this time, upper-surface button (right) 110 may be maintained at the initial position by balancing between biasing force in the direction opposite to the direction of pressing-down by tact switch 117 or ground connection portion 51 and biasing force in the direction of pressing-down by first elastically deformable body 52. When upper-surface button (right) 110 is located at the initial position, first elastically deformable body 52 may be in contact with only one of first inner surface 71 and flange 113 or neither of them.

First elastically deformable body 52 is provided on a side close to second inner surface 72 in the left-right direction, between the outer peripheral surface of sidewall 118 and second inner surface 72. First elastically deformable body 52 is distant from sidewall 118. First elastically deformable body 52 may be in contact with second inner surface 72. First elastically deformable body 52 may be distant from second inner surface 72. In this case, an interval between second inner surface 72 and first elastically deformable body 52 in the left-right direction is smaller than an interval between sidewall 118 and first elastically deformable body 52. In another manner, first elastically deformable body 52 may be provided on a side close to sidewall 118.

Figure 13:
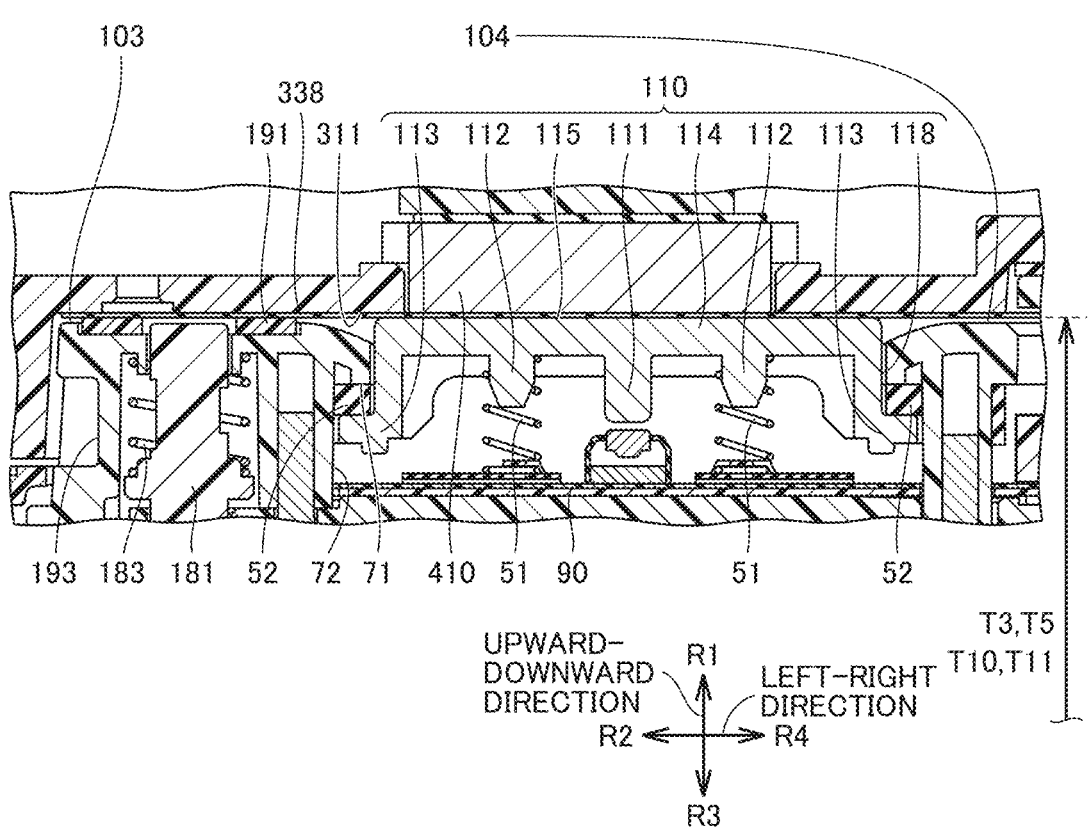
FIG. 13 shows an exemplary illustrative non-limiting drawing of a schematic cross-sectional view showing a state in which an upper-surface button (right) is attracted to the first magnetic element.

When first game controller 1 is attached to main body apparatus 3, upper-surface button (right) 110 is attracted to first magnetic element 410. FIG. 13 is a schematic cross-sectional view showing a state in which upper-surface button (right) 110 is attracted to first magnetic element 410.

As shown in FIG. 13, when first game controller 1 is attached to main body apparatus 3, upper-surface button (right) 110 and first magnetic element 410 are opposed to each other. Upper-surface button (right) 110 is comprised of a soft magnetic material in the present embodiment. Therefore, when first magnetic element 410 comes closer to upper-surface button (right) 110, upper-surface button (right) 110 is pulled by magnetic force toward first magnetic element 410. Force in the direction opposite to the direction of pressing-down is then applied to upper-surface button (right) 110. At this time, first elastically deformable body 52 provided between flange 113 and first inner surface 71 is pushed in a direction toward first inner surface 71 by flange 113 to experience elastic deformation in which the first elastically deformable body contracts in the direction opposite to the direction of pressing-down. Consequently, upper-surface button (right) 110 is moved in the direction opposite to the direction of pressing-down. In other words, upper-surface button (right) 110 is moved in the direction opposite to the direction of pressing-down from the initial position which is a position where the upper-surface button (right) has not been pressed down by the user. The direction of pressing-down is, for example, third direction R3. The direction opposite to the direction of pressing-down is, for example, first direction R1.

Upper-surface button (left) 120 is similar in configuration to upper-surface button (right) 110. Tact switch 127 is provided below upper-surface button (left) 120, and tact switch 127 is biased in the direction opposite to the direction of pressing-down at least while upper-surface button (left) 120 is pressed down. Upper-surface button (left) 120 includes a main body portion 124, a sidewall 128, and a flange 123. A second elastically deformable body 54 is arranged between an upper surface of flange 123 and a first inner surface 73. Second elastically deformable body 54 may be fixed to first inner surface 73. Second elastically deformable body 54 may be provided on a side close to a second inner surface 74 in the left-right direction, between an outer peripheral surface of sidewall 128 and second inner surface 74.

As shown in FIG. 13, when upper-surface button (right) 110 is attracted to first magnetic element 410, operation surface 115 is moved until it comes in contact with the surface of cover 338 that defines bottom surface 3121 of recess 310. As operation surface 115 is moved until it comes in contact with bottom surface 3121 of recess 310, magnetic force applied between upper-surface button (right) 110 and first magnetic element 410 becomes greater and strong attraction force can be obtained. A size and a modulus of elasticity of first elastically deformable body 52 are designed such that operation surface 115 is moved until it comes in contact with bottom surface 3121 of the recess (in the present example, moved more than that). Operation surface 115 does not have to be moved until it comes in contact with bottom surface 3121 of recess 310. As the operation surface at least comes closer to bottom surface 3121 of recess 310, magnetic force can be greater and strong attraction force can be obtained.

An example in which another component (specifically, cover 338) is interposed between upper-surface button (right) 110 and first magnetic element 410 is also defined as "attraction between upper-surface button (right) 110 and first magnetic element 410." In another manner, for example, when base surface 311 is not covered with cover 338, operation surface 115 may be in direct contact with first magnetic element 410 provided on base surface 311. Alternatively, operation surface 115 may be in contact with bottom surface 3121 while it is distant from first magnetic element 410, so as to close the opening provided on bottom surface 3121 through which first magnetic element 410 is exposed. In yet another manner, operation surface 115 may be come closer at least as compared with the initial position, although it is not in contact with cover 338.

As upper-surface button (right) 110 is moved upward, it is more proximate to first magnetic element 410 than when it is located at the initial position. Since upper-surface button (right) 110 and first magnetic element 410 are attracted to each other by magnetic force, attraction force is greater as a distance therebetween is shorter. Therefore, as upper-surface button (right) 110 is movable in the direction opposite to the direction of pressing-down, attachment between first game controller 1 and main body apparatus 3 can be securer.

While upper-surface button (right) 110 and first magnetic element 410 are attracted to each other, that is, while first game controller 1 is attached to main body apparatus 3, first elastically deformable body 52 is collapsed in the upward-downward direction. When attached first game controller 1 is removed from main body apparatus 3, upper-surface button (right) 110 is going to move away from first magnetic element 410. The upper-surface button (right) and the first magnetic element, however, are attracted to each other by magnetic force, and hence upper-surface button (right) 110 is moved further upward and first elastically deformable body 52 is further collapsed in the upward-downward direction. From another point of view, when first game controller 1 is removed from main body apparatus 3, upper-surface button (right) 110 is going to instantaneously move further upward while it maintains attraction to first magnetic element 410. Thus, stickiness or a feeling of resistance is produced at the time of removal of first game controller 1 from main body apparatus 3, and quick detachment of upper-surface button (right) 110 from the first magnet is suppressed.

When upper-surface button (right) 110 returns from the attracted position to the initial position, first elastically deformable body 52 returns to an original state and extends in the upward-downward direction. If a length in the upward-downward direction of first elastically deformable body 52 in a natural state is shorter than the distance between flange 113 and inner surface 71, first elastically deformable body 52 may be moved downward as being attached to flange 113. This is also the case when upper-surface button (right) 110 is moved in the direction of pressing-down from the initial position. When first elastically deformable body 52 comes in contact, for example, with inner surface 72 at this time, movement in the upward-downward direction of upper-surface button (right) 110 may be blocked. Since first elastically deformable body 52 is fixed to first inner surface 71 in the present embodiment, movement downward of first elastically deformable body 52 together with upper-surface button (right) 110 is suppressed. Therefore, blocking of movement in the upward-downward direction of upper-surface button (right) 110 is suppressed. When the upper surface of flange 113 is subjected, for example, to such surface treatment as mirror finishing in addition to or instead of fixing as well, attachment of first elastically deformable body 52 to flange 113 is suppressed.

When first elastically deformable body 52 is compressed in the upward-downward direction, depending on the material for first elastically deformable body 52, first elastically deformable body 52 extends in the left-right direction. At this time, first elastically deformable body 52 may come in contact with sidewall 118, which may block movement in the upward-downward direction of upper-surface button (right) 110. In the present embodiment, first elastically deformable body 52 is provided closer to second inner surface 72 than sidewall 118 in the left-right direction. Contact of first elastically deformable body 52 with sidewall 118 is thus suppressed. Therefore, blocking of movement in the upward-downward direction of upper-surface button (right) 110 is suppressed. A similar effect is achieved also for upper-surface button (left) 120 and second elastically deformable body 54.

Figure 14:
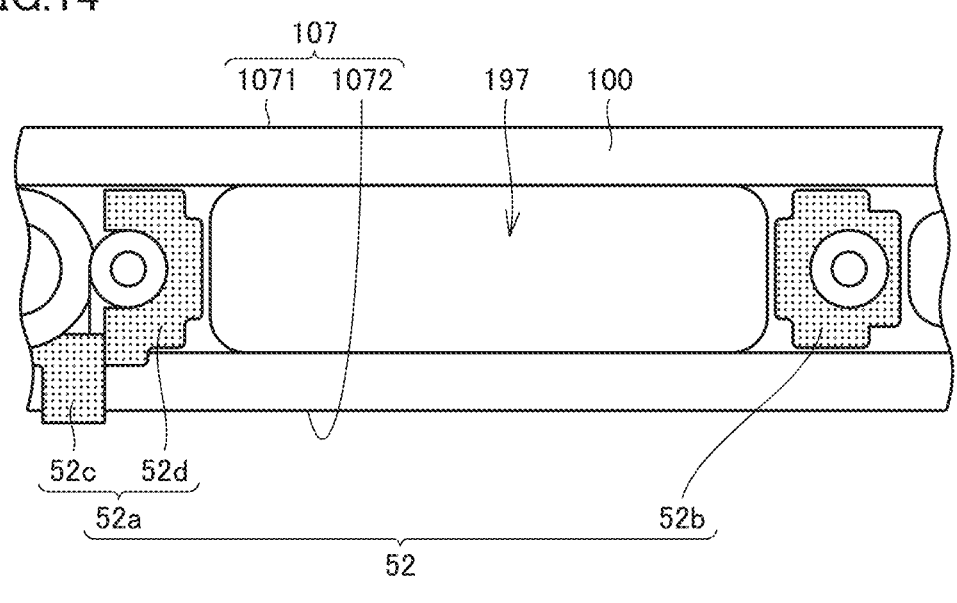
FIG. 14 shows an exemplary illustrative non-limiting drawing of a schematic plan view showing a configuration of a first elastically deformable body.
Figure 14:
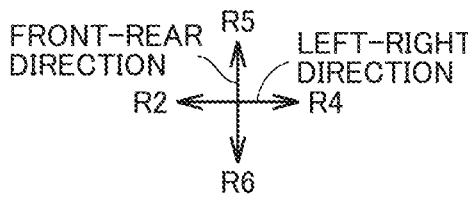

FIG. 14 is a schematic diagram when the top surface 106 direction is viewed from the inside of projection 100 and a schematic plan view showing a configuration of first elastically deformable body 52. FIG. 14 shows first elastically deformable body 52 and projection 100. First elastically deformable body 52 includes a first elastic portion 52a and a second elastic portion 52b. Second elastic portion 52b is distant from first elastic portion 52a. In the left-right direction, first elastic portion 52a is located on the side of second direction R2 relative to first opening 197. In the left-right direction, second elastic portion 52b is located on the side of fourth direction R4 relative to first opening 197.

A part of first elastically deformable body 52 projects from outer peripheral surface 107 of projection 100. Specifically, first elastic portion 52a is provided to project outward from the inside of projection 100 through an opening provided on outer peripheral surface 107 of projection 100. Second elastic portion 52b is provided in projection 100 and does not have to project outward. The opening through which first elastically deformable body 52 projects may be formed on outer peripheral surface 107 of projection 100, by a notch formed on projection 100 and upper side surface 11.

First elastic portion 52a includes a first elastic area 52c and a second elastic area 52d. In the upward-downward direction, first elastic area 52c is located below second elastic area 52d. In the left-right direction, first elastic area 52c may be located on the side of second direction R2 relative to second elastic area 52d. A part of first elastic area 52c projects from outer peripheral surface 107 of projection 100. Second elastic area 52d is located in projection 100.

As shown in FIGS. 9 and 11, first elastically deformable body 52 is provided on outer peripheral surface 107 on the side of rear surface 16. From another point of view, first elastically deformable body 52 projects in sixth direction R6 from outer peripheral surface 107 of projection 100. Therefore, in the vertically held state or the horizontally held state, it is difficult for the user who faces front surface 15 of first game controller 1 to visually recognize first elastically deformable body 52. First elastically deformable body 52 may be provided on outer peripheral surface 107, also on the side of front surface or only on the side of front surface 15.

When projection 100 is matched with recess 310, outer peripheral surface 107 and inner peripheral surface 3120 are opposed to each other. At this time, first elastically deformable body 52 provided on outer peripheral surface 107 may be in contact with opposing inner peripheral surface 3120. Thus, projection 100 is more securely attached to recess 310. More specifically, inner peripheral surface 3120 opposed to the rear surface side of outer peripheral surface 107 comes in contact with first elastically deformable body 52, so that projection 100 is biased in the front direction by inner peripheral surface 3120 with first elastically deformable body 52 being interposed. Consequently, the front surface side of outer peripheral surface 107 of projection 100 is pressed against opposing inner peripheral surface 3120 and attachment becomes secure.

Since first elastically deformable body 52 is elastically deformable, in matching projection 100 with recess 310, the first elastically deformable body is elastically deformed to contract in the front-rear direction and lowering in ease in attachment is suppressed. Furthermore, in the present embodiment, first elastically deformable body 52 is exposed at the root of outer peripheral surface 107. In other words, projecting first elastically deformable body 52 is adjacent to upper side surface 11. From another point of view, a position of the upper end of the first elastically deformable body is lower than the top surface of projection 100. Therefore, in insertion of projection 100 into recess 310, a portion of outer peripheral surface 107 where first elastically deformable body 52 is not provided initially enters recess 310. In other words, at the beginning of insertion, first elastically deformable body 52 does not come in contact with inner peripheral surface 3120. Therefore, lowering in ease in attachment is suppressed.

Second elastically deformable body 54 may also partially project through an opening provided on the outer peripheral surface of projection 100, similarly to first elastically deformable body 52. Second elastically deformable body 54 may project from the surface of outer peripheral surface 107 the same as the surface from which first elastically deformable body 52 projects. First elastically deformable body 52 and second elastically deformable body 54 may both project from the rear surface side of outer peripheral surface 107.

The elastically deformable body provided on outer peripheral surface 107 may be separate from elastically deformable bodies 52 and 54 provided on the upper surface of flange 113. In this case, materials therefor may be different. In this case as well, the elastically deformable body may be provided on the rear surface side of outer peripheral surface 107. In the present embodiment, with attention being paid to a function of elastic deformation together, these elastic members are provided as a single component.

Increase in number of components is thus suppressed. Providing separate elastically deformable bodies, on the other hand, improves a degree of freedom in arrangement or a material thereof. An elastically deformable body may be provided on outer peripheral surface 107, whereas no elastically deformable body may be provided in projection 100.

As shown in FIGS. 9 to 12, top surface 106 of projection 100 includes areas different in height from upper side surface 11. Top surface 106 of projection 100 includes a first area 101, a second area 102, a third area 103, a fourth area 104, and a fifth area 105.

First area 101 is an area of a housing where upper-surface button (right) 110 is provided. The housing forms top surface 106 of projection 100. Upper-surface button (right) 110 is provided to pass through first opening 197 provided on first area 101. Similarly, second area 102 is an area where upper-surface button (left) 120 is provided. Upper-surface button (left) 120 is provided to pass through a second opening 198 provided on second area 102.

As shown in FIG. 10, third area 103 is an area of the housing including top surface 106 in one end area of projection 100. The housing forms top surface 106 of projection 100. From another point of view, third area 103 is contiguous to the end surface on the side of second direction R2 of outer peripheral surface 107 of projection 100. Third area 103 is an area located on the side of first direction R1 relative to each of first area 101 and second area 102. In the longitudinal direction of projection 100, a length of the third area may be shorter than a length of each of first area 101 and second area 102.

Third area 103 is provided with mouse skate 191. More specifically, as shown in FIG. 12, mouse skate 191 is arranged in a recess provided on third area 103. A part of mouse skate 191 is exposed to the outside of the recess. Third area 103 may be flat, without being provided with a recess. Mouse skate 191 may be placed on a flat surface of the third area.

As shown in FIG. 10, fifth area 105 is an area of the housing including top surface 106 in the other end area of projection 100. The housing forms top surface 106 of projection 100. From another point of view, fifth area 105 is contiguous to an end surface on the side of fourth direction R4 of outer peripheral surface 107 of projection 100. Fifth area 105 is an area located on the side of first direction R1 relative to each of first area 101 and second area 102. In the longitudinal direction of projection 100, a length of fifth area 105 may be shorter than the length of each of first area 101 and second area 102.

Fifth area 105 is provided with mouse skate 192. Mouse skate 192 is arranged in a recess provided on fifth area 105. A part of mouse skate 192 is exposed to the outside of the recess. Fifth area 105 may be flat, without being provided with a recess. Mouse skate 192 may be placed on a flat surface in the fifth area. Mouse skates 191 and 192 can be concluded as raising the height of projection 100 from upper side surface 11.

Fourth area 104 is an area of the housing located between first area 101 and second area 102 in the longitudinal direction of top surface 106. The housing forms top surface 106 of projection 100. The fourth area is provided with mouse sensor opening 170, terminal opening 196, and a synchronization button opening 195.

Third area 103 is located on a side of the projection direction relative to fourth area 104. Fifth area 105 is located on a side of the projection direction relative to fourth area 104.

In the longitudinal direction of projection 100, first area 101 is located between third area 103 and fourth area 104. In the longitudinal direction of projection 100, second area 102 is located between fifth area 105 and fourth area 104. In the longitudinal direction of projection 100, each of first area 101, second area 102, and fourth area 104 is located between third area 103 and fifth area 105.

As shown in FIG. 12, a height of first area 101 from upper side surface 11 is expressed as a first height T1. From another point of view, a distance from upper side surface 11 to first area 101 in the upward-downward direction is expressed as first height T1. Similarly, a height of second area 102 from upper side surface 11 is expressed as a second height T2. From another point of view, a distance from upper side surface 11 to second area 102 in the upward-downward direction is expressed as second height T2. Though first height T1 is the same as second height T2 in the present embodiment, they may be different from each other. First area 101 and second area 102 may be provided from one end to the other end of top surface 106 in a direction perpendicular to the longitudinal direction of projection 100.

A height of third area 103 from upper side surface 11 is expressed as a third height T3. From another point of view, a distance from upper side surface 11 to third area 103 in the upward-downward direction is expressed as third height T3. Similarly, a height of fifth area 105 from upper side surface 11 is expressed as a fifth height T5. From another point of view, a distance from upper side surface 11 to fifth area 105 in the upward-downward direction is expressed as fifth height T5.

Though third height T3 is the same as fifth height T5 in the present embodiment, they may be different from each other. Though third height T3 and fifth height T5 are higher than first height T1 and second height T2 in the present embodiment, the former may be the same as or lower than the latter. Third area 103 and fifth area 105 may be provided from one end to the other end of top surface 106 in the direction perpendicular to the longitudinal direction of projection 100.

A height of fourth area 104 from upper side surface 11 is expressed as a fourth height T4. From another point of view, a distance from upper side surface 11 to fourth area 104 in the upward-downward direction is expressed as fourth height T4. Though fourth height T4 is higher than first height T1 and second height T2 in the present embodiment, the former may be the same as or lower than the latter. Though fourth height T4 is lower than third height T3 and fifth height T5 in the present embodiment, the former may be the same as or higher than the latter. Fourth area 104 may be provided from one end to the other end of top surface 106 in the direction perpendicular to the longitudinal direction of projection 100.

A height of the top surface of mouse skate 191 from upper side surface 11 is expressed as a sixth height T6. From another point of view, a distance from upper side surface 11 to the top surface of mouse skate 191 in the upward-downward direction is expressed as sixth height T6. Similarly, a height of the top surface of mouse skate 192 from upper side surface 11 is expressed as a seventh height T7. From another point of view, a distance from upper side surface 11 to the top surface of mouse skate 192 in the upward-downward direction is expressed as seventh height T7.

Though sixth height T6 is the same as seventh height T7 in the present embodiment, they may be different from each other. In the present embodiment, sixth height T6 and seventh height T7 are higher than each of first height T1 to fifth height T5. From another point of view, sixth height T6 and seventh height T7 are highest heights from upper side surface 11 in projection 100. Sixth height T6 and seventh height T7 may be the same as the height highest among first height T1 to fifth height T5. For example, sixth height T6 and seventh height T7 may be the same as third height T3 and fifth height T5.

A height of operation surface 115 from upper side surface 11 at the time when upper-surface button (right) 110 is located at the initial position is expressed as an eighth height T8. From another point of view, a distance from upper side surface 11 to operation surface 115 in the upward-downward direction is expressed as eighth height T8. Similarly, a height of operation surface 125 from upper side surface 11 at the time when upper-surface button (left) 120 is located at the initial position is expressed as a ninth height T9. From another point of view, a distance from upper side surface 11 to operation surface 125 in the upward-downward direction is expressed as ninth height T9.

Though eighth height T8 is the same as ninth height T9 in the present embodiment, they may be different from each other. Eighth height T8 and ninth height T9 are higher than first height T1 and second height T2. In the present embodiment, eighth height T8 and ninth height T9 are lower than sixth height T6 and seventh height T7. From another point of view, eighth height T8 and ninth height T9 are lower than the highest height from upper side surface 11. Though eighth height T8 and ninth height T9 are lower than third height T3 and fifth height T5 in the present embodiment, the former may be the same as or higher than the latter. Though eighth height T8 and ninth height T9 are the same as fourth height T4 in the present embodiment, the former may be different from the latter.

Figure 15:
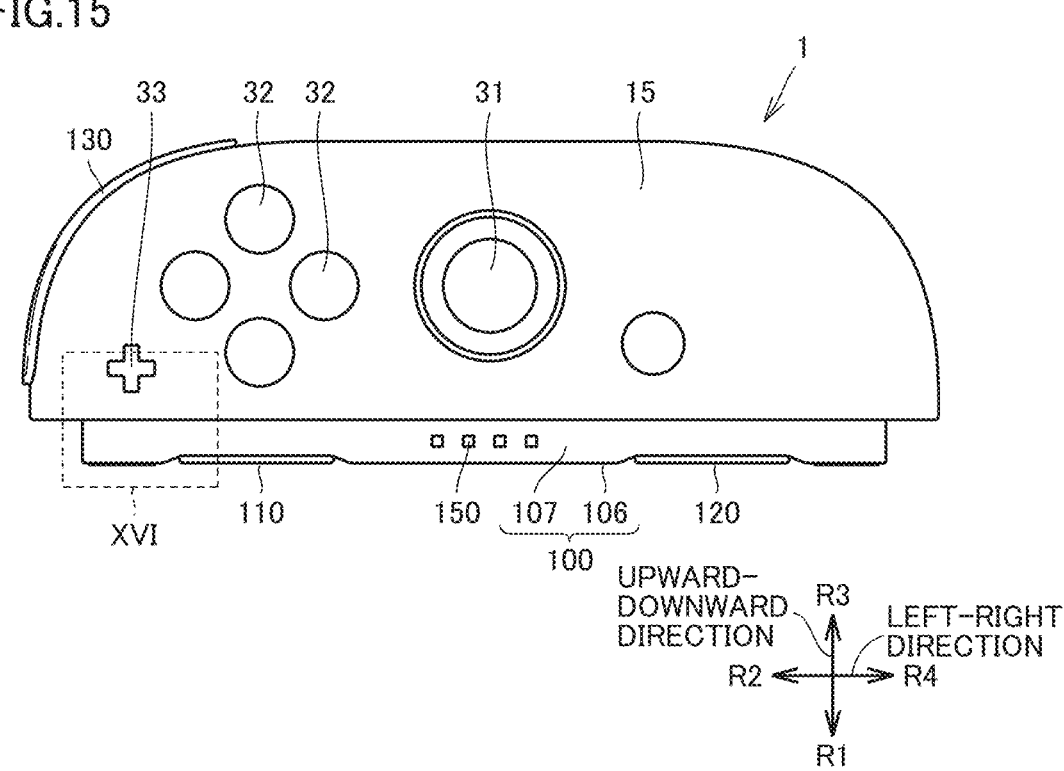
FIG. 15 shows an exemplary illustrative non-limiting drawing of a schematic front view showing a configuration in a first manner of the game controller.
Figure 16:
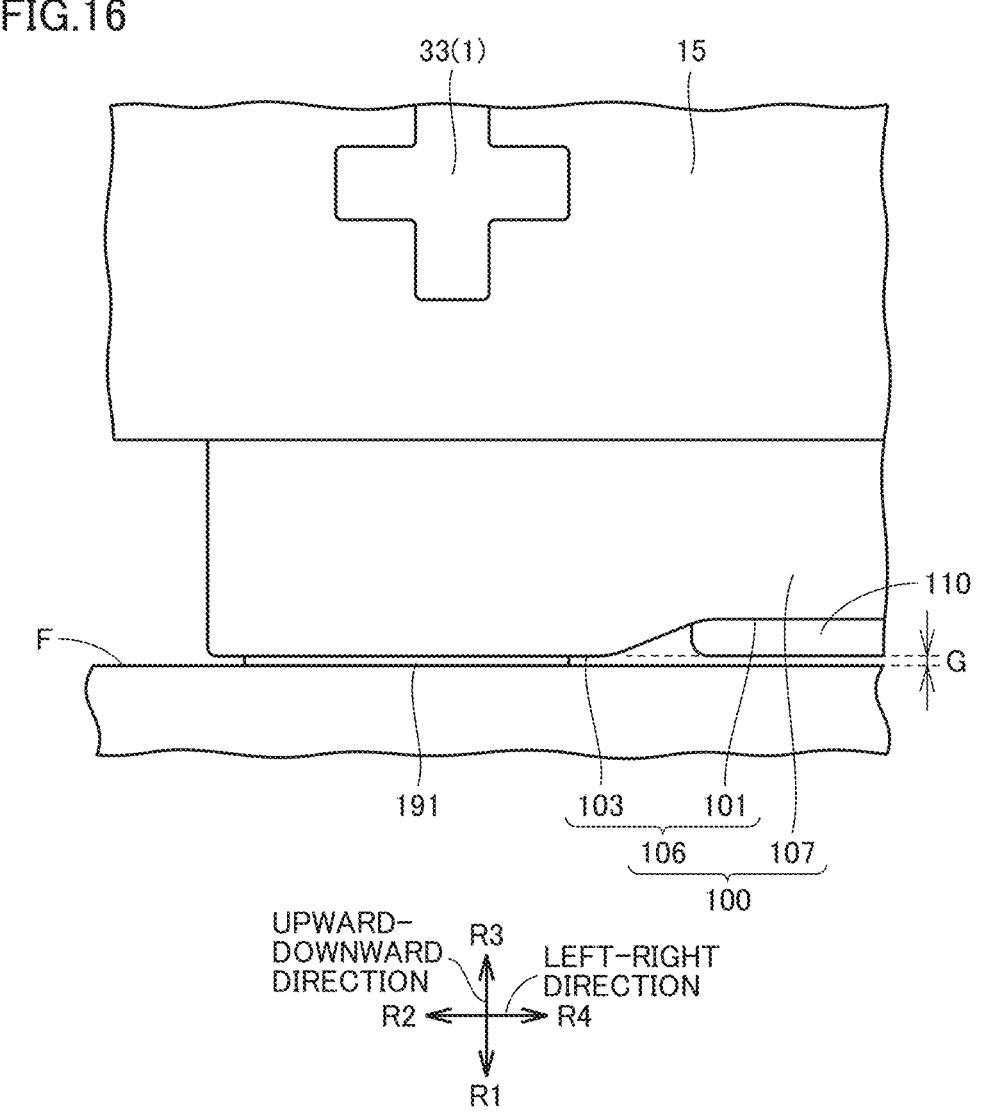
FIG. 16 shows an exemplary illustrative non-limiting drawing of an enlarged schematic diagram of an area XVI in FIG. 15.

FIG. 15 is a schematic front view showing a configuration in a first manner of the game controller. FIG. 15 shows an attitude when first game controller 1 is used as a mouse by way of example. FIG. 16 is an enlarged schematic diagram of an area XVI in FIG. 15. As shown in FIG. 16, when first game controller 1 is placed on a grounding surface F such that top surface 106 of projection 100 is opposed to grounding surface F, mouse skate 191 comes in contact with grounding surface F. Though not shown, mouse skate 192 also comes in contact with grounding surface F. Though grounding surface F is not particularly limited, it is, for example, a surface of a desk. First game controller 1 can move over grounding surface F. A thickness of a portion of mouse skate 191 exposed from the third area in the upward-downward direction is, for example, 0.2 mm. Third area 103 is distant from grounding surface F. A distance between grounding surface F and third area 103 in the upward-downward direction is, for example, 0.2 mm.

As shown in FIG. 16, operation surface 115 of upper-surface button (right) 110 is distant from grounding surface F. Upper-surface button (right) 110 is located at the initial position. A distance between grounding surface F and first area 101 in the upward-downward direction is longer than a distance between grounding surface F and third area 103. A distance between grounding surface F and first area 101 in the left-right direction is, for example, 1.2 mm.

A distance between grounding surface F and operation surface 115 of upper-surface button (right) 110 is longer than a distance between grounding surface F and third area 103 of top surface 106. A distance between grounding surface F and operation surface 115 of upper-surface button (right) 110 in the upward-downward direction is defined as a gap G. Gap G is set, for example, to 0.3 mm.

In the present embodiment, third height T3 and fifth height T5 are higher than first height T1 and second height T2. In matching of projection 100 obliquely with recess 310, more specifically, in insertion into recess 310 from one longitudinal end of projection 100, insertion is easier if the height of the end is higher. According to the configuration as above, the height of projection 100 as a whole can be suppressed while ease in attachment of first game controller 1 and operability of the buttons are satisfactory.

In the present embodiment, in the longitudinal direction of projection 100, lengths of first area 101 and second area 102 are longer than lengths of third area 103 and fifth area 105. Therefore, a limited space of top surface 106 of projection 100 can effectively be made use of, and operability of the buttons and ease in attachment of the game controller can both be achieved.

In the present embodiment, fourth height T4 is higher than first height T1 and second height T2. Fourth area 104 is provided with terminal opening 196 with which terminal accommodation portion 167 communicates. When the user operates upper-surface button (right) 110 and upper-surface button (left) 120 while the user horizontally holds first game controller 1, touching of terminal opening 196 with a user's finger is suppressed.

In the present embodiment, fourth height T4 is lower than third height T3 and fifth height T5. Fourth area 104 is provided with terminal opening 196 which is an opening of terminal accommodation portion 167. When first game controller 1 is operated as the mouse over the grounding surface, touching of the grounding surface to terminal opening 196 is suppressed. The third area and the fifth area that project can suppress the height in the upward-downward direction while such projection keeps ease in attachment of first game controller 1.

In the present embodiment, eighth height T8 and ninth height T9 are lower than sixth height T6 and seventh height T7. From another point of view, the height of the top surface of each of upper-surface button (right) 110 and upper-surface button (left) 120 from upper side surface 11 at the initial position thereof is lower than the highest height of top surface 106 from upper side surface 11. Therefore, even when first game controller 1 is carried while it is not attached to main body apparatus 3, inadvertent touching of upper-surface button (right) 110 and upper-surface button (left) 120 with something is suppressed. Furthermore, touching of upper-surface button (right) 110 and upper-surface button (left) 120 with the grounding surface when the game controller is operated as the mouse over the grounding surface is suppressed.

In the present embodiment, eighth height T8 and ninth height T9 are lower than third height T3 and fifth height T5. Therefore, even when mouse skate 191 and mouse skate 192 are removed from third area 103 and fifth area 105, eighth height T8 and ninth height T9 are lower than the highest height.

As shown in FIGS. 12 and 13, upper-surface button (right) 110 is movable upward. As shown in FIG. 13, the height of operation surface 115 from upper side surface 11 at the time when upper-surface button (right) 110 is attracted to first magnetic element 410 and is in contact with bottom surface 3121 is expressed as a tenth height T10. Similarly, a height of operation surface 125 from upper side surface 11 at the time when upper-surface button (left) 120 is attracted to second magnetic element 420 and is in contact with bottom surface 3121 is expressed as an eleventh height T11.

Upper-surface button (right) 110 may be movable to a position higher than height T10. For example, in removal of first game controller 1 from main body apparatus 3 while upper-surface button (right) 110 is attracted to first magnetic element 410, projection 100 starts to be taken out of recess 310, whereas upper-surface button (right) 110 may remain attracted to first magnetic element 410. At this time, when first elastically deformable body 52 is further compressed, upper-surface button (right) 110 is moved from the position at tenth height T10 further in a direction opposite to the direction of pressing-down. Upper-surface button (right) 110 may be movable upward to be in proximity to bottom surface 3121, without the top surface of upper-surface button (right) 110 coming in contact with bottom surface 3121.

Though tenth height T10 is the same as eleventh height T11 in the present embodiment, they may be different from each other. In the present embodiment, tenth height T10 and eleventh height T11 are higher than each of first height T1 to fifth height T5 and the same as sixth height T6 and seventh height T7. From another point of view, upper-surface button (right) 110 and upper-surface button (left) 120 are movable to a position where the height of the operation surface attains to the highest height of top surface 106. Upper-surface button (right) 110 and upper-surface button (left) 120 may be movable above the position where the height of the operation surface attains to the highest height of top surface 106. Tenth height T10 and eleventh height T11 may be lower than sixth height T6 and seventh height T7. Tenth height T10 and eleventh height T11 may be the same as or lower than third height T3 and fifth height T5.

When the upper-surface buttons are moved to the position where the height of operation surface 115 attains to the highest height of top surface 106 or higher, they can accordingly come closer to first magnetic element 410 and second magnetic element 420. Therefore, upper-surface button (right) 110 and upper-surface button (left) 120 can exhibit strong force of attraction to first magnetic element 410 and second magnetic element 420.

Upper-surface button (right) 110 and upper-surface button (left) 120 can come closer to first magnetic element 410 and second magnetic element 420 by being moved to a position where the height of the top surfaces of the buttons almost attains to the highest height of top surface 106, although the height of the top surfaces of the buttons does not attain to the highest height of top surface 106. Therefore, strong force of attraction to first magnetic element 410 is exhibited.

Upper-surface button (right) 110 and upper-surface button (left) 120 can come closer to first magnetic element 410 and second magnetic element 420 by being moved until the top surface of the buttons comes in contact with bottom surface 3121 of recess 310 owing to first magnetic element 410 and second magnetic element 420 when first game controller 1 is attached to main body apparatus 3. Therefore, strong force of attraction to first magnetic element 410 and second magnetic element 420 is exhibited.

<Connection Structure>

Figure 17:
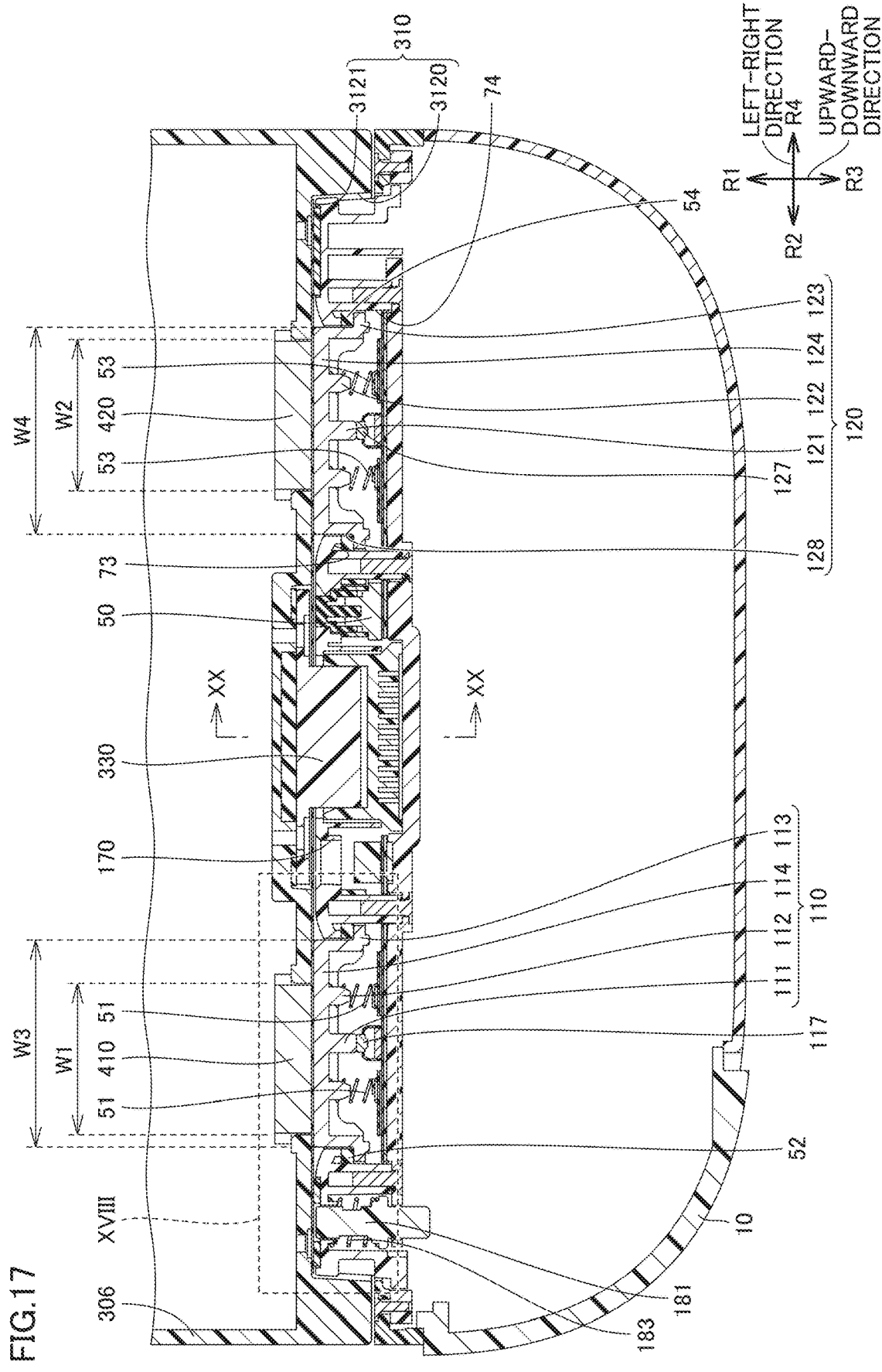
FIG. 17 shows an exemplary illustrative non-limiting drawing of a schematic cross-sectional view showing a state in which the game controller is attached to the main body apparatus.
Figure 18:
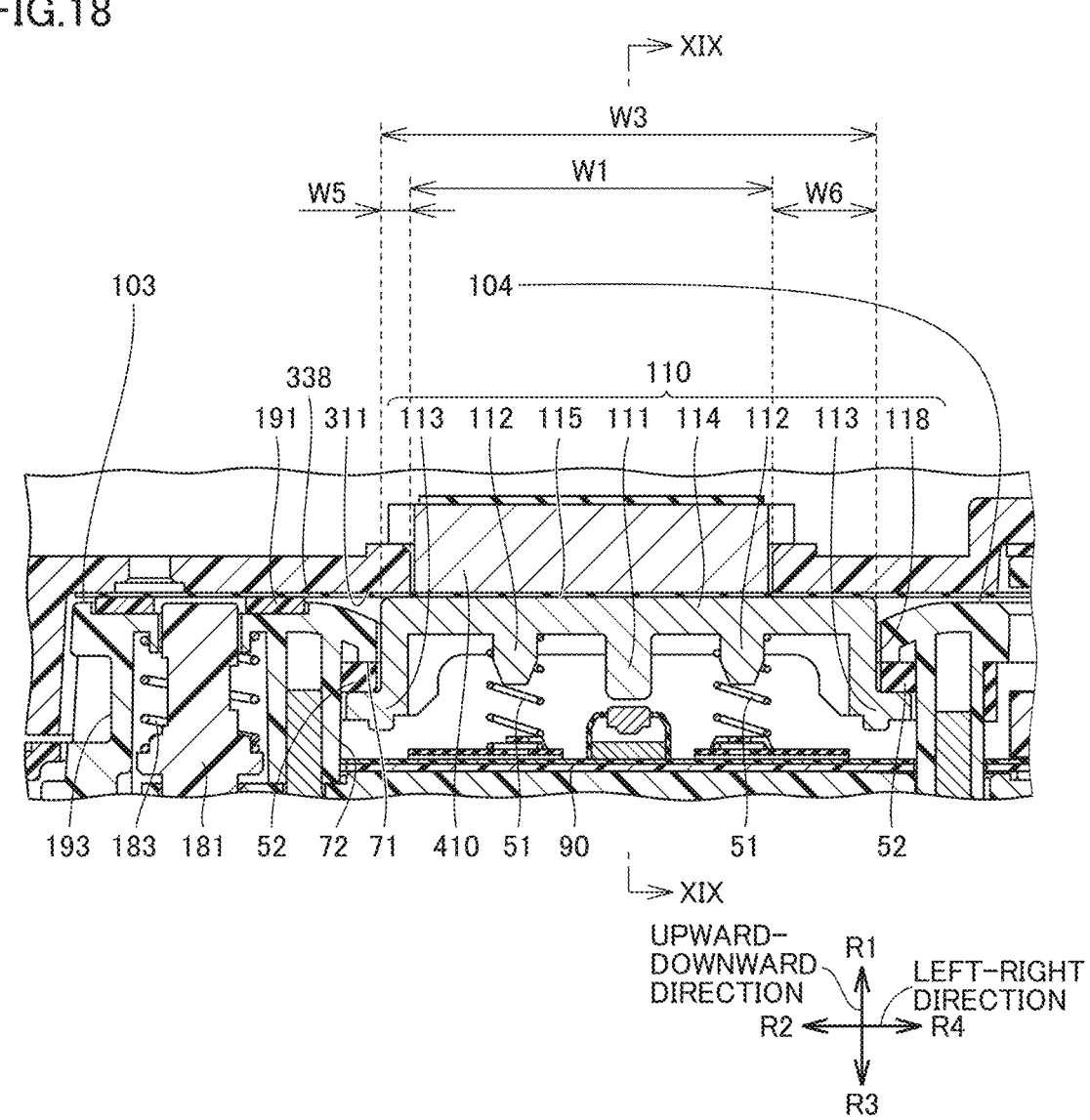
FIG. 18 shows an exemplary illustrative non-limiting drawing of an enlarged schematic diagram of an area XVIII in FIG. 17.

FIG. 17 is a schematic cross-sectional view showing a state in which the game controller is attached to main body apparatus 3. The schematic cross-sectional view shown in FIG. 17 is in parallel to each of the left-right direction and the upward-downward direction. FIG. 18 is an enlarged schematic diagram of an area XVIII in FIG. 17.

As shown in FIG. 17, projection 100 of first game controller 1 is matched with recess 310 in main body apparatus 3. Upper-surface button (right) 110 is to be attracted to first magnetic element 410 by magnetic force. Upper-surface button (left) 120 is to be attracted to second magnetic element 420 by magnetic force.

As shown in FIGS. 17 and 18, a length of operation surface 115 in the longitudinal direction of projection 100 is expressed as a third length W3. A length of an opening of first hole 401 in the longitudinal direction of recess 310 is expressed as a first length W1. Third length W3 is longer than first length W1. Similarly, a fourth length W4 is longer than a second length W2.

As shown in FIG. 18, in the longitudinal direction of bottom surface 3121, a center of first magnetic element 410 may be located on the side of second direction R2 relative to the center of upper-surface button (right) 110. From another point of view, a distance (a fifth length W5) between an end of the opening of first hole 401 on the side of second direction R2 and an end of operation surface 115 of upper-surface button (right) 110 on the side of second direction R2 in the left-right direction may be shorter than a distance (a sixth length W6) between an end of the opening of first hole 401 on the side of fourth direction R4 and an end of operation surface 115 of upper-surface button (right) 110 on the side of fourth direction R4.

First game controller 1 according to the present disclosure includes upper-surface button (right) 110 and upper-surface button (left) 120 on top surface 106 of projection 100 that projects from upper side surface 11. Therefore, when upper-surface button (right) 110 is operated, for example, with the right forefinger and upper-surface button (left) 120 is operated with the left forefinger while first game controller 1 is horizontally held, the two upper-surface buttons can be pressed down while an amount of bending of the finger is suppressed. Therefore, the two upper-surface buttons are readily operated when first game controller 1 is held with both hands such that top surface 106 of projection 100 faces up.

Furthermore, projection 100 provided with two upper-surface buttons is matched with recess 310 provided on main body apparatus 3. Therefore, position displacement at the time of attachment or removal of main body apparatus 3 and first controller 1 or while they are attached to each other can be suppressed, owing to projection 100 and recess 310.

In addition, the two upper-surface buttons provided on top surface 106 can be attracted to two respective magnetic elements provided at the bottom of recess 310. In other words, the two upper-surface buttons perform not only a function to accept an operation input from a user but also a function to attach first controller 1 to main body apparatus 3. Therefore, the two upper-surface buttons can be increased in size within a limited space of top surface 106 of projection 100. More specifically, lengths of the two upper-surface buttons can be increased in the longitudinal direction of the top surface.

Furthermore, as the two upper-surface buttons are attracted to different magnetic elements, respectively, first game controller 1 is held by main body apparatus 3 at least at two locations. Therefore, at least rotational displacement of first game controller 1 from main body apparatus 3 is suppressed as compared with an example where first game controller 1 is held by main body apparatus 3 only at one location.

In the integrally held state, upper-surface button (right) 110 and upper-surface button (left) 120 are not exposed and hence the user is unable to operate them. In the integrally held state, shoulder button (right) 130 and Z shoulder button (right) 140 are located at positions accessible by the right forefinger, and shoulder button (left) 230 and Z shoulder button (left) 240 are located at positions accessible by the left forefinger. Therefore, the user can use shoulder button (right) 130 and shoulder button (left) 230 or Z shoulder button (right) 140 and Z shoulder button (left) 240 instead of upper-surface button (right) 110 and upper-surface button (left) 120 that are used, for example, while first game controller 1 is horizontally held with both hands. From another point of view, it can be concluded that a button in first game controller 1 that is not used while the first game controller is attached to main body apparatus 3 performs a function of attraction to main body apparatus 3. Therefore, the game controller can be attached to main body apparatus 3 by the button without any inconvenience in operation by the user. A similar effect is also achieved for second game controller 2.

Figure 19:
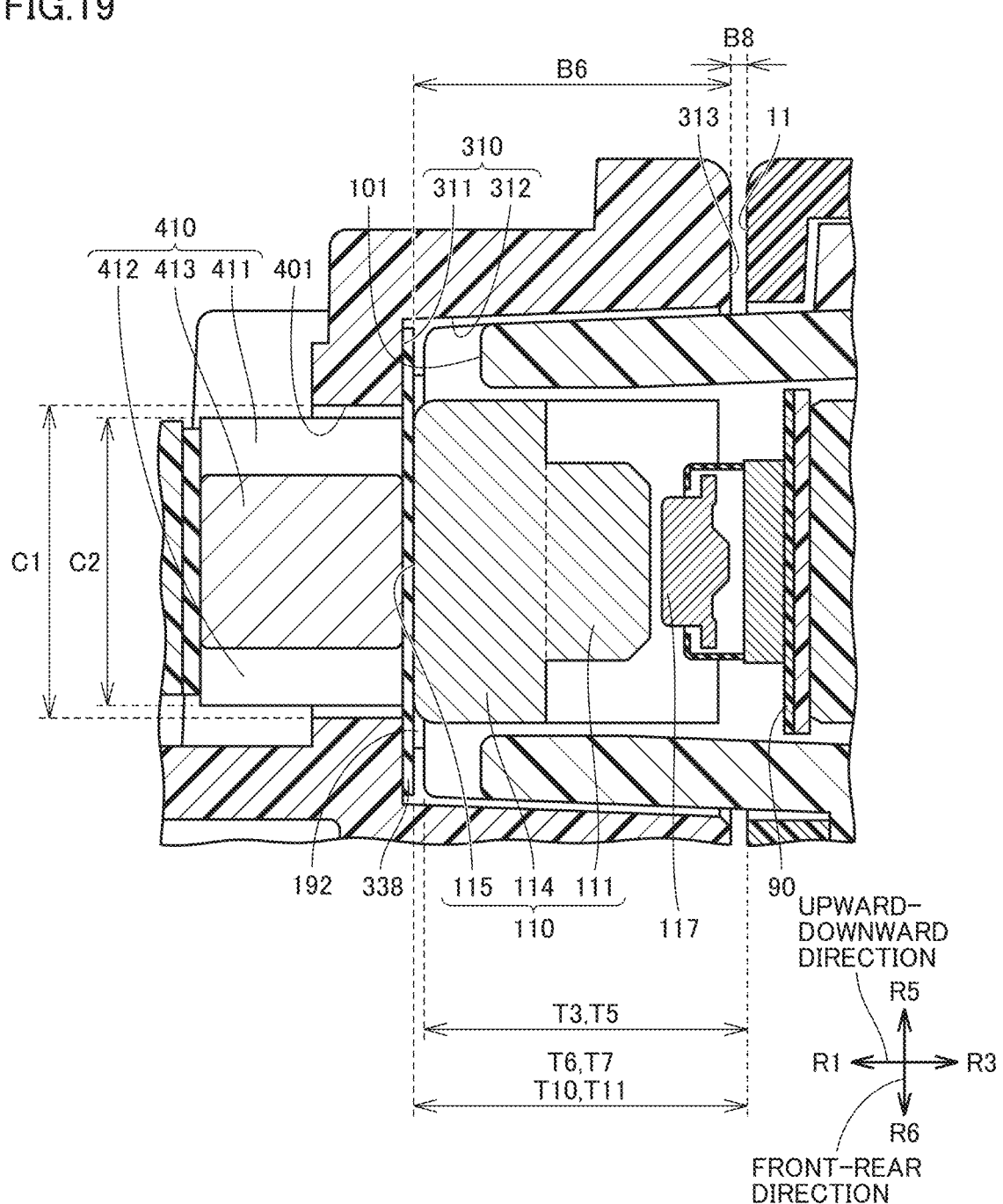
FIG. 19 shows an exemplary illustrative non-limiting drawing of a schematic cross-sectional view along the line XIX in FIG. 18.

FIG. 19 is a schematic cross-sectional view along the line XIX in FIG. 18. The schematic cross-sectional view shown in FIG. 19 is in parallel to each of the front-rear direction and the upward-downward direction of the game controller. In the present embodiment, the highest height from upper side surface 11 to top surface 106 of projection 100 is expressed as T6, T7, T10, and T11. A height from main body right side surface 313 to bottom surface 3121 in the upward-downward direction of the game controller (the left-right direction of main body apparatus 3) is expressed as a sixth distance B6. T6, T7, T10, and T11 are greater than sixth distance B6. In other words, upper side surface 11 is distant from main body right side surface 313. In the left-right direction of the main body apparatus, an interval B8 between upper side surface 11 and main body right side surface 313 may be, for example, equal to or larger than 0.05 mm.

In a state in which upper side surface 11 and main body right side surface 313 are in contact with each other, when force that rotates first game controller 1 as twisting the same in the upward-downward direction or the front-rear direction with respect to main body apparatus 3 is applied while first game controller 1 is being operated, force in a direction of detachment may be applied, with a contact between the upper side surface and the main body right side surface serving as the fulcrum. In the present embodiment, upper side surface 11 is distant from main body right side surface 313. Therefore, when force that rotates first game controller 1 is applied, the contact between projection 100 and recess 310 or a side of upper side surface 11 closer to projection 100 serves as the fulcrum and force applied in the direction of detachment is suppressed. This is also the case in second game controller 2.

As shown in FIG. 19, a width of the opening of first hole 401 in the front-rear direction is expressed as a first width C1. A thickness of first magnetic element 410 in the front-rear direction is expressed as a second thickness C2. First width C1 is larger than second thickness C2.

A width of recess 310 in the front-rear direction may increase from bottom surface 3121 toward main body right side surface 313. A width of projection 100 in the front-rear direction may increase from top surface 106 toward upper side surface 11.

Figure 20:
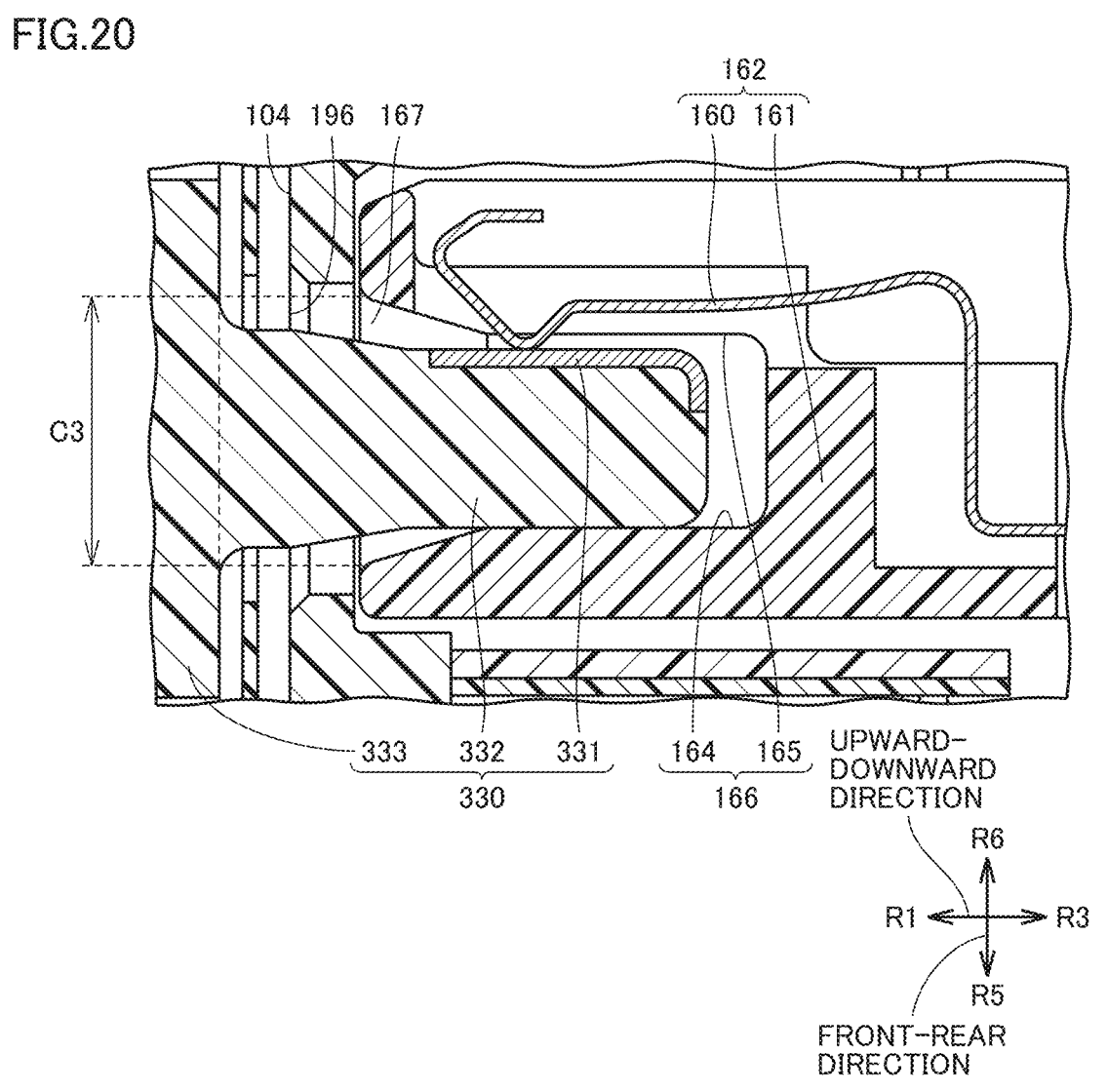

FIG. 20 is a schematic cross-sectional view along the line XX in FIG. 17. The schematic cross-sectional view shown in FIG. 20 is in parallel to each of the front-rear direction and the upward-downward direction.

A female connector 162 includes first terminal 160 and a socket 161. An inner wall surface 166 of socket 161 forms at least a part of terminal accommodation portion 167. Inner wall surface 166 of socket 161 communicates with terminal opening 196 provided on top surface 106 of projection 100. Inner wall surface 166 of socket 161 may be inclined to decrease in cross-sectional area from the side of terminal opening 196 toward the back. First game controller 1 does not have to include first female connector 162, and terminal accommodation portion 167 may be defined by recessed top surface 106 of projection 100.

Inner wall surface 166 of socket 161 may include a first rear-surface-side wall surface 165 and a first front-surface-side wall surface 164. First front-surface-side wall surface 164 is a wall surface of inner wall surface 166 on the front surface side of first game controller 1. First rear-surface-side wall surface 165 is a wall surface of inner wall surface 166 on the rear surface side of first game controller 1. First rear-surface-side wall surface 165 is opposed to first front-surface-side wall surface 164.

A wall portion that forms first rear-surface-side wall surface 165 is provided with a slit that extends in the upward-downward direction of first game controller 1 (that is, the projection direction of projection 100). While first terminal 160 extends along a direction of extension of the slit, a part thereof passes through the slit and is exposed from first rear-surface-side wall surface 165. In other words, first terminal 160 is provided along first rear-surface-side wall surface 165. From another point of view, first terminal 160 is provided along the inner peripheral surface of terminal accommodation portion 167. First terminal 160 is not provided along first front-surface-side wall surface 164. In another manner, first terminal 160 may be provided along first front-surface-side wall surface 164. First terminal 160 may be provided along each of first front-surface-side wall surface 164 and first rear-surface-side wall surface 165.

First terminal 160 may be provided as a leaf spring. An upper end of first terminal 160 extends to a position lower than terminal opening 196. Therefore, the position of the upper end of first terminal 160 in the upward-downward direction is higher than upper side surface 11 and lower than top surface 106 of projection 100. A position of a lower end of first terminal 160 may be higher or lower than upper side surface 11.

As shown in FIG. 20, first plug connector 330 in the present embodiment is inserted in terminal accommodation portion 167. More specifically, first tongue-shaped body 332 where main body first terminal 331 is provided is inserted in terminal accommodation portion 167. Main body first terminal 331 is provided on a rear surface side of first tongue-shaped body 332. In terminal accommodation portion 167, first terminal 160 is in contact with main body first terminal 331. Main body first terminal 331 may be in contact with a portion of first terminal 160 that projects from the slit.

When the user uses the game controller in the integrally held state by holding the game controller with both hands, main body apparatus 3 may slightly be shifted toward the rear surface side with respect to the game controller due to its weight. At this time, for example, first tongue-shaped body 332 may be shifted toward the rear surface side in terminal accommodation portion 167. First terminal 160, however, is provided along first rear-surface-side wall surface 165 and hence contact between first terminal 160 and main body first terminal 331 provided on first tongue-shaped body 332 tends to be maintained. When the user holds the game controller in the integrally held state with one hand such as when the user holds only first game controller 1, main body apparatus 3 may be tilted toward the rear surface side due to its weight with the side of held first game controller 1 being defined as the fulcrum. At this time, an interval between upper side surface 11 of first game controller 1 and main body right side surface 313 of main body apparatus 3 may be greater on the front surface side than on the rear surface side. In other words, first game controller 1 may be distant from main body apparatus 3 more on the front surface side than on the rear surface side. In the present embodiment, however, first terminal 160 is provided along first rear-surface-side wall surface 165, and hence contact between first terminal 160 and main body first terminal 331 tends to be maintained. First terminal 160 is provided at a position in first rear-surface-side wall surface 165 to which main body first terminal 331 provided on first tongue-shaped body 332 comes closer when main body apparatus 3 is tilted toward the rear surface side with respect to first game controller 1, so that contact with main body first terminal 331 tends to further be maintained.

Since the position of the upper end of first terminal 160 is lower than top surface 106 of projection 100, the user is less likely to touch terminal 160 when the user operates first game controller 1. Furthermore, first terminal 160 is provided in terminal accommodation portion 167 provided in projection 100, which leads to effective use of a space in the direction of height defined by projection of projection 100. Main body first terminal 331, on the other hand, should project for connection to first terminal 160 in terminal accommodation portion 167. Main body first terminal 331 is provided on recess 310. Therefore, projecting main body first terminal 331 is protected by inner peripheral surface 3120 of recess 310.

Main body first terminal 331 may be provided from a side surface toward a top surface of first tongue-shaped body 332. From another point of view, main body first terminal 331 may be provided from the rear surface side toward the right side surface side of the main body apparatus, of the surface of first tongue-shaped body 332. When first tongue-shaped body 332 is inserted in terminal accommodation portion 167, a tip end (a side of the right side surface) of first tongue-shaped body 332 may be in contact with first terminal 160. In that case as well, first terminal 160 can be in contact with main body first terminal 331.

Figure 21:
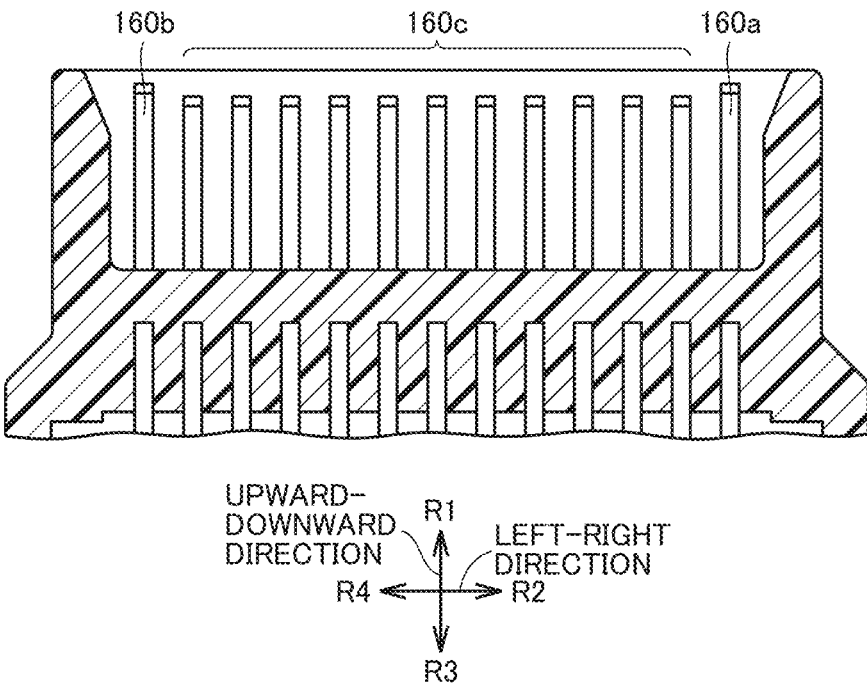
FIG. 21 shows an exemplary illustrative non-limiting drawing of a schematic cross-sectional view showing an exemplary configuration of a first terminal.

FIG. 21 is a schematic cross-sectional view showing an exemplary configuration of first terminal 160. The schematic cross-sectional view shown in FIG. 21 is in parallel to each of the upward-downward direction and the left-right direction.

As shown in FIG. 21, first terminal 160 may form a first-game-controller terminal group. The first-game-controller terminal group may include a plurality of terminal portions each comprised of a single terminal or a plurality of terminals. The plurality of terminal portions are aligned, for example, in the left-right direction.

The plurality of terminal portions include a first right terminal portion 160a, a first left terminal portion 160b, and a first intermediate terminal portion 160c. First right terminal portion 160a is a terminal located most on the side of second direction R2 in the left-right direction. First left terminal portion 160b is a terminal located most on the side of fourth direction R4 in the left-right direction. First intermediate terminal portion 160c is located between first right terminal portion 160a and first left terminal portion 160b. First intermediate terminal portion 160c may include a plurality of terminals.

A length of each of first right terminal portion 160a and first left terminal portion 160b in the upward-downward direction may be longer than a length of first intermediate terminal portion 160c. From another point of view, in the upward-downward direction, each of a distance from fourth area 104 to first right terminal portion 160a and a distance from fourth area 104 to first left terminal portion 160b may be shorter than a distance from fourth area 104 to first intermediate terminal portion 160c.

In the present embodiment, first right terminal portion 160a and first left terminal portion 160b are ground terminals. Therefore, even when main body first terminal 331 (which may form a terminal group similarly to first terminal 160) inserted in terminal accommodation portion 167 is slightly tilted, it is highly likely to be in contact with first right terminal portion 160a or first left terminal portion 160b proximate to terminal opening 196. Therefore, in electrical connection between terminals, the ground terminal can initially be brought in contact.

<Mouse>

Figure 22:
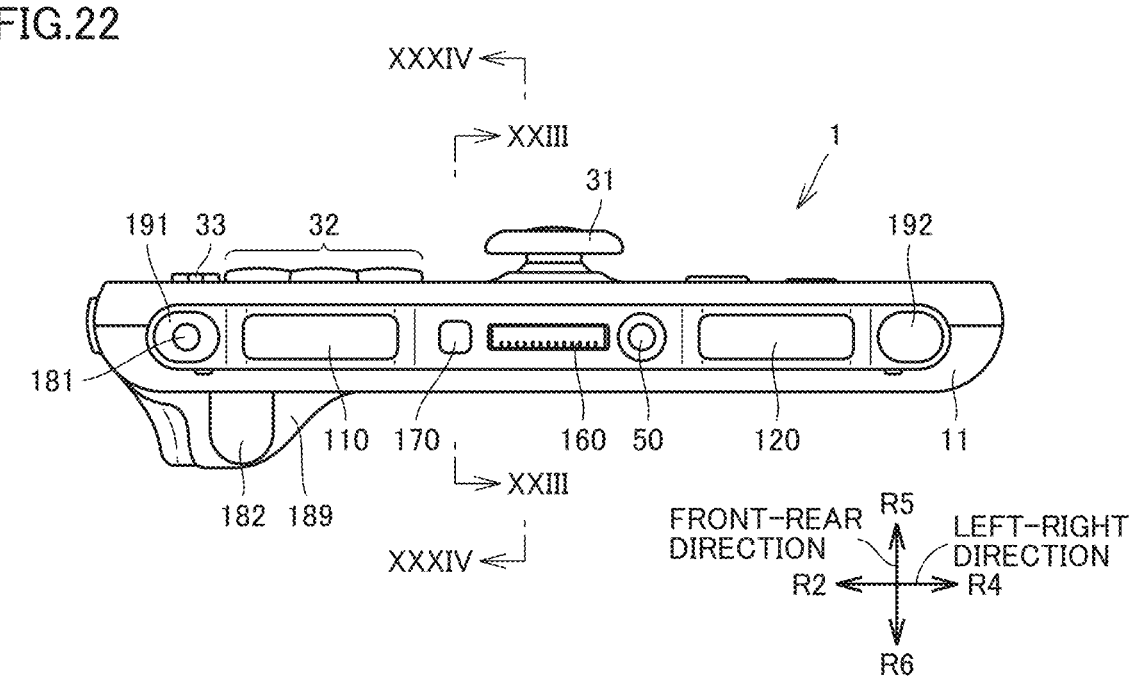
FIG. 22 shows an exemplary illustrative non-limiting drawing of a schematic top view showing a configuration in the first manner of the game controller.
Figure 23:
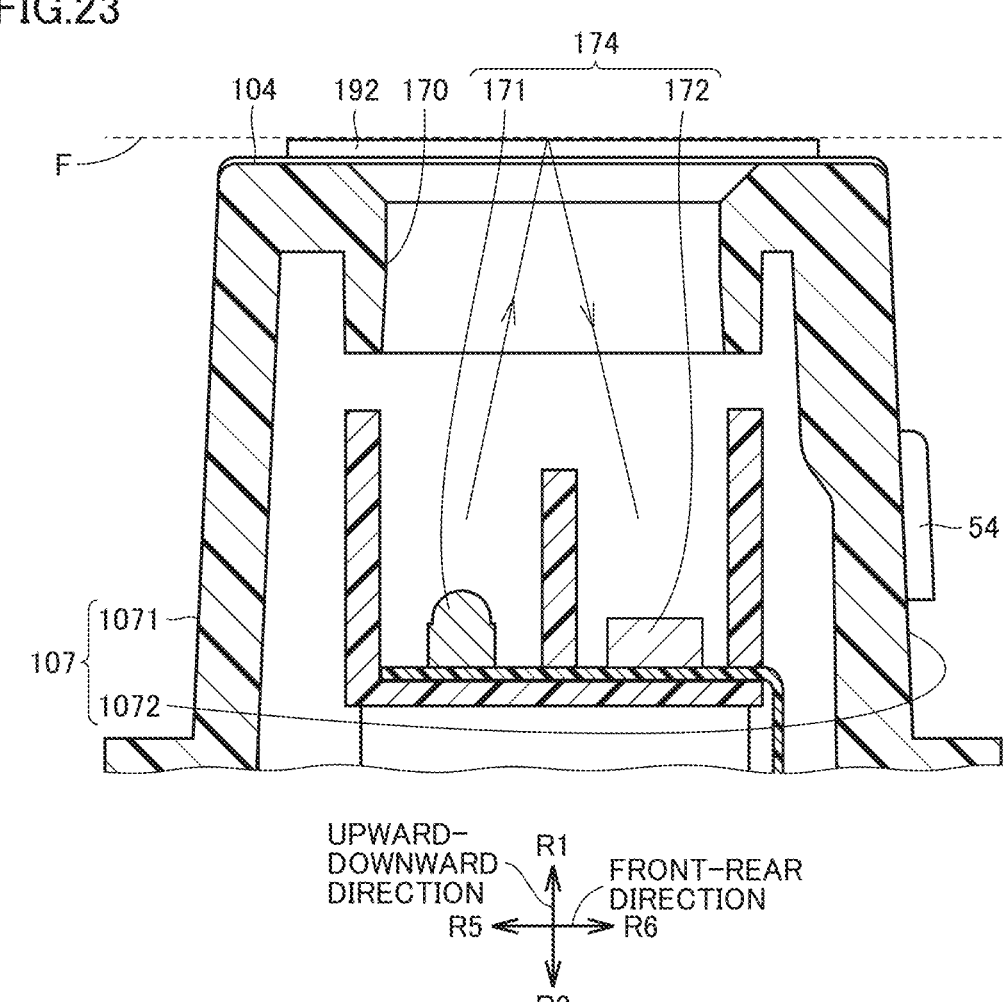
FIG. 23 shows an exemplary illustrative non-limiting drawing of a schematic cross-sectional view showing only the projection along the line XXIII-XXIII in FIG. 22.

As shown in FIGS. 15 and 16, first game controller 1 is used also as a mouse. FIG. 22 is a schematic top view showing a configuration in the first manner of the game controller. FIG. 23 is a schematic cross-sectional view showing only the projection along the line XXIII-XXIII in FIG. 22. As shown in FIGS. 22 and 23, top surface 106 of projection 100 is provided with mouse sensor opening 170. First game controller 1 includes a mouse operation sensor 174. Mouse operation sensor 174 is arranged in projection 100. Mouse operation sensor 174 is, for example, an optical mouse sensor. Mouse operation sensor 174 includes, for example, a light source 171 and a light reception sensor 172. First game controller 1 may include a lens that condenses light emitted from light source 171 or light guided to light reception sensor 172.

As shown in FIG. 23, light source 171 emits light. Light may be, for example, red light, blue light, or laser beams. A wavelength of light is not particularly limited. Light from light source 171 irradiates the grounding surface through mouse sensor opening 170. Light reception sensor 172 detects reflection by the grounding surface, of light radiated from light source 171, reflected light being varied with movement of first game controller 1 relative to the grounding surface and introduced through mouse sensor opening 170. Second game controller 2 is also similarly configured.

Being provided with mouse operation sensor 174, first game controller 1 can also be used as the mouse. Mouse sensor opening 170 is provided on top surface 106 of projection 100 that projects from upper side surface 11. Therefore, when first game controller 1 is placed on the grounding surface such that top surface 106 of projection 100 is opposed to the grounding surface, mouse sensor opening 170 is located at a position proximate to the grounding surface. Therefore, mouse sensor opening 170 can effectively take in light reflected by the grounding surface.

An information processing unit of main body apparatus 3 may calculate a movement parameter (for example, a direction of movement or a moving distance) relating to movement of first game controller 1 with respect to the grounding surface based on a result of detection by mouse operation sensor 174. Main body apparatus 3 may perform prescribed game processing based on the determined movement parameter, in an executed program. The movement parameter may be calculated in first game controller 1 (in mouse operation sensor 174 or an information processing unit included in first game controller 1) and the calculated parameter may be transmitted to main body apparatus 3. When first game controller 1 is moved with respect to the grounding surface while it is distant from the grounding surface, accurate measurement of movement of first game controller 1 with respect to the grounding surface may be disallowed. For example, when top surface 106 of projection 100 is distant from the grounding surface by at least 1 cm, at least 5 mm, or at least 1 mm, first game controller 1 may be configured not to appropriately detect light reflected by the grounding surface for measurement of movement with respect to the grounding surface. By way of example, mouse operation sensor 174 may be designed such that the distance of first game controller 1 from the grounding surface at which a direction or a distance of movement of first game controller 1 with respect to the grounding surface can accurately be detected is at most 1 cm, at most 5 mm, or at most 1 mm.

When first game controller 1 is attached to main body apparatus 3, projection 100 is matched with recess 310 and hence top surface 106 of projection 100 is not exposed to the outside. Therefore, since mouse sensor opening 170 is not exposed in the integrated state in which the first game controller is not used as the mouse, unnecessary touch by the user can be suppressed.

Figure 24:
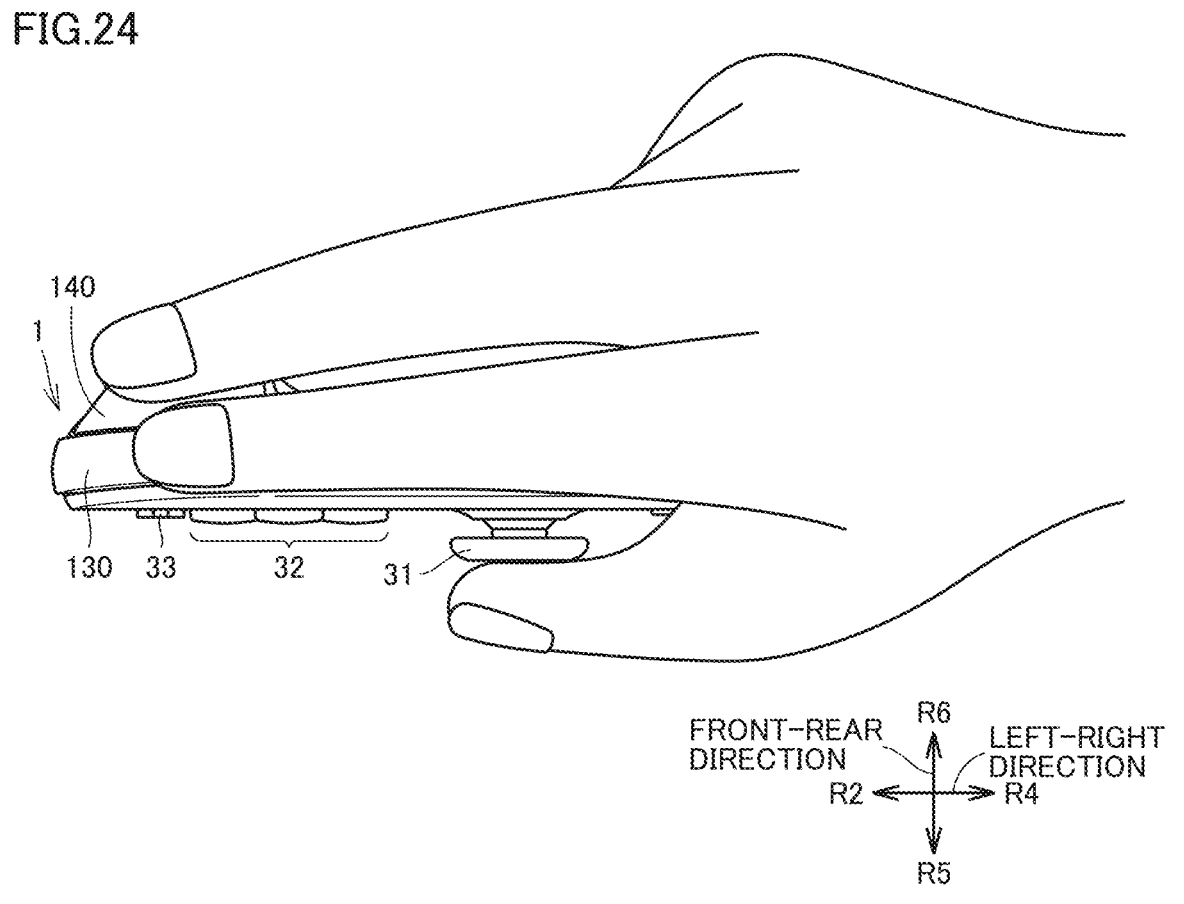

FIG. 24 is a schematic diagram showing a state in which the game controller is used as the mouse. As shown in FIG. 24, the user's palm is arranged to cover lower side surface 13 of first game controller 1. The right thumb of the user is arranged on the side of front surface 15. For example, the right thumb of the user is put along joystick 31. The right forefinger of the user is arranged on shoulder button (right) 130. The right middle finger of the user is arranged on Z shoulder button (right) 140.

The user can operate shoulder button (right) 130 with his/her right forefinger. The user can operate Z shoulder button (right) 140 with his/her right middle finger. The user may operate Z shoulder button (right) 140 with his/her right forefinger. The user can operate an input portion on the front surface with his/her right thumb. For example, the user can operate with his/her thumb, joystick 31, +button 33 (1), and the set of four buttons 32. Second controller 2 may also similarly be used as the mouse with the left hand.

Figure 25:
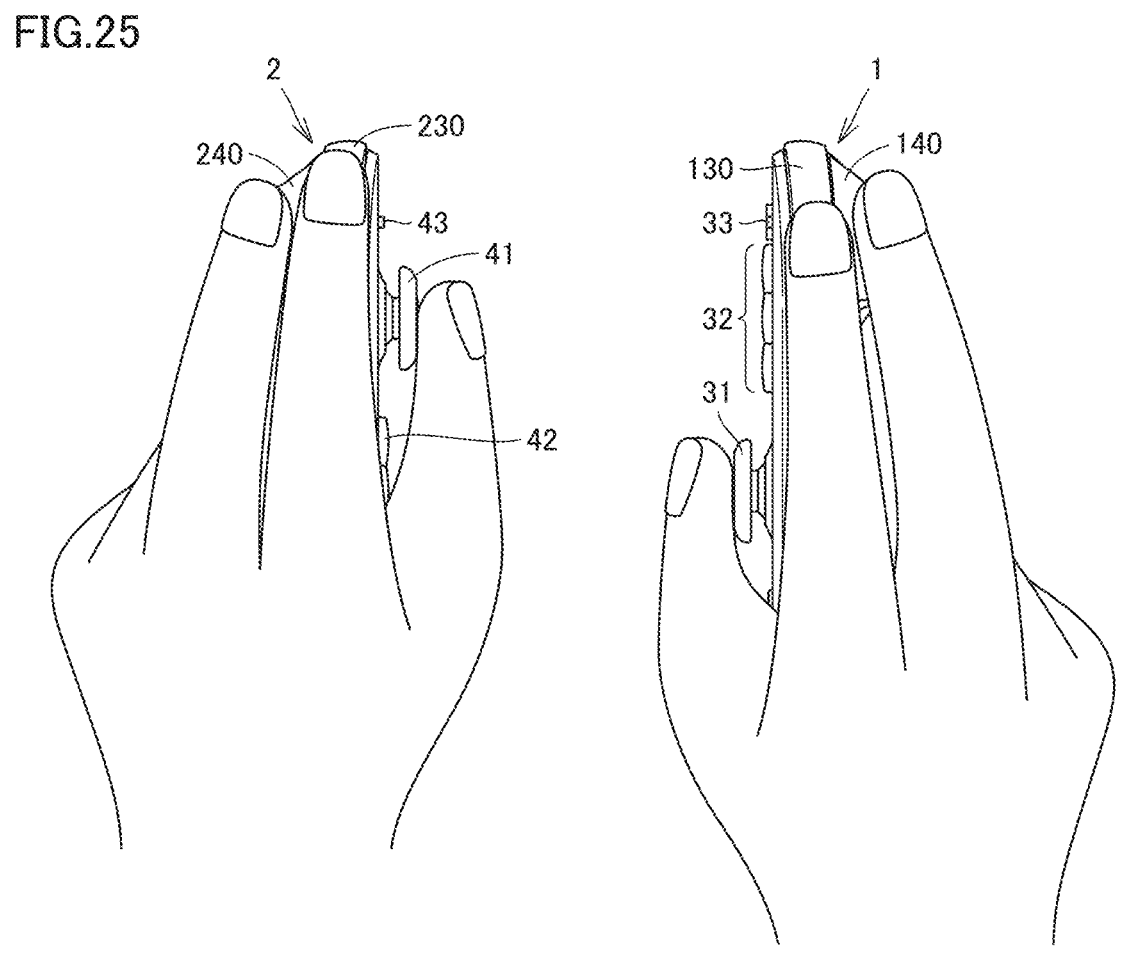

FIG. 25 is a schematic diagram showing a state in which the mouse is used with both hands. As shown in FIG. 25, the first game controller is operated with the right hand and second game controller 2 is operated with the left hand.

The user may use one of first game controller 1 and second game controller 2 as the mouse and may use the other as a vertically held game controller. A first user may use first game controller 1 as the mouse and a second user may use second game controller 2 as the mouse. First game controller 1 may be operated as the mouse with the left hand. Second game controller 2 may be operated as the mouse with the right hand The user can thus use the input portion on the front surface of the game controller that is used mainly while the game controller is vertically held or horizontally held, also when the game controller is used as the mouse. The user can use the shoulder button or the Z shoulder button of the game controller that is used mainly while the game controller is vertically held or integrally held, like a right click button and a left click button of the mouse.

In the present embodiment, while the game controller is not attached to main body apparatus 3, it is used as the vertically held game controller with the upper side surface facing horizontally, used as the horizontally held game controller with the upper side surface facing up, and used as the mouse with the upper side surface facing down. In other words, a single game controller can be used in three ways by change of a direction of holding in three directions.

As shown in FIG. 22, mouse sensor opening 170 is located between upper-surface button (right) 110 and upper-surface button (left) 120 in the longitudinal direction of top surface 106 of projection 100 in the present embodiment. In other words, the mouse sensor opening is located relatively closer to the center in the longitudinal direction of first game controller 1. Therefore, a mouse operation in accordance with the user's intention is facilitated.

As shown in FIG. 22, in the present embodiment, in top surface 106 of projection 100, in the longitudinal direction of projection 100, synchronization button 50 is provided between upper-surface button (left) 120 and terminal opening 196 and the mouse sensor opening is provided between terminal opening 196 and upper-surface button (right) 110.

When the game controller is operated in the horizontally held state, one side of terminal opening 196 lies between upper-surface button (right) 110 and mouse sensor opening 170 and the other side thereof lies between synchronization button 50 and upper-surface button (left) 120, and hence the user's finger is less likely to touch terminal opening 196. When the user attempts to operate synchronization button 50, the user's finger is less likely to touch mouse sensor opening 170 because mouse sensor opening 170 is located opposite, with terminal opening 196 lying between synchronization button 50 and mouse sensor opening 170.

<Removal Mechanism>

Figure 26:
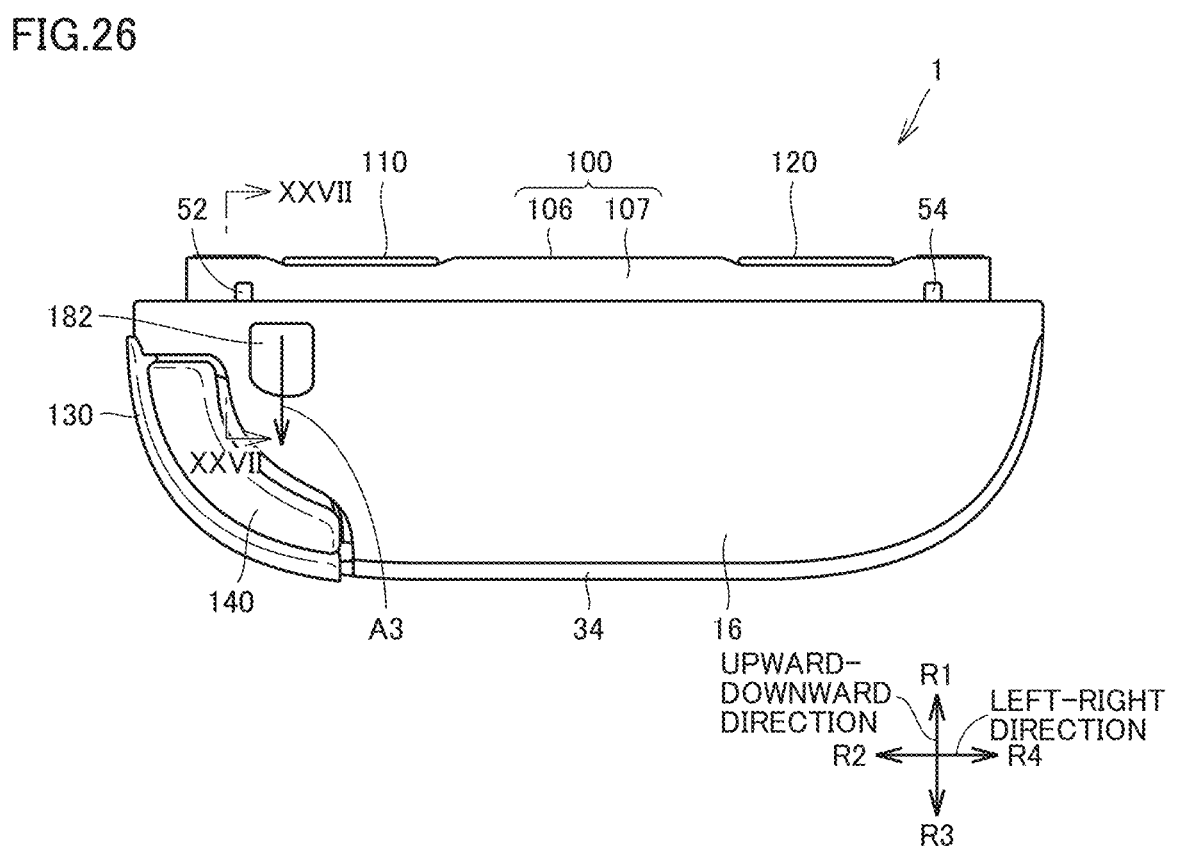
Figure 27:
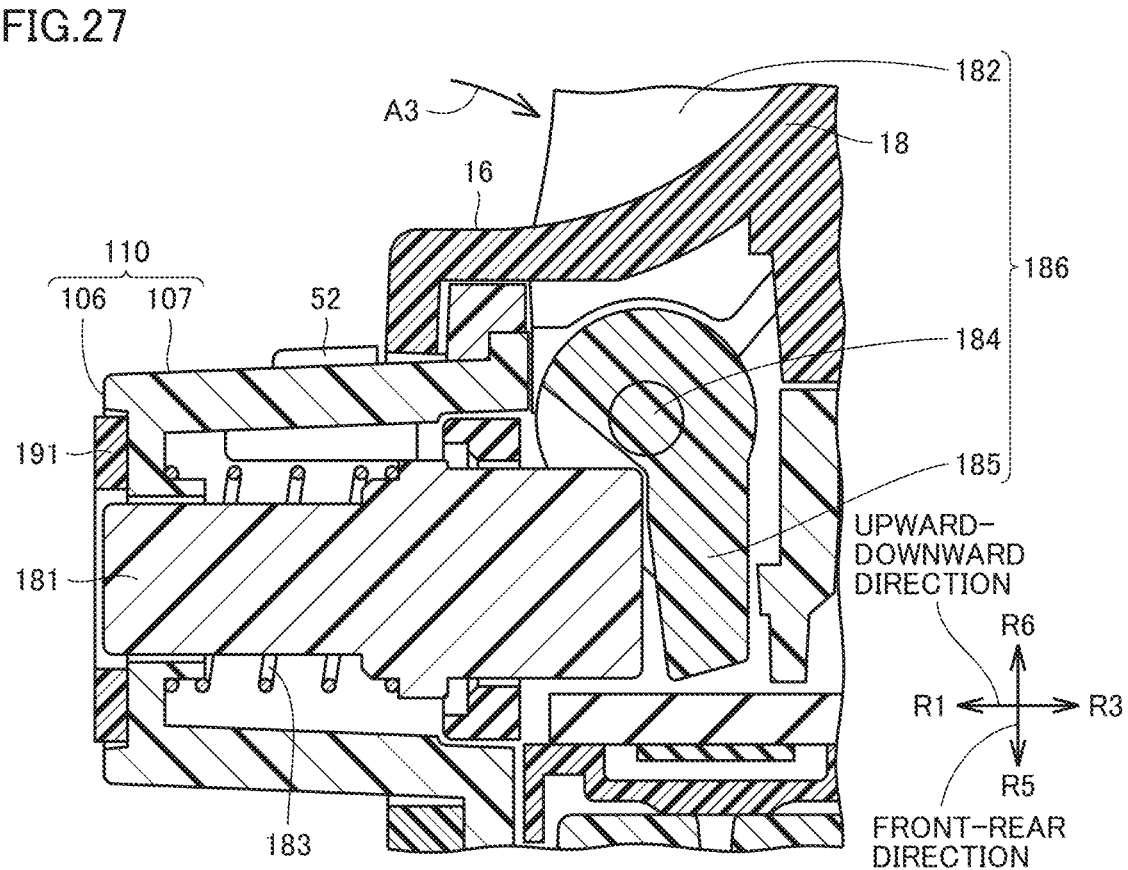
FIG. 27 shows an exemplary illustrative non-limiting drawing of a schematic cross-sectional view along the line XXVII-XXVII in FIG. 26.

FIG. 26 is a schematic rear view showing the configuration in the first manner of the game controller. FIG. 27 is a schematic cross-sectional view along the line XXVII-XXVII in FIG. 26. As shown in FIG. 27, first game controller 1 includes a pusher 181, a pusher operation member 186, and a biasing portion 183, which implement a removal mechanism. Pusher operation member 186 includes an operation portion 182, a pusher actuation portion 185, and a rotation shaft 184.

As the user operates operation portion 182, pusher 181 projects from top surface 106 of projection 100. While first game controller 1 is attached to main body apparatus 3, projected pusher 181 pushes bottom surface 3121 of recess 310. As pusher 181 pushes bottom surface 3121, top surface 106 of projection 100 moves in a direction away from bottom surface 3121. First game controller 1 rotates, with an end opposite to an end where pusher 181 is provided being defined as the fulcrum. As set forth above, first game controller 1 can readily be removed from main body apparatus 3.

As shown in FIGS. 26 and 27, operation portion 182 is provided, for example, on rear surface 16. Operation portion 182 is arranged as being exposed through an opening provided on rear surface 16. Operation portion 182 is operated by the user. Operation portion 182 is operated in a direction shown with a third arrow A3. The direction shown with third arrow A3 is a direction of rotation from main body right side surface 313 to the right and from the rear surface side of main body apparatus 3 toward the front surface.

From another point of view, the direction shown with third arrow A3 is a direction of rotation in fifth direction R5 while it is directed to third direction R3 in first controller 1. Operation portion 182 may be configured to be operated in a direction in parallel to third direction R3. FIG. 27 shows a state (natural state) before operation portion 182 is operated.

Figure 28:
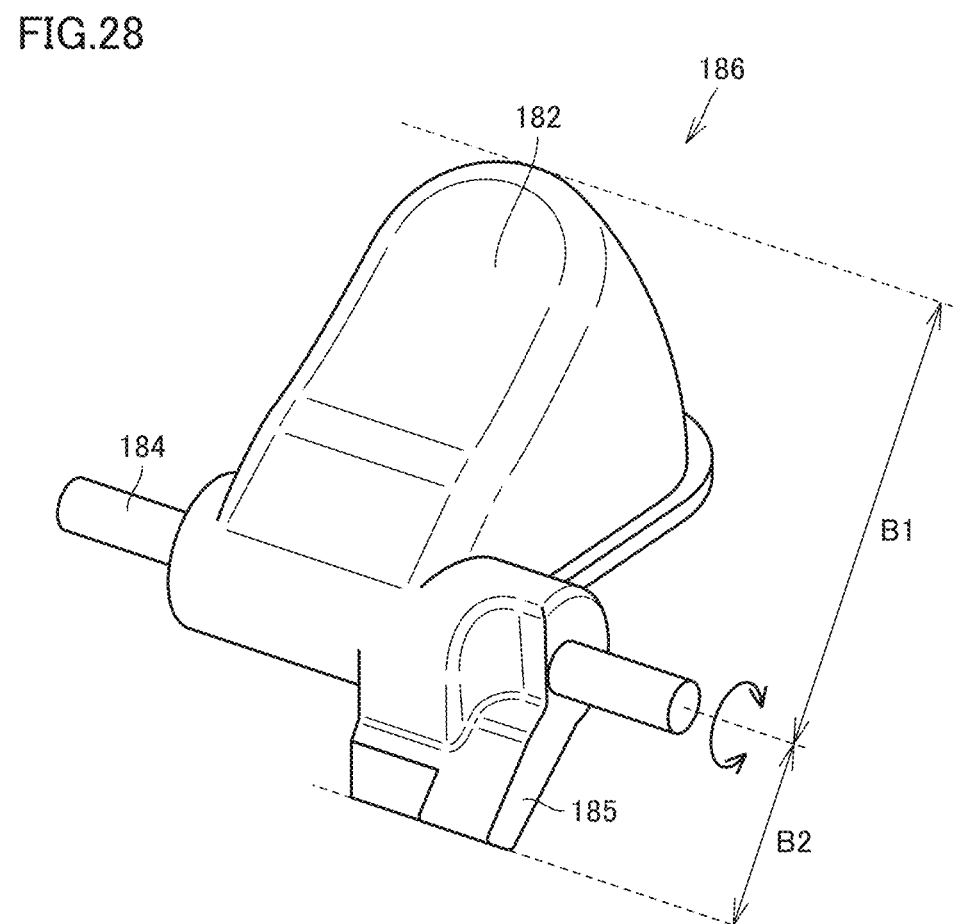
FIG. 28 shows an exemplary illustrative non-limiting drawing of a schematic perspective view showing an exemplary configuration of a pusher operation member.

FIG. 28 is a schematic perspective view showing an exemplary configuration of pusher operation member 186. As shown in FIG. 28, each of operation portion 182 and pusher actuation portion 185 is connected to rotation shaft 184. Pusher operation member 186 is comprised of a single component. Pusher operation member 186 may be comprised of a plurality of components. Rotation shaft 184 is rotated together with each of operation portion 182 and pusher actuation portion 185. From another point of view, pusher operation member 186 rotates around rotation shaft 184. Pusher actuation portion 185 abuts on pusher 181.

Figure 29:
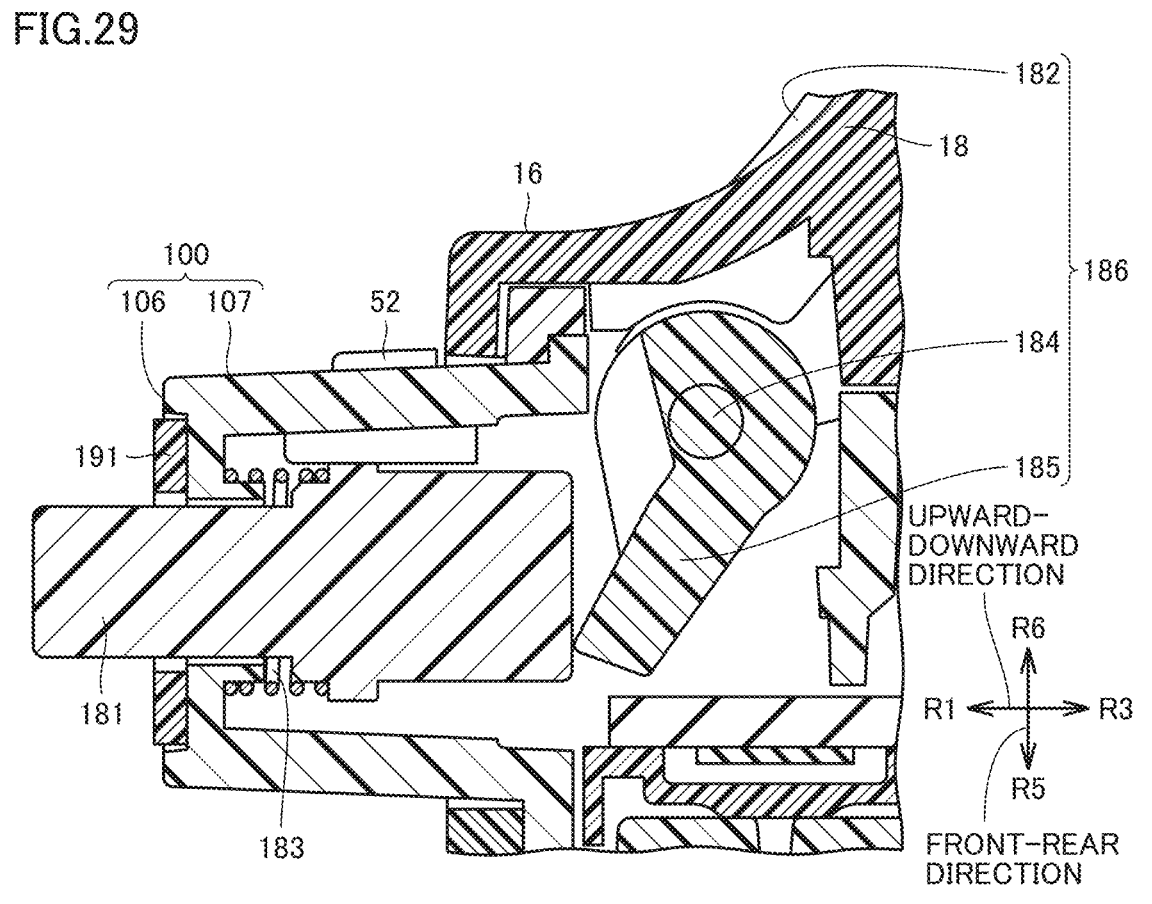

FIG. 29 is a schematic cross-sectional view showing a state in which operation portion 182 is operated. Rotation shaft 184 rotates together with pusher actuation portion 185 as a result of operation on operation portion 182. Pusher actuation portion 185 has pusher 181 project.

Before operation portion 182 is operated, pusher 181 is arranged in projection 100. Biasing portion 183 biases pusher 181 in third direction R3. Biasing portion 183 is implemented, for example, by a coil spring. As the user operates operation portion 182 in third direction R3, rotation shaft 184 rotates together with each of operation portion 182 and pusher actuation portion 185 and pusher actuation portion 185 pushes pusher 181 in first direction R1. A part of pusher 181 projects from projection 100. As the user removes his/her hand from operation portion 182, biasing portion 183 extends and pusher 181 moves in third direction R3. Pusher 181 thus returns to a position in the natural state.

As shown in FIG. 28, in a radial direction of rotation shaft 184, a distance (first distance B1) from rotation shaft 184 to an end of operation portion 182 is longer than a distance (second distance B2) from rotation shaft 184 to an end of pusher actuation portion 185. Therefore, torque of the pusher actuation portion to have the pusher project can be greater. Operation portion 182 and pusher actuation portion 185 are arranged as being aligned along the direction of extension of rotation shaft 184.

As shown in FIGS. 27 and 29, a distance from rotation shaft 184 to a portion of abutment between pusher 181 and pusher actuation portion 185 is longer when an amount of projection of pusher 181 is large than when the amount of projection is small. By way of example, the distance from rotation shaft 184 to the portion of abutment between pusher 181 and pusher actuation portion 185 after operation portion 182 is operated is longer than the distance from rotation shaft 184 to the portion of abutment between pusher 181 and pusher actuation portion 185 in the initial state. By way of example, the distance from rotation shaft 184 to the portion of abutment between pusher 181 and pusher actuation portion 185 may be longer as pusher 181 projects more. At this time, the portion of abutment between pusher actuation portion 185 and pusher 181 moves as pusher operation member 186 rotates. In the initial state, pusher 181 and pusher actuation portion 185 do not have to abut on each other.

While first game controller 1 is attached to main body apparatus 3, a distance between top surface 106 of projection 100 and bottom surface 3121 of recess 310 is short, and magnetic force between upper-surface button (right) 110 and first magnetic element 410 and magnetic force between upper-surface button (left) 120 and second magnetic element 420 are strong. Therefore, in an initial stage to have pusher 181 project, the portion of abutment between pusher actuation portion 185 and pusher 181 is set to be close to rotation shaft 184, so that force applied by pusher actuation portion 185 with respect to force applied to operation portion 182 is greater than that afterward. After pusher 181 projects to some extent, on the other hand, the distance between top surface 106 of projection 100 and bottom surface 3121 of recess 310 also becomes long to some extent, and magnetic force between upper-surface button (right) 110 and first magnetic element 410 and magnetic force between upper-surface button (left) 120 and second magnetic element 420 (in particular, magnetic force between a button on the side close to pusher 181 and the magnet) also become weaker. The applied force is then reduced by moving the portion of abutment between pusher actuation portion 185 and pusher 181 away from rotation shaft 184, whereas an amount of movement of pusher actuation portion 185 can be increased with respect to an amount of rotation of rotation shaft 184. By thus varying force applied to pusher 181 and the amount of projection of the pusher in accordance with a state of projection of the pusher, removal of first game controller 1 is facilitated.

As shown in FIGS. 27 and 29, operation portion 182 is operated at least in third direction R3. In the present example, operation portion 182 is rotationally operated in a direction including third direction R3 and fifth direction R5. In other words, the operation direction of operation portion 182 is third direction R3 (a direction away from upper side surface 11) when viewed in the rear direction of first game controller 1 and fifth direction R5 (the direction toward the rear surface) when viewed in the side direction. When operation portion 182 is operated in third direction R3, pusher 181 is moved in first direction R1. From another point of view, pusher 181 is moved toward the side opposite to the operation direction of operation portion 182.

Figure 30:
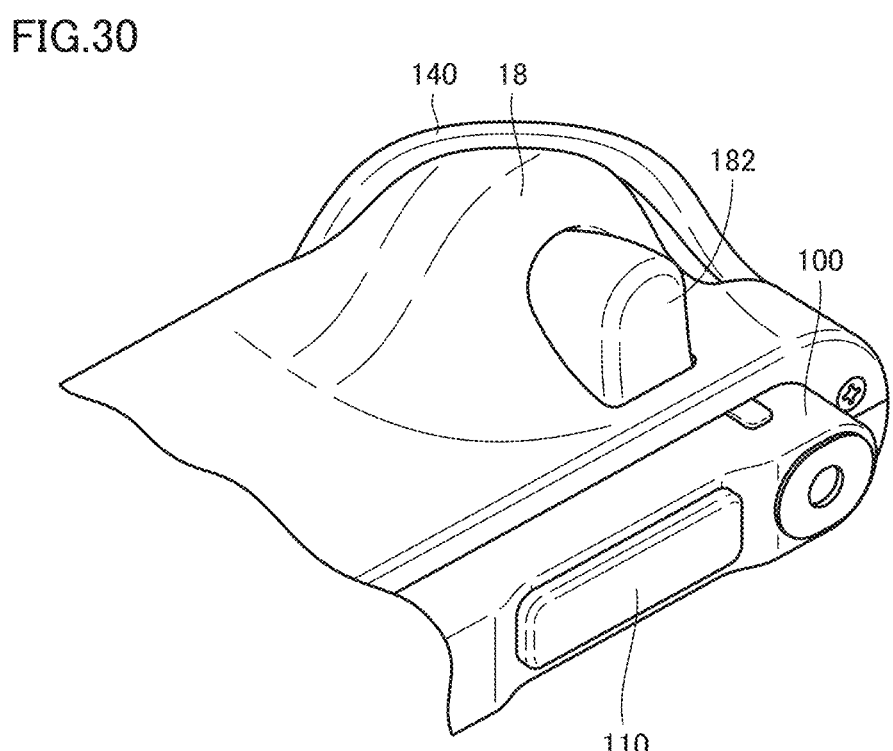
FIG. 30 shows an exemplary illustrative non-limiting drawing of a schematic diagram showing a manner before the operation portion is operated.
Figure 31:
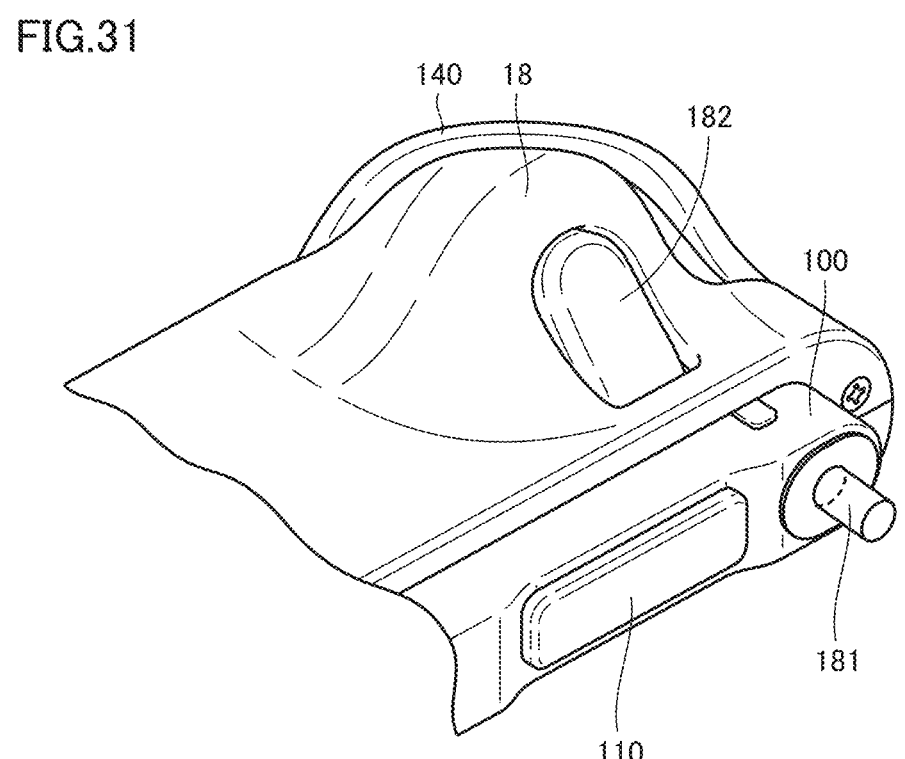
FIG. 31 shows an exemplary illustrative non-limiting drawing of a schematic diagram showing a manner while the operation portion is operated.

FIGS. 30 and 31 are schematic diagrams each showing a manner of operation on the operation portion. As shown in FIGS. 30 and 31, rear surface 16 includes a raised portion 18. Raised portion 18 is located on the side of third direction R3 with respect to operation portion 182. Raised portion 18 projects in sixth direction R6 on rear surface 16. When operation portion 182 is operated, it is moved in third direction R3 and fifth direction R5 and buried in raised portion 18 (FIG. 31). Operation portion 182 does not have to entirely and completely be buried. A part of operation portion 182 is exposed to the outside of raised portion 18. The highest height of operation portion 182 from rear surface 16 when it is not operated is lower than the highest height of raised portion 18 from rear surface 16. When first game controller 1 is placed on the grounding surface such that rear surface 16 is opposed to the grounding surface, an end of raised portion 18 is grounded while contact of operation portion 182 with the grounding surface can be suppressed.

Figure 32:
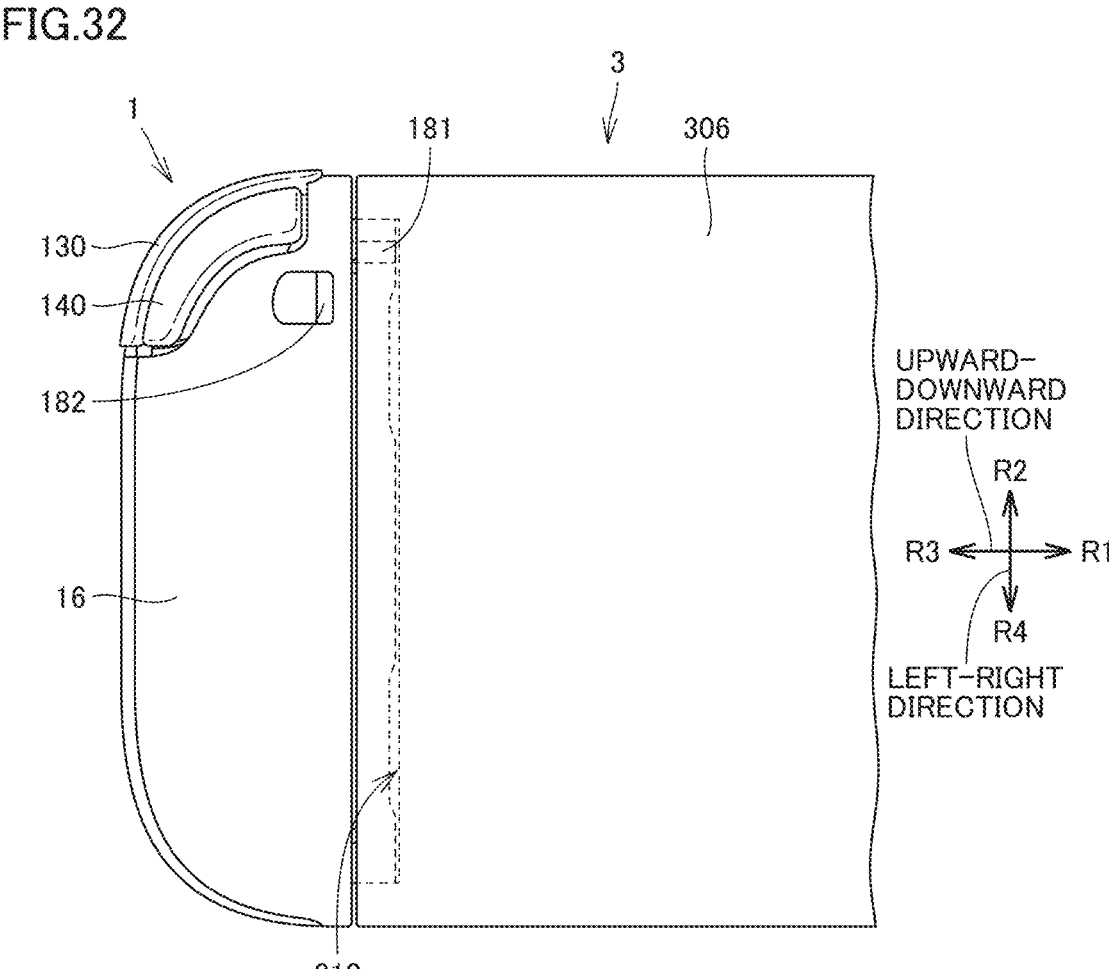
FIG. 32 shows an exemplary illustrative non-limiting drawing of a schematic rear view showing a state before the first game controller is removed from the main body apparatus.
Figure 33:
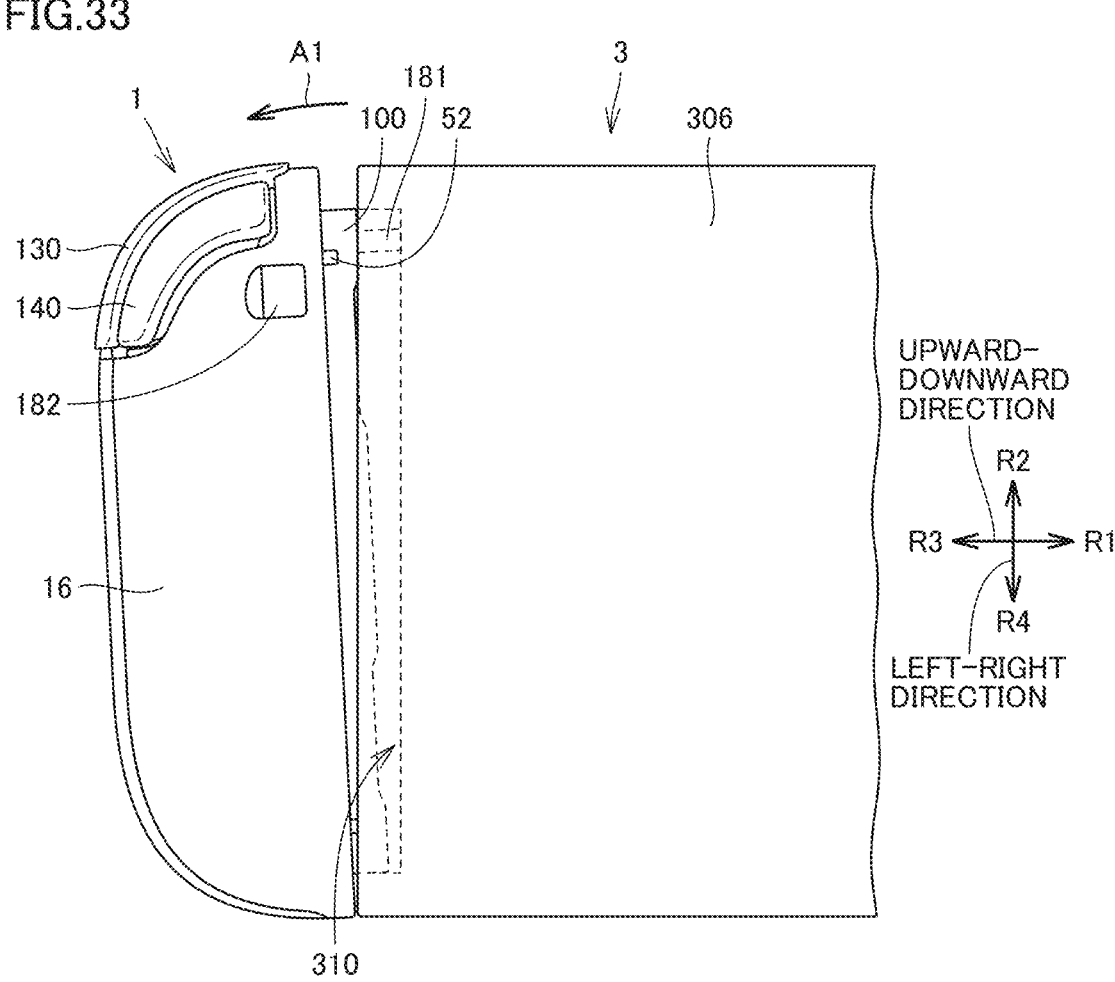
FIG. 33 shows an exemplary illustrative non-limiting drawing of a schematic rear view showing a first state in the middle of removal of the first game controller from the main body apparatus.

FIG. 32 is a schematic rear view showing a state before first game controller 1 is removed from main body apparatus 3. FIG. 33 is a schematic rear view showing a first state in the middle of removal of first game controller 1 from main body apparatus 3.

Operation portion 182 is located on the side of second direction R2 (the upper side in the integrally held state) on rear surface 16. Therefore, when the user operates operation portion 182, the user can do so by gripping as if the user clenched his/her hand, with his/her right forefinger or right middle finger being placed on the rear surface side for holding main body apparatus 3 and first game controller 1.

Furthermore, the operation direction of operation portion 182 is the same as a direction of detachment of first game controller 1. Therefore, in removal of first game controller 1, an operation can intuitively be performed.

When operation portion 182 is fully pushed in third direction R3, operation portion 182 is buried in raised portion 18 and the user's finger with which operation portion 182 is operated abuts on raised portion 18. The user can keep applying force to raised portion 18 in third direction R3 which is the direction of detachment of first game controller 1 with his/her fingers being kept thereon, to thereby apply the force to raised portion 18. Therefore, force for removal can be applied in a series of operations from the operation on operation portion 182. The user's finger comes in contact with raised portion 18 around buried operation portion 182, in addition to operation portion 182. Therefore, first game controller 1 can be removed while it is securely gripped.

Raised portion 18 projects from rear surface 16 in the rear direction to cover Z shoulder button (right) 140 from the lower side. Raised portion 18 may be configured such that raised portion 18 is grounded to the grounding surface but Z shoulder button (right) 140 is not grounded, for example, when first game controller 1 is placed such that rear surface 16 is opposed to the grounding surface. Operation portion 182 is thus buried in raised portion 18 that covers Z shoulder button (right) 140 from the lower side, to thereby achieve space saving as compared with an example where a raised portion where operation portion 182 is to be buried is separately provided.

Pusher 181 may project from an outer side of upper-surface button (right) 110 (the right side of upper-surface button (right) 110) in the longitudinal direction of projection 100. In another manner, pusher 181 may project from an outer side of upper-surface button (left) 120 (the left side of upper-surface button (left) 120) in the longitudinal direction of projection 100. A distance between pusher 181 and a portion opposite to an end where pusher 181 is provided (for example, an end of top surface 106 or a portion on upper side surface 11 on the outer side of projection 100), the portion being defined as the fulcrum in removal, can thus be longer. Since leverage is thus used to move pusher 181, first game controller 1 can be removed from main body apparatus 3 with weak force.

Pusher 181 may project from the right side of operation portion 182 in the longitudinal direction of projection 100. In the longitudinal direction of projection 100, the center of pusher 181 may be located on the right of the center of operation portion 182. Pusher 181 may project from the right side of first elastically deformable body 52 in the longitudinal direction of projection 100. In the longitudinal direction of projection 100, the center of pusher 181 may be located on the right of the center of first elastically deformable body 52.

Pusher 181 may project from the outer side of a button located on the upper side in the integrally held state, of upper-surface button (right) 110 and upper-surface button (left) 120. Pusher 181 thus pushes the side surface of main body apparatus 3 from the side of first game controller 1 with the lower side of main body apparatus 3 being defined as the fulcrum of leverage, which facilitates removal.

As shown in FIG. 22, pusher 181 projects from third area 103 of top surface 106. Top surface 106 is provided with mouse skate 191 provided with a through hole. Pusher 181 is provided to project from the through hole of mouse skate 191. Therefore, in top surface 106 of projection 100, it is not necessary to separate an area where pusher 181 projects and an area where mouse skate 191 is provided from each other. Therefore, a space in top surface 106 can effectively be used.

Pusher 181 may be configured to project from an area at the highest height in top surface 106. A tip end of pusher 181 can thus be in contact with bottom surface 3121 immediately after pusher 181 projects from top surface 106. Therefore, an amount of projection until pusher 181 comes in contact with bottom surface 3121 can be made smaller. Therefore, reduction in size of pusher 181 or decrease in amount of operation on operation portion 182 can be achieved.

The amount of projection of pusher 181 may be large to such an extent that projection of pusher 181 moves operation surface 115 of upper-surface button (right) 110 away from the surface of cover 338 that defines bottom surface 3121 of recess 310. From another point of view, the amount of projection of pusher 181 may be large to such an extent that, even when upper-surface button (right) 110 moves upward to its maximum by being attracted to first magnetic element 410, operation surface 115 of upper-surface button (right) 110 is distant from the surface of cover 338 that defines bottom surface 3121 of recess 310. First game controller 1 can thus readily be removed from main body apparatus 3. The amount of projection of pusher 181 may be large to such an extent that at least a part of operation surface 125 of upper-surface button (left) 120 is not distant from the surface of cover 338. Quick removal of first game controller 1 from main body apparatus 3 can thus be suppressed.

As shown in FIG. 33, the amount of projection of pusher 181 may be large to such an extent that projection of pusher 181 exposes the right end (the end on the side of second direction R2 in FIG. 33) of top surface 106 of projection 100 through the opening of recess 310. The amount of projection of pusher 181 may be large to such an extent that projection of pusher 181 does not expose the right end of top surface 106 through the opening of the recess. As shown in FIG. 33, the amount of projection of pusher 181 may be large to such an extent that the entirety of first elastically deformable body 52 exposed at outer peripheral surface 107 of projection 100 is exposed through the opening of recess 310. Only a part of second elastically deformable body 54 exposed at outer peripheral surface 107, on the other hand, may be exposed through the opening of recess 310. Alternatively, the amount of projection of pusher 181 may be large to such an extent that projection of pusher 181 does not expose a light emission opening 154 provided on outer peripheral surface 107 through the opening of recess 310. Alternatively, the amount of projection of pusher 181 may be large to such an extent that projection of pusher 181 separates the right end (the end on the side of second direction R2 in FIG. 33) of upper side surface 11 and the upper end of main body right side surface 313 from each other, for example, by a distance from 0.5 mm to 1 cm. The separation distance may be, for example, from 1 mm to 5 mm. The separation distance may be, for example, 2 mm.

<Indicator>

Figure 34:
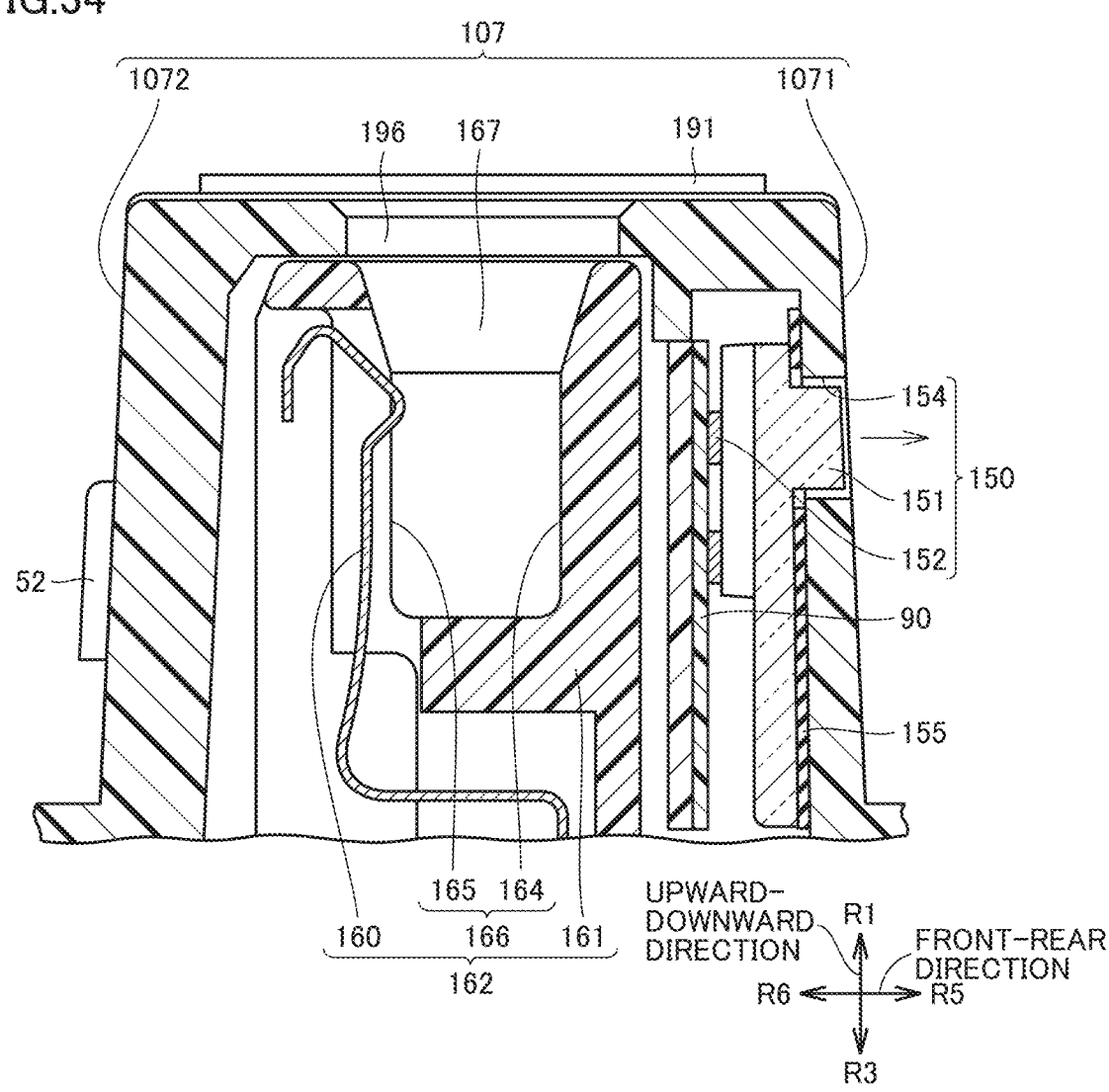
FIG. 34 shows an exemplary illustrative non-limiting drawing of a schematic cross-sectional view along the line XXXIV-XXXIV in FIG. 22.

FIG. 34 is a schematic cross-sectional view along the line XXXIV-XXXIV in FIG. 22. As shown in FIG. 34, first game controller 1 includes a light emitting element 152 and light emission portion 150 that allows emission of light to the outside. Light emission portion 150 is implemented as a user indicator. Light emission portion 150 includes, for example, light emission opening 154 and a part of a lens 151. Light emission portion 150 may be provided on a front-surface-side outer peripheral surface portion 1071.

Light emission opening 154 is an opening, for example, provided on outer peripheral surface 107 of projection 100. A protruding portion of lens 151 is located on light emission opening 154. The user can visually recognize light emitted to the outside from light emission opening 154 through lens 151. Light emission portion 150 does not have to include lens 151. Light emission portion 150 may be provided on a rear-surface-side outer peripheral surface portion 1072.

Light emitting element 152 is arranged, for example, on FPC 90. Light emitting element 152 is implemented, for example, by a light emitting diode (LED). The light emitting diode emits, for example, visible light. Light emitted by the light emitting diode is not particularly limited, and for example, red light, blue light, or green light may be applicable.

Light emitting element 152 itself may serve as light emission portion 150. In other words, light emitting element 152 may be provided on outer peripheral surface 107 of projection 100.

Projection 100 has a certain projection height. By providing light emission portion 150 in outer peripheral surface 107, a space in the projection direction of outer peripheral surface 107 can effectively be used.

Light from light emission portion 150 is emitted in the front direction from outer peripheral surface 107. Therefore, the user readily visually recognizes light when the user operates first game controller 1 as facing the front surface of first game controller 1. When first game controller 1 is attached to main body apparatus 3, on the other hand, outer peripheral surface 107 is not exposed and the user can concentrate, for example, on game play.

Light emission portion 150 provided on outer peripheral surface 107 may be provided between upper-surface button (right) 110 and upper-surface button (left) 120 in the longitudinal direction of projection 100.

When upper-surface button (right) 110 and upper-surface button (left) 120 provided on top surface 106 of projection 100 are operated with left and right fingers while first game controller 1 is horizontally held, the left and right fingers may move along top surface 106. Therefore, the fingers are less likely to be placed on the front surface side of outer peripheral surface 107 and light emission portion 150 is less likely to be covered with the fingers. Therefore, light from light emission portion 150 is readily visually recognized.

In projection 100, light emitting element 152 is opposed to light emission portion 150. More specifically, light emitting element 152 is opposed to light emission opening 154. The user can visually recognize light emitted from light emitting element 152 through light emission opening 154. Lens 151 may be bonded to an inner wall surface of projection 100 with a double-sided tape 155. In the front-rear direction, light emitting element 152 is located between FPC 90 and light emission portion 150.

In the front-rear direction, light emission portion 150 is located on the side of fifth direction R5 relative to first terminal 160. Light emission portion 150 is provided at a position superimposed on first terminal 160 in the longitudinal direction of projection 100. From another point of view, first terminal 160 is provided on an inner peripheral surface on the rear surface side, of the inner peripheral surface of terminal accommodation portion 167, and light emission portion 150 is provided on the front surface side of outer peripheral surface 107, on the front surface side relative to terminal accommodation portion 167.

Since first terminal 160 is provided to project through the slit provided on the wall portion that forms first rear-surface-side wall surface 165, a space is required in projection 100 which corresponds to the back side of inner wall surface 166. The space includes also a space to avoid interference of terminal 160 with a surrounding feature when first terminal 160 is greatly pushed into projection 100. For light emission portion 150, on the other hand, a space for providing, for example, lens 151 or light emitting element 152 is required in projection 100. Therefore, by providing first terminal 160 and light emission portion 150 opposite to each other in the front-rear direction, an internal space in projection 100 can effectively be used.

The configuration of first game controller 1 is mainly described so far. Second game controller 2 is also similar in basic configuration to first game controller 1. Only overview of second game controller 2 will be described below.

Figure 35:
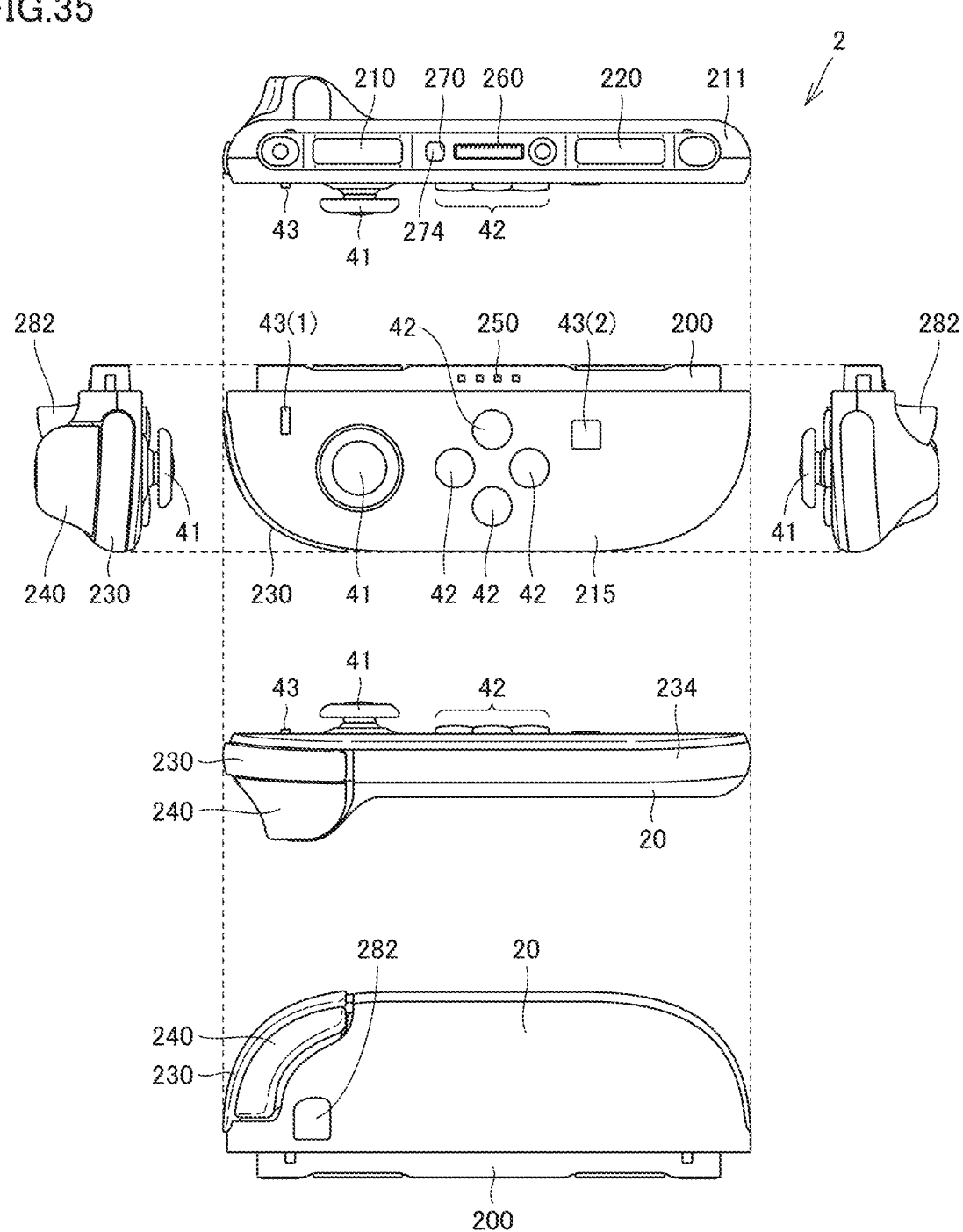
FIG. 35 shows an exemplary illustrative non-limiting drawing of a schematic six-view drawing showing a configuration in a first manner of a second game controller.

FIG. 35 is a schematic six-view drawing showing a configuration in a first manner of second game controller 2. As shown in FIG. 35, second game controller 2 includes, for example, a joystick 41 representing an exemplary direction input portion and one set of four buttons 42 aligned in a cross shape. First game controller 1 includes +button 33 (1) and home button 33 (2), whereas second game controller 2 includes a-button 43 (1) and a capture button 43 (2). Second game controller 2 includes an upper-surface button (right) 210 and an upper-surface button (left) 220, a synchronization button, a shoulder button (left) 230, and a Z shoulder button (left) 240. Upper-surface button (right) 210 and upper-surface button (left) 220 and the synchronization button are provided on a projection 200. Second game controller 2 further includes a light emission portion 250, a second terminal 260 connected to a main body second terminal 341 of main body apparatus 3, a mouse sensor opening 270 that guides light to a mouse operation sensor 274, a mouse skate 253, a mouse skate 254, and an operation portion 282 that implements a removal mechanism for removal of projection 200 from main body apparatus 3. A structure or a function of each feature is substantially the same as that of first game controller 1. At least one of functions may be different. For example, capture button 43 (2) may be used for storage of an image to be outputted to display 305.

Positional relation between joystick 31 and one set of four buttons 32 in first game controller 1 in the horizontally held state is the same as positional relation between joystick 41 and one set of four buttons 42 in second game controller 2. Specifically, in first game controller 1, joystick 31 is located on the left of one set of four buttons 32. Similarly, in second game controller 2, joystick 41 is located on the left of one set of four buttons 42. In the horizontally held state, on the other hand, shoulder button (right) 130 and Z shoulder button (right) 140 are located on the right in first game controller 1, whereas shoulder button (left) 230 and Z shoulder button (left) 240 are located on the left in second game controller 2. From another point of view, in the integrally held state, joystick 31 in first game controller 1 is located on the lower side of one set of four buttons 32, whereas joystick 41 in second game controller 2 is located on the upper side of one set of four buttons 42. In the integrally held state, on the other hand, shoulder button (right) 130 and Z shoulder button (right) 140 of first game controller 1 and shoulder button (left) 230 and Z shoulder button (left) 240 of second game controller 2 are all located on the upper side.

<Terminal Arrangement>

Figure 36:
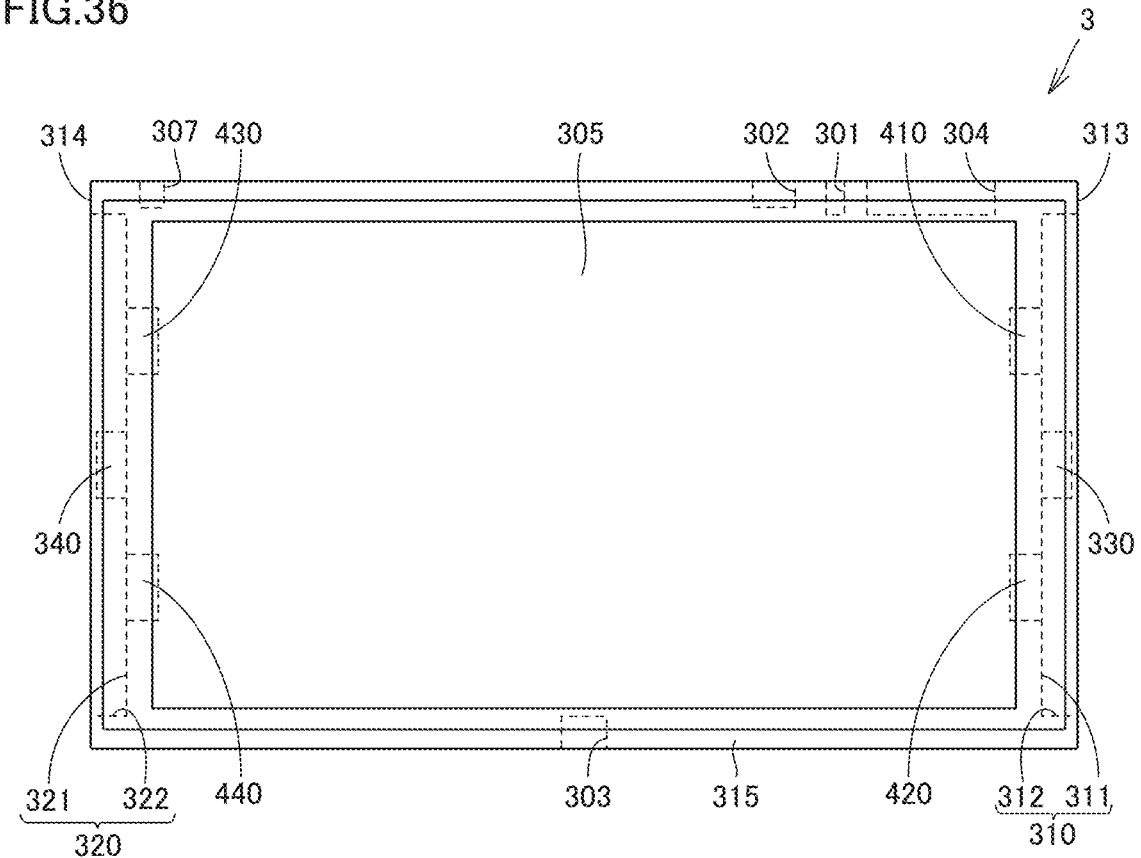
FIG. 36 shows an exemplary illustrative non-limiting drawing of a schematic front view showing an exemplary configuration of the main body apparatus.

FIG. 36 is a schematic front view showing an exemplary configuration of main body apparatus 3. As shown in FIG. 36, main body left side surface 314 is located opposite to main body right side surface 313 with respect to the front surface of main body apparatus 3. Main body left side surface 314 is similar in configuration to main body right side surface 313. For example, main body left side surface 314 is provided with recess 320. A second plug connector 340, a third magnetic element 430, and a fourth magnetic element 440 are provided in recess 320. Third magnetic element 430 and fourth magnetic element 440 each include a magnet. In the longitudinal direction of recess 320, second plug connector 340 is arranged between third magnetic element 430 and fourth magnetic element 440.

Projection 100 is in a shape that allows matching thereof with each of recess 310 and recess 320. Similarly, projection 200 is in a shape that allows matching thereof with each of recess 310 and recess 320. Recess 310 may substantially be in symmetry in the longitudinal direction thereof. Recess 320 may substantially be in symmetry in the longitudinal direction thereof. Projection 100 may substantially be in symmetry in the longitudinal direction thereof. Projection 200 may substantially be in symmetry in the longitudinal direction thereof.

The longitudinal direction of recess 310 may be in parallel to the longitudinal direction of recess 320. Each of the longitudinal direction of recess 310 and the longitudinal direction of recess 320 may be in parallel to the upward-downward direction. A direction of width of recess 310 may be in parallel to a direction of width of recess 320. Each of the direction of width of recess 310 and the direction of width of recess 320 may be in parallel to the front-rear direction.

Figure 37:
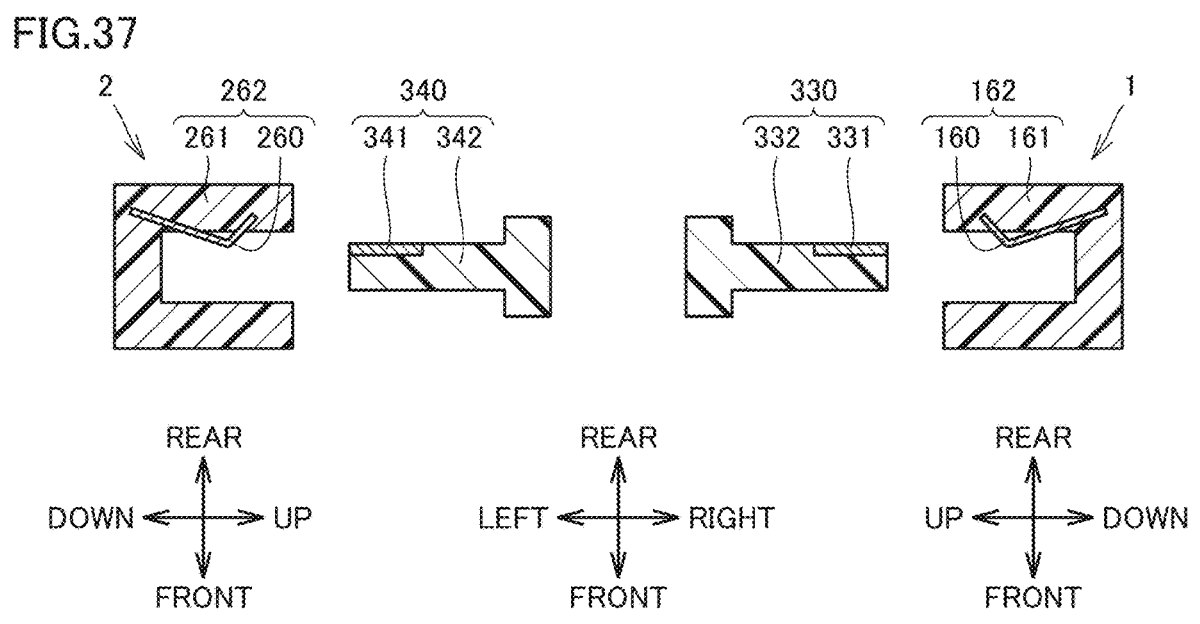

FIG. 37 is a schematic conceptual diagram showing a state of connection of a terminal in a first connected state. FIG. 37 shows in a simplified manner, a view of a state of connection of each terminal from the upper side in an attached state. For the sake of ease in understanding, terminals are shown as being distant from each other. FIG. 37 shows in a simplified manner, at least a part of main body first terminal 331, first tongue-shaped body 332, main-body-apparatus-side second terminal 341, and a second tongue-shaped body 342.

First terminal 160 is provided along the first rear-surface-side wall surface. First terminal 160 does not have to be provided on the first front-surface-side wall surface.

Second terminal 260 is provided along a second rear-surface-side wall surface. Second terminal 260 does not have to be provided on a second front-surface-side wall surface.

Main body first terminal 331 is provided along the rear surface of first tongue-shaped body 332. Main body first terminal 331 does not have to be provided on the front surface of first tongue-shaped body 332. Main body second terminal 341 is provided along the rear surface of second tongue-shaped body 342. Main body second terminal 341 does not have to be provided on the front surface of second tongue-shaped body 342.

Figure 38:
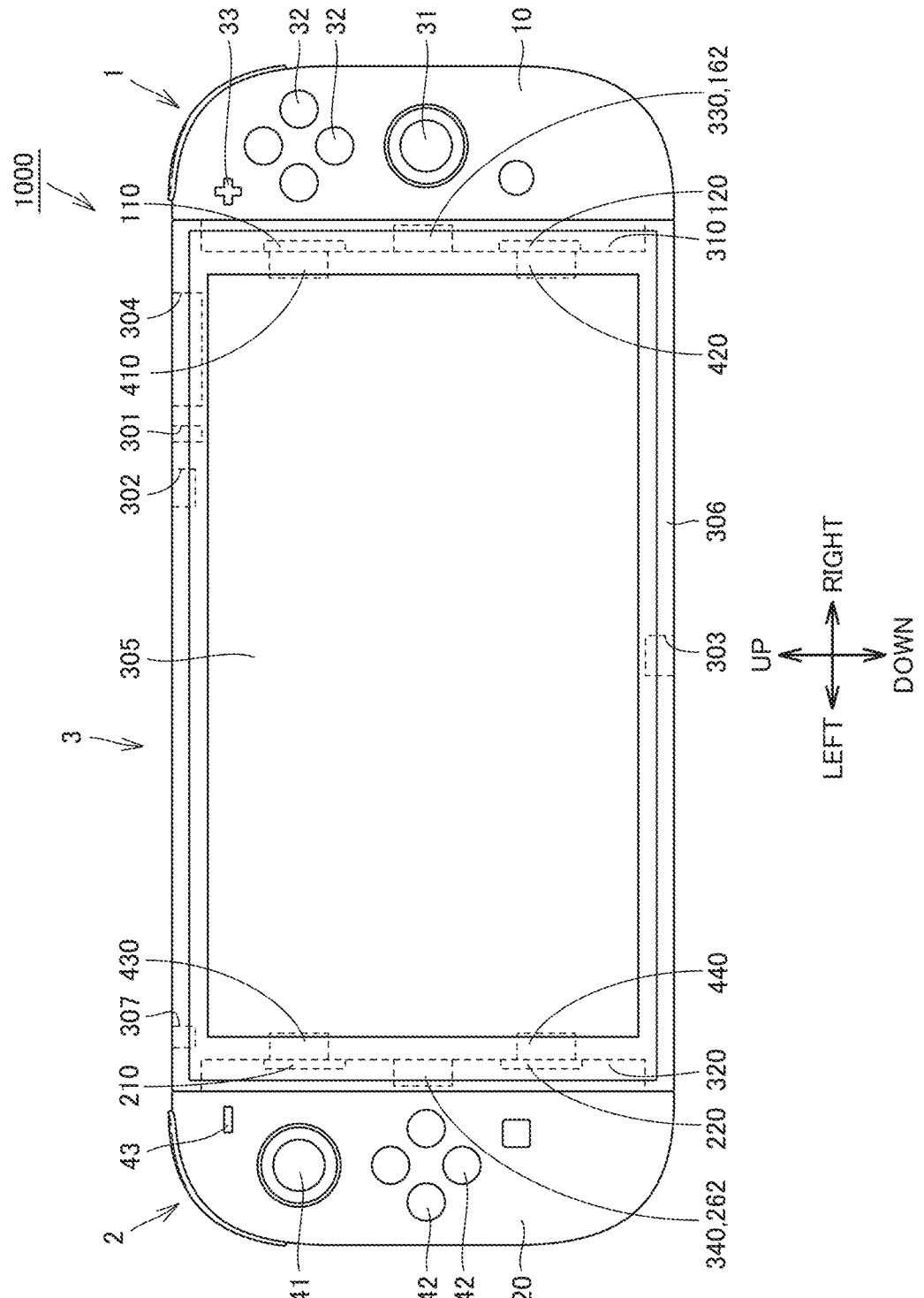
FIG. 38 shows an exemplary illustrative non-limiting drawing of a schematic front view showing the configuration of the information processing apparatus in the first connected state.

FIG. 38 is a schematic front view showing the configuration of information processing apparatus 1000 in the first connected state.

Figure 39:
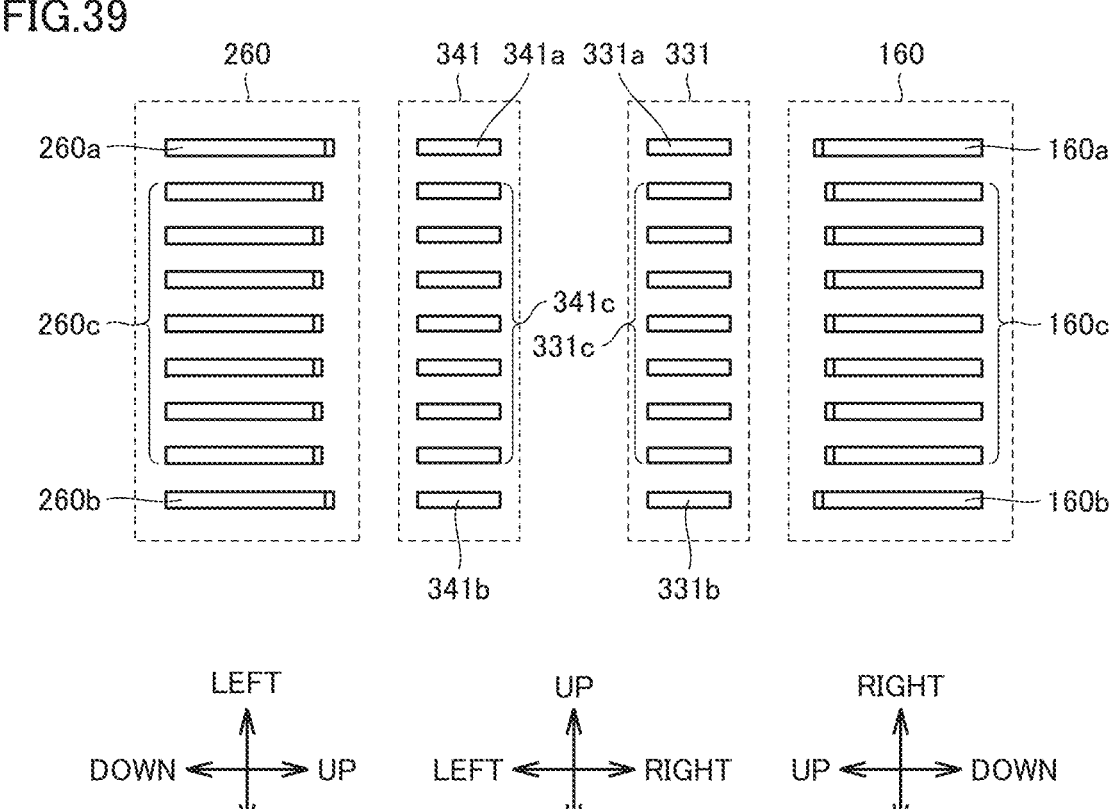
FIG. 39 shows an exemplary illustrative non-limiting drawing of a schematic conceptual diagram showing terminal arrangement in the first connected state.

FIG. 39 is a schematic conceptual diagram showing a terminal sequence in the first connected state. FIG. 39 shows in a simplified manner, a state of connection of each terminal when viewed from the front surface side in the attached state. For the sake of ease in understanding, terminals are shown as being distant from each other. As shown in FIG. 39, main body first terminal 331 (which is also called a third terminal 331) may form a first main body terminal group. The first main body terminal group may include a plurality of third terminal portions each comprised of a single terminal or a plurality of terminals. The plurality of third terminal portions are aligned in the upward-downward direction. Functions of the plurality of third terminal portions do not have to be in symmetry in the upward-downward direction.

Main body second terminal 341 (which is also called a fourth terminal 341) may form a second main body terminal group. Second main body terminal group 341 may include a plurality of fourth terminal portions each comprised of a single terminal or a plurality of terminals. The plurality of fourth terminal portions are aligned in the upward-downward direction. Alignment of the functions of the plurality of third terminal portions and alignment of the functions of the plurality of fourth terminal portions may be opposite in the upward-downward direction.

As shown in FIG. 39, second terminal 260 may form a second-game-controller terminal group similarly to first terminal 160. The second-game-controller terminal group includes a plurality of second terminal portions each comprised of a single terminal or a plurality of terminals. The plurality of second terminal portions are aligned in the upward-downward direction.

Alignment of the functions of the plurality of first terminals 160 and alignment of the functions of the plurality of third terminals 331 may be the same in the upward-downward direction in the main body apparatus. The functions of the plurality of first terminals 160 may be grounding, detection of connection from one to the other, a signal, power feed from one to the other, not assigned, power feed from the other to one, a signal, detection of connection from the other to one, and grounding sequentially downward from the upper side in the upward-downward direction of the main body apparatus. Similarly, the functions of the plurality of third terminals 331 may be grounding, detection of connection from one to the other, a signal, power feed from one to the other, not assigned, power feed from the other to one, a signal, detection of connection from the other to one, and grounding sequentially downward from the upper side.

Alignment of the functions of the plurality of second terminals 260 and alignment of the functions of the plurality of fourth terminals 341 may be the same in the upward-downward direction in the main body apparatus. The functions of the plurality of second terminals 260 may be grounding, detection of connection from one to the other, a signal, power feed from one to the other, not assigned, power feed from the other to one, a signal, detection of connection from the other to one, and grounding sequentially downward from the upper side in the upward-downward direction of the main body apparatus. Similarly, the functions of the plurality of fourth terminals 341 may be grounding, detection of connection from one to the other, a signal, power feed from one to the other, not assigned, power feed from the other to one, a signal, detection of connection from the other to one, and grounding sequentially downward from the upper side.

Similarly to the plurality of first terminal portions, the plurality of second terminal portions include a second left terminal portion 260a, a second right terminal portion 260b, and a second intermediate terminal portion 260c. Second left terminal portion 260a is located on a leftmost side in the left-right direction. Second right terminal portion 260b is located on a rightmost side in the left-right direction. Second intermediate terminal portion 260c is located between second left terminal portion 260a and second right terminal portion 260b.

The plurality of third terminal portions include a third upper terminal portion 331a, a third lower terminal portion 331b, and a third intermediate terminal portion 331c. Third upper terminal portion 331a is located uppermost in the upward-downward direction of main body apparatus 3. Third lower terminal portion 331b is located lowermost in the upward-downward direction of main body apparatus 3. Third intermediate terminal portion 331c is located between third upper terminal portion 331a and third lower terminal portion 331b.

The plurality of fourth terminal portions include a fourth upper terminal portion 341a, a fourth lower terminal portion 341b, and a fourth intermediate terminal portion 341c. Fourth upper terminal portion 341a is located uppermost in the upward-downward direction of main body apparatus 3. Fourth lower terminal portion 341b is located lowermost in the upward-downward direction of main body apparatus 3. Fourth intermediate terminal portion 341c is located between fourth upper terminal portion 341a and fourth lower terminal portion 341b.

<Connection State>

As shown in FIG. 39, in the first connected state, first terminal 160 is connected to main body first terminal 331. First right terminal portion 160a is electrically connected to third upper terminal portion 331a. First left terminal portion 160b is electrically connected to third lower terminal portion 331b. First intermediate terminal portion 160c is electrically connected to third intermediate terminal portion 331c.

In the first connected state, second terminal 260 is connected to main body second terminal 341. Second left terminal portion 260a is electrically connected to fourth upper terminal portion 341a. Second right terminal portion 260b is electrically connected to fourth lower terminal portion 341b. Second intermediate terminal portion 260c is electrically connected to fourth intermediate terminal portion 341c.

Figure 40:
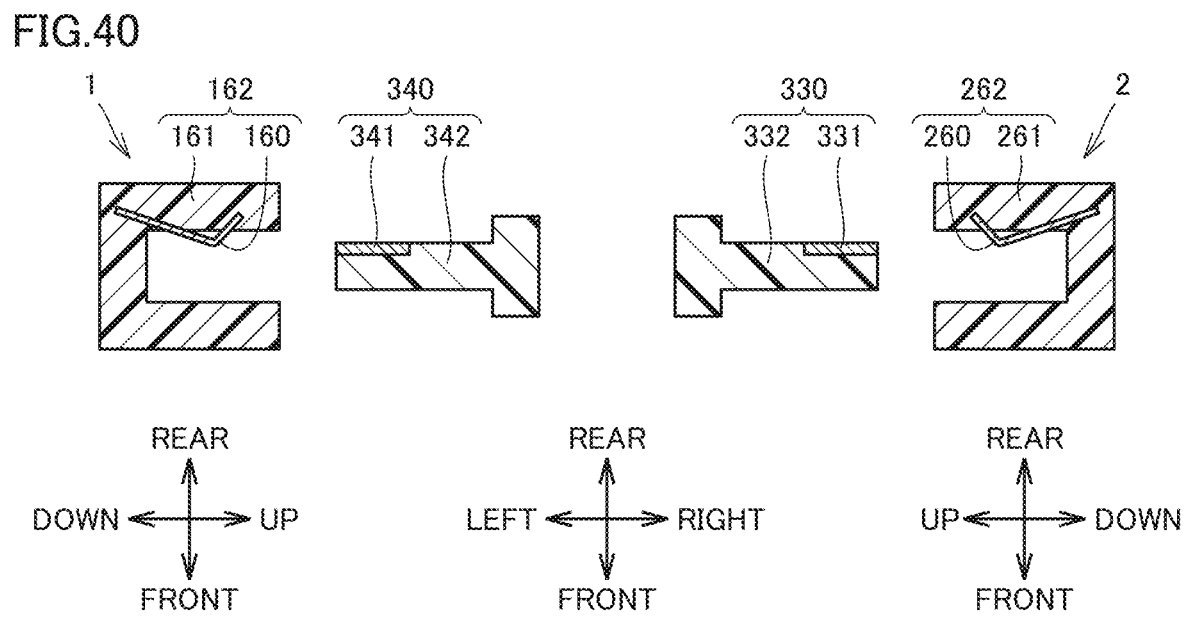
Figure 41:
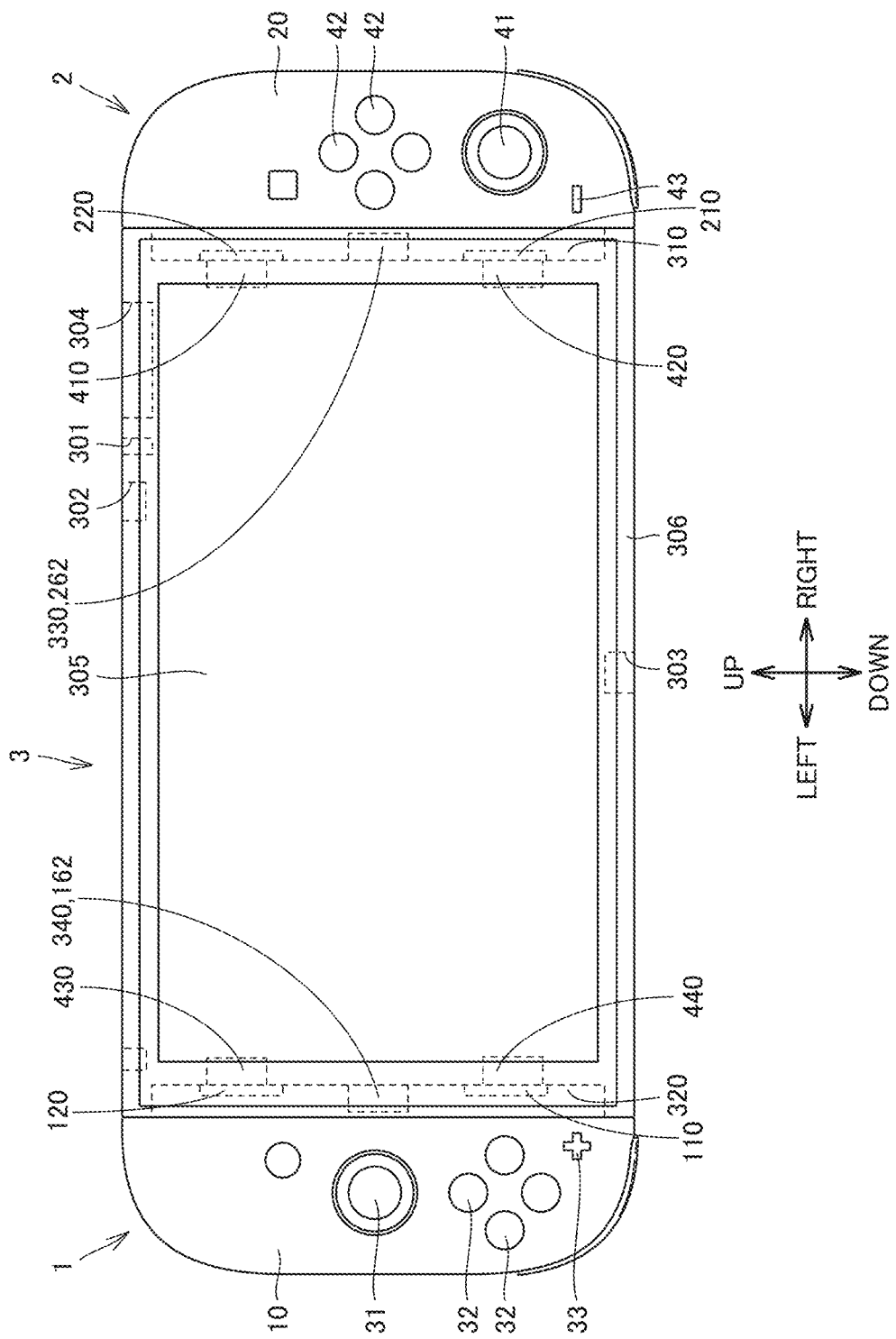
FIG. 41 shows an exemplary illustrative non-limiting drawing of a schematic front view showing the configuration of the information processing apparatus in a second connected state.

FIG. 40 is a schematic conceptual diagram showing a second example of a state of connection of a terminal. FIG. 41 is a schematic front view showing the configuration of information processing apparatus 1000 in a second connected state.

In the second connected state, first game controller 1 is attached to the left side of main body apparatus 3. The right side of first game controller 1 is the same in orientation as the lower side of main body apparatus 3. The front surface side of first game controller 1 is the same in orientation as the front surface side of main body apparatus 3. Second game controller 2 is attached to the right side of main body apparatus 3. The left side of second game controller 2 is the same in orientation as the lower side of main body apparatus 3. The front surface side of second game controller 2 is the same in orientation as the front surface side of main body apparatus 3.

Figure 42:
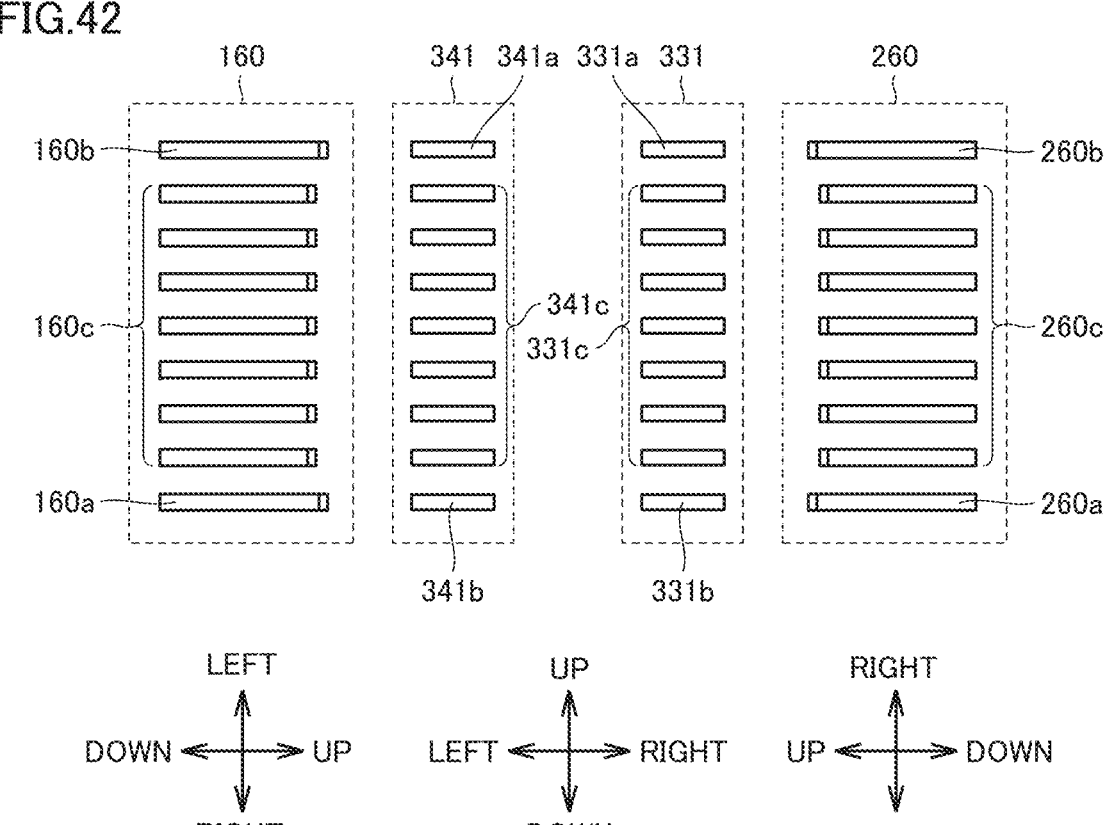
FIG. 42 shows an exemplary illustrative non-limiting drawing of a schematic conceptual diagram showing terminal arrangement in the second connected state.

FIG. 42 is a schematic conceptual diagram showing terminal sequence in the second connected state. In the second connected state, the second-game-controller terminal group is connected to the main body first terminal group. Second left terminal portion 260a is electrically connected to third lower terminal portion 331b. Second right terminal portion 260b is electrically connected to third upper terminal portion 331a. Second intermediate terminal portion 260c is electrically connected to third intermediate terminal portion 331c.

In the second connected state, the first-game-controller terminal group is connected to second main body terminal group 341. First right terminal portion 160a is electrically connected to fourth lower terminal portion 341b. First left terminal portion 160b is electrically connected to fourth upper terminal portion 341a. Second intermediate terminal portion 260c is electrically connected to fourth intermediate terminal portion 341c.

According to a controller set in the present embodiment, each of first terminal 160 and second terminal 260 is provided on the rear surface side of the inner wall surface. Main body first terminal 331 and main body second terminal 341 of main body apparatus 3, on the other hand, are each provided on the rear surface of the tongue-shaped body. Therefore, even when first game controller 1 and second game controller 2 are attached to main body apparatus 3 on reverse sides in the left-right direction while they are inverted in the upward-downward direction, the game controller can electrically be connected to main body apparatus 3. For example, if main body apparatus 3 is provided with the audio input and output terminal only in the upper side surface, the user can attach the game controller such that the audio input and output terminal faces either up or down. Therefore, for example, the user can insert the headphone into the audio input and output terminal in a direction the user prefers. Depending on a direction of attachment of the game controller, an upper side and a lower side of an image shown on display 305 of main body apparatus 3 may be switched. In other words, an image may be outputted such that the upper side in the integrally held state coincides with the upper side of the image shown on display 305. Though alignment of first terminal 160 is reverse to alignment of second terminal 260 in the left-right direction in the present embodiment, the terminal may be aligned in another manner.

The game controller may be attachable to recess 310 at each of side surfaces such that the front surface of the game controller faces the rear surface side of the main body apparatus. According to arrangement of terminals in the present embodiment, however, terminals are not connected to each other at this time.

<Another Manner of Removal>

Figure 43:
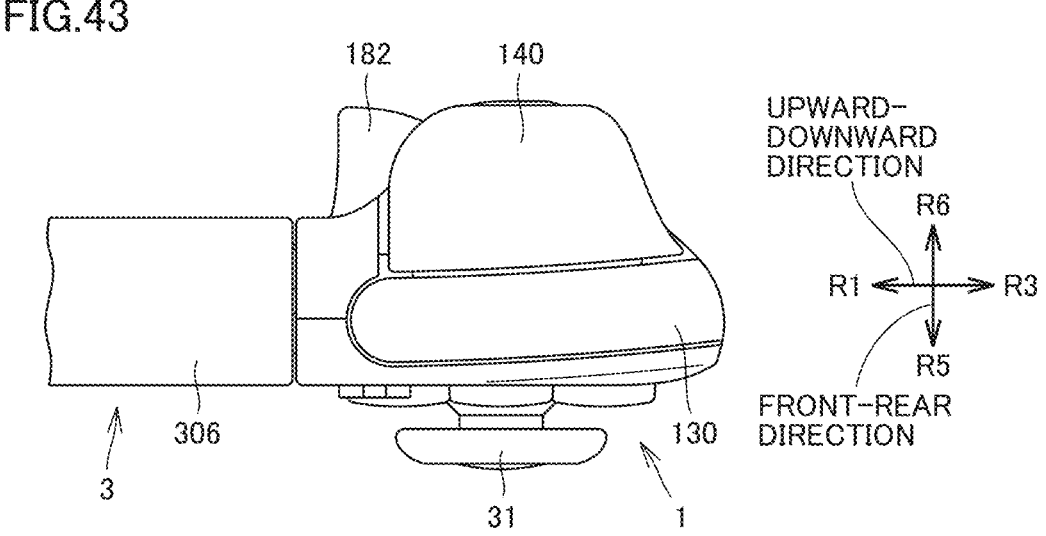
FIG. 43 shows an exemplary illustrative non-limiting drawing of a schematic top view of the main body apparatus showing a state before removal of the first game controller from the main body apparatus.
Figure 44:
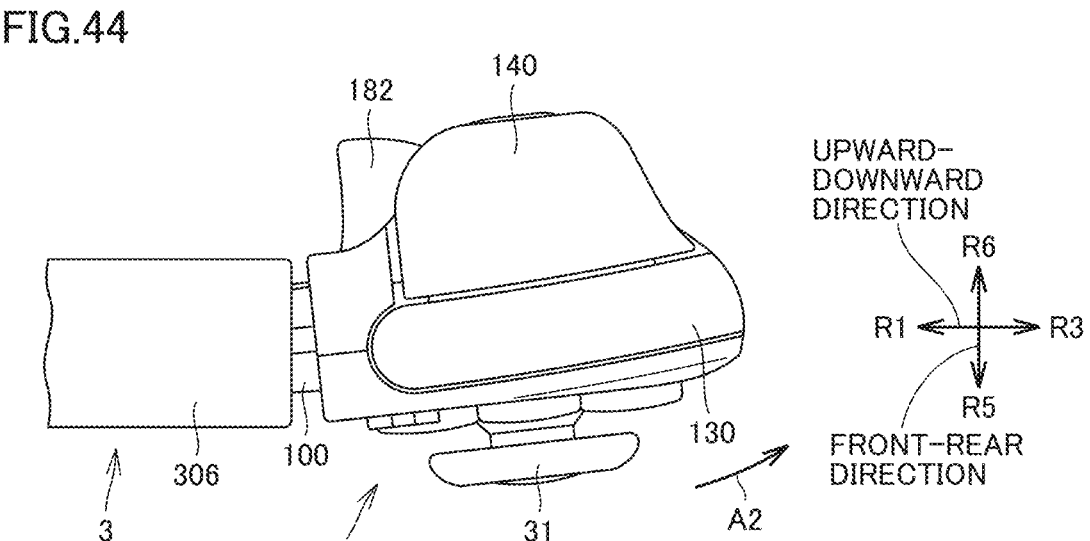
FIG. 44 shows an exemplary illustrative non-limiting drawing of a schematic top view of the main body apparatus showing a second state in the middle of removal of the first game controller from the main body apparatus.

FIG. 43 is a schematic top view of the main body apparatus showing a state before removal of first game controller 1 from main body apparatus 3. FIG. 44 is a schematic top view of the main body apparatus showing a second state in the middle of removal of first game controller 1 from main body apparatus 3.

As shown in FIG. 33, in the present embodiment, the user operates operation portion 182 to readily remove first game controller 1 from main body apparatus 3. In another manner, the game controller does not have to include the removal mechanism. In that case as well, first game controller 1 may be configured as being removable. For example, with the end in the longitudinal direction of first projection 100 as shown in FIG. 33 being defined as the fulcrum, first game controller 1 may be rotated by the user himself/herself along a direction shown with a first arrow A1, to thereby remove first game controller 1 from main body apparatus 3. Even in an example where first game controller 1 includes the removal mechanism, first game controller 1 may be removed from main body apparatus 3 without operation portion 182 being operated.

First game controller 1 may be removed by being rotated in a direction different from the above. As shown in FIG. 44, with the rear surface side of projection 100 (for example, the rear surface side of outer peripheral surface 107 or an area in the rear surface side of upper side surface 11) being defined as the fulcrum, first game controller 1 may be rotated along a direction shown with a second arrow A2 to be removed from main body apparatus 3. First game controller 1 may be rotated along the direction shown with second arrow A2 and thereafter pulled away along the left-right direction.

Such a direction of removal is by way of example. The method of removing first game controller 1 according to the present embodiment is not limited to the above. First game controller 1 may be taken out of recess 310 simply by being pulled along the left-right direction without being rotated. The method of removing second game controller 2 is substantially the same as the method of removing first game controller 1.

<Internal Configuration of Information Processing Apparatus>

Figure 45:
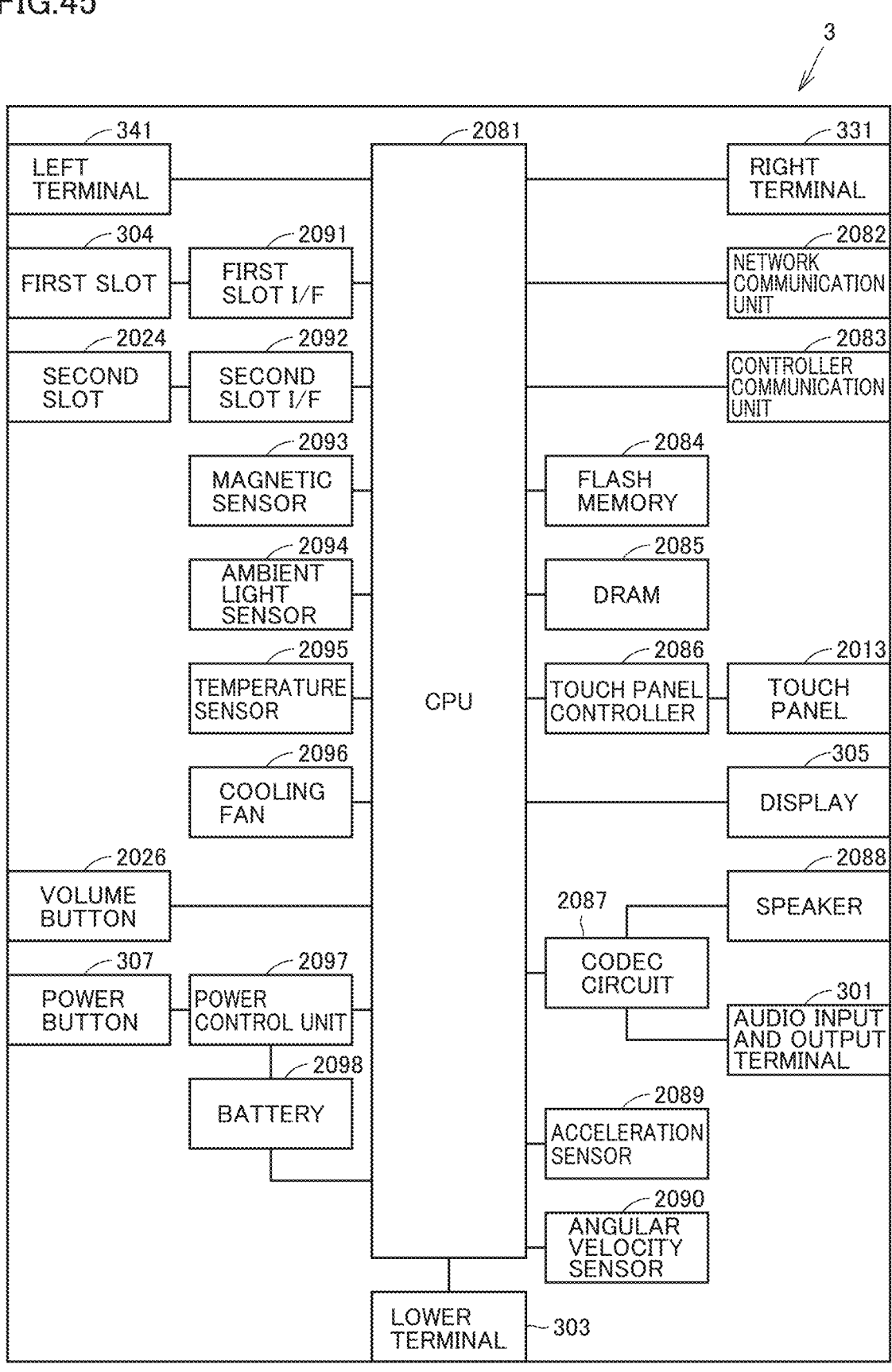
FIG. 45 shows an exemplary illustrative non-limiting drawing of a block diagram showing an exemplary internal configuration of the main body apparatus.

FIG. 45 is a block diagram showing an exemplary internal configuration of main body apparatus 3. Main body apparatus 3 includes constituent elements 2081 to 2098 shown in FIG. 45 by way of example. These constituent elements 2081 to 2098 are accommodated in a housing of main body apparatus 3 as being mounted on an electronic circuit board as electronic components.

Main body apparatus 3 includes a central processing unit (CPU) 2081. CPU 2081 is an information processing unit that performs various types of information processing performed in main body apparatus 3. CPU 2081 performs various types of information processing by executing an information processing program stored in a storage accessed thereby (specifically, an internal storage medium such as a flash memory 2084 or an external storage medium attached to a first slot 304 and a second slot 2024).

Main body apparatus 3 includes flash memory 2084 and a dynamic random access memory (DRAM) 2085 as an exemplary internal storage medium contained therein.

Main body apparatus 3 includes a plurality of slots. A storage medium is attached to each slot. CPU 2081 performs information processing by reading and writing data from and into flash memory 2084 and DRAM 2085 as well as each storage medium as appropriate.

Main body apparatus 3 includes a network communication unit 2082. Network communication unit 2082 is connected to CPU 2081. Network communication unit 2082 communicates (specifically, wirelessly communicates) with an external apparatus over a network. In the present embodiment, network communication unit 2082 is, for example, a communication module that has been Wi-Fi™ certified, and it may perform a function to communicate by being connected to a mobile communication network (in other words, a cellular communication network) in addition to (or instead of) a function to communicate with an external apparatus over wireless LAN. In other words, the communication module may include a wireless chip.

Main body apparatus 3 includes a controller communication unit 2083. Controller communication unit 2083 is connected to CPU 2081. Controller communication unit 2083 wirelessly communicates with a first controller 1 and/or a second controller 2. Main body apparatus 3 and each controller may communicate in any communication method, and in the present embodiment, controller communication unit 2083 communicates with each controller under the Bluetooth® standards.

CPU 2081 is connected to a left terminal 341, a right terminal 331, and lower terminal 303. When CPU 2081 communicates with second controller 2 through a wire, it transmits and receives data to and from second controller 2 through left terminal 341. When CPU 2081 communicates with first controller 1 through a wire, it transmits and receives data to and from first controller 1 through right terminal 331. When CPU 2081 communicates with cradle 5, it transmits and receives data to and from cradle 5 through lower terminal 303.

Thus, in the present embodiment, main body apparatus 3 can establish both of wired communication and wireless communication with each of first controller 1 and second controller 2.

(Configuration Associated with Input and Output to and from Main Body Apparatus)

Display 305 is connected to CPU 2081. CPU 2081 has an image shown on display 305, the image being an image generated (for example, by information processing above) and/or an image obtained from the outside.

Main body apparatus 3 includes a power control unit 2097 and a battery 2098. Power control unit 2097 is connected to battery 2098 and CPU 2081. Though not shown, power control unit 2097 is connected to each part of main body apparatus 3 (specifically, each part fed with electric power from battery 2098, left terminal 341, and right terminal 331). Power control unit 2097 controls supply of electric power from battery 2098 to each part based on a command from CPU 2081.

Figure 46:
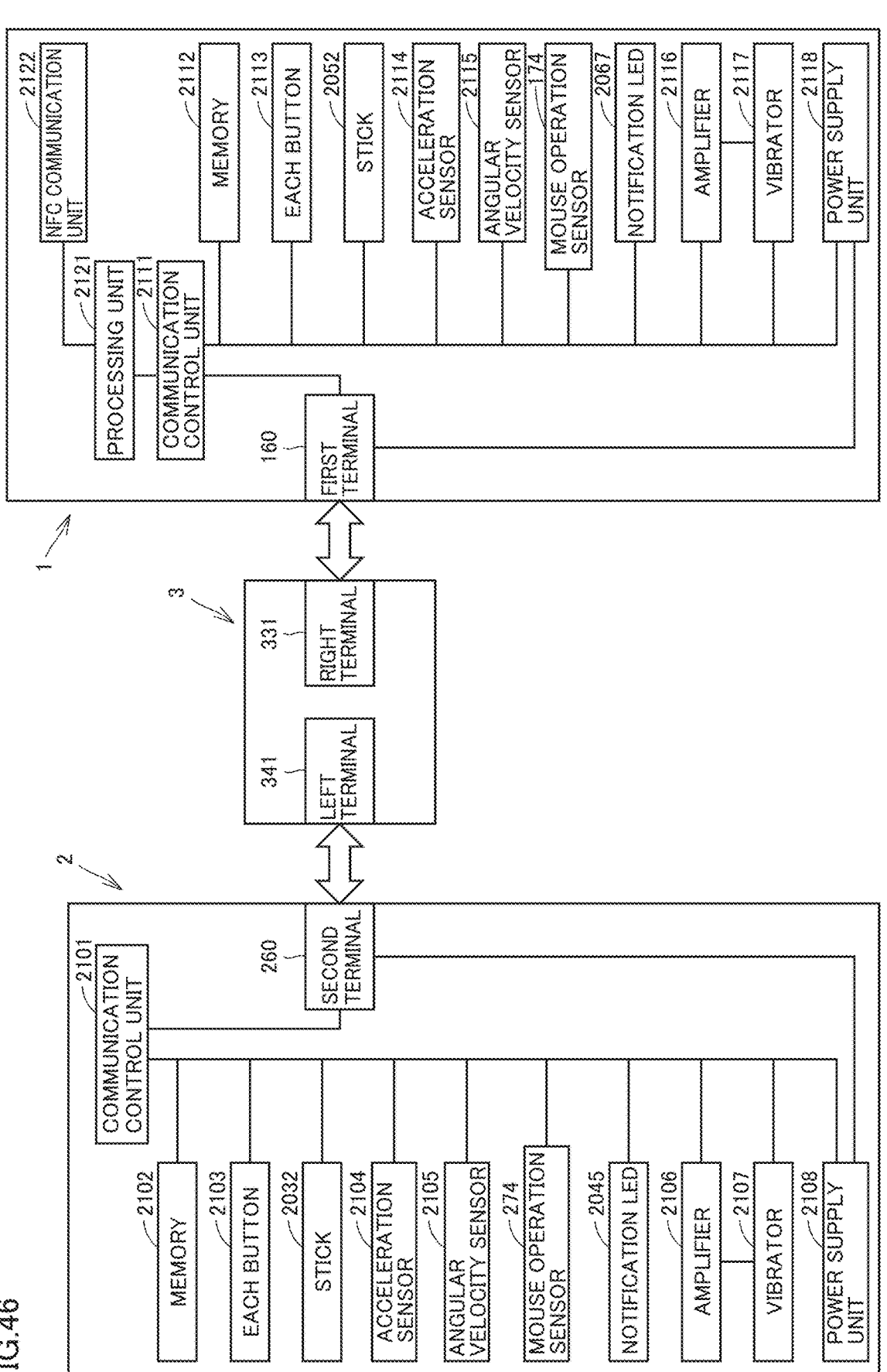
FIG. 46 shows an exemplary illustrative non-limiting drawing of a block diagram showing an exemplary internal configuration of the information processing apparatus.

FIG. 46 is a block diagram showing an exemplary internal configuration of information processing apparatus 1000. Since FIG. 45 shows the detailed internal configuration of information processing apparatus 1000 associated with main body apparatus 3, FIG. 46 does not show the same.

Second controller 2 includes a communication control unit 2101 that communicates with main body apparatus 3. As shown in FIG. 46, communication control unit 2101 is connected to each constituent element including second terminal 260 described above. In the present embodiment, communication control unit 2101 can communicate with main body apparatus 3 by both of wired communication via second terminal 260 and wireless communication not via second terminal 260. In other words, communication control unit 2101 may include a wireless chip. Communication control unit 2101 controls a method of communication with main body apparatus 3 by second controller 2. In other words, while second controller 2 is attached to main body apparatus 3, communication control unit 2101 communicates with main body apparatus 3 via second terminal 260. While second controller 2 is not attached to main body apparatus 3, communication control unit 2101 wirelessly communicates with main body apparatus 3 (specifically, controller communication unit 2083). Controller communication unit 2083 and communication control unit 2101 wirelessly communicate with each other under the Bluetooth® standards.

Second controller 2 includes a memory 2102 such as a flash memory. Communication control unit 2101 is implemented, for example, by a microcomputer (which is also called a microprocessor) and performs various types of processing by executing firmware stored in memory 2102. In other words, communication control unit 2101 performs a function as an information processing unit.

Each button 2103 or a joystick 2032 outputs information on an operation of the same to communication control unit 2101 repeatedly at appropriate timing. Second controller 2 may also include other various sensors such as mouse operation sensor 274. Information from various sensors is outputted to communication control unit 2101 and transmitted to main body apparatus 3.

Communication control unit 2101 may transmit a command to various sensors. For example, a communication LED 2045 arranged in a second light emission portion 250 is controlled by a command from main body apparatus 3.

Second controller 2 includes a power supply unit 2108. In the present embodiment, power supply unit 2108 includes a battery and a power control circuit. Though not shown, the power control circuit is connected to the battery and to each part of second controller 2 (specifically, each part fed with electric power from the battery). The power control circuit controls supply of electric power from the battery to each part.

The battery is connected to second terminal 260. In the present embodiment, while second controller 2 is attached to main body apparatus 3, the battery is charged by power feed from main body apparatus 3 through second terminal 260 under a prescribed condition.

First controller 1 is similar in configuration to second controller 2 and hence description thereof will not be provided. First controller 1 may include an NFC communication unit 2122. Second controller 2 does not have to include NFC communication unit 2122. NFC communication unit 2122 establishes short-range wireless communication based on the near field communication (NFC) standards. First controller 1 may include a processing unit 2121 that performs processing for management of NFC communication unit 2122 in response to a command from main body apparatus 3.

[Second Manner]

Other manners are shown below. When only one controller is exemplified, the other controller may also be similar in configuration. When a manner in which only one controller is attached to an apparatus is exemplified, the other controller may also be attached.

Figure 47:
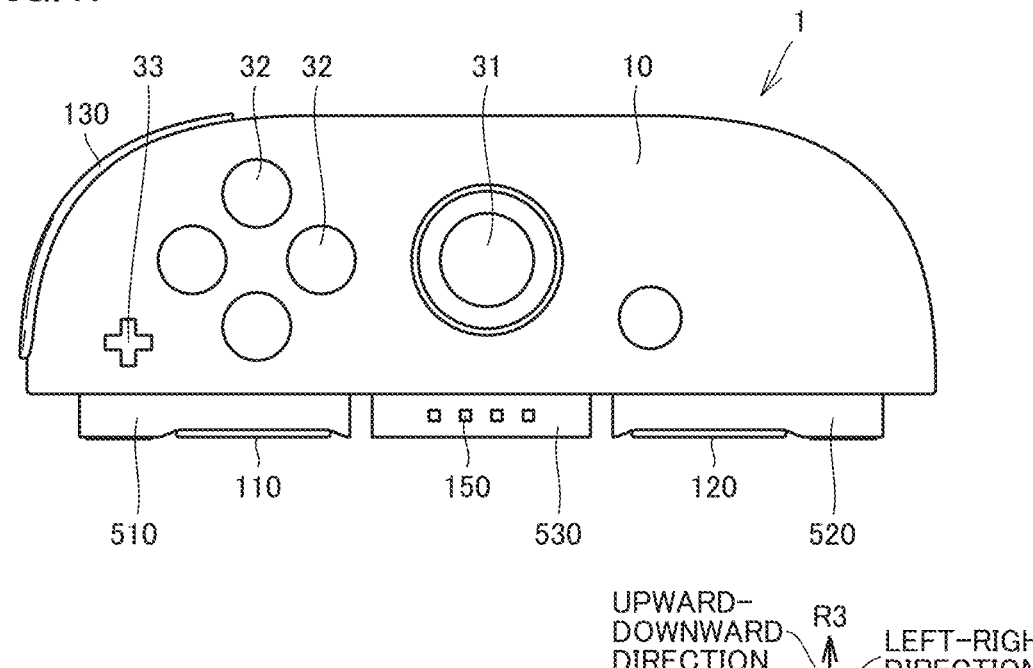
FIG. 47 shows an exemplary illustrative non-limiting drawing of a schematic front view showing a configuration in a second manner of the game controller.

FIG. 47 is a schematic front view showing a configuration in a second manner of game controller 1. The configuration of game controller 1 according to the present embodiment is different from that in the first manner mainly in that the projection is divided into a plurality of portions. At least two projections as a whole, of the plurality of projections are configured to be matched with a recess. Features different from those in the first manner will mainly be described below.

As shown in FIG. 47, the plurality of projections of game controller 1 are divided into a plurality of projection portions in the left-right direction. As shown in FIG. 47, game controller 1 includes a right projection 510, a left projection 520, and a central projection 530. The projections are separate from one another. In the left-right direction, central projection 530 is located between right projection 510 and left projection 520. From another point of view, right projection 510, left projection 520, and central projection 530 are arranged along the longitudinal direction of upper side surface 11. At least right projection 510 and left projection 520 are arranged along the longitudinal direction of upper side surface 11.

Right projection 510 is provided with upper-surface button (right) 110. Upper-surface button (right) 110 includes a magnet or a soft magnetic material. Upper-surface button (right) 110 may be arranged on a top surface of right projection 510. Upper-surface button (right) 110 may be arranged as being exposed through an opening provided on the top surface of right projection 510.

Left projection 520 is provided with upper-surface button (left) 120. Upper-surface button (left) 120 includes a magnet or a soft magnetic material. Upper-surface button (left) 120 may be arranged on a top surface of left projection 520. Upper-surface button (left) 120 may be arranged as being exposed through an opening provided on the top surface of left projection 520.

Central projection 530 is provided with first terminal 160. Central projection 530 may be provided with mouse operation sensor 174 and synchronization button 50. Light emission portion 150 may be provided on an outer peripheral surface of central projection 530.

At least right projection 510 and left projection 520 as a whole are configured to be matched with recess 310 provided of main body apparatus 3. From another point of view, right projection 510 and left projection 520 are configured to be matched with recess 310 in an area of longitudinally extending recess 310 including at least longitudinal ends. Central projection 530 may also be configured to be matched with recess 310 provided of main body apparatus 3. In other words, right projection 510, central projection 530, and left projection 520 as a whole may be configured to be matched with recess 310 provided of main body apparatus 3.

Central projection 530 may be lower in height from upper side surface 11 than right projection 510 and left projection 520. Central projection 530 may be smaller in width in the front-rear direction than right projection 510 and left projection 520. From another point of view, central projection 530 may be smaller than right projection 510 and left projection 520. Right projection 510 and left projection 520 including at least the upper-surface buttons each including a magnet or a soft magnetic material and located on an outer side in the longitudinal direction of upper side surface 11 are matched with the recess as sufficiently projecting from upper side surface 11, so that game controller 1 can securely be attached to main body apparatus 3.

The number of projections is not limited to three. For example, game controller 1 may include two projections of right projection 510 and left projection 520, without including central projection 530. At least four projections may be provided. In which projection each component is arranged is not particularly limited either. The height from upper side surface 11 of the projections located on opposing sides in the longitudinal direction of the upper side surface may be higher than a height of other projections from upper side surface 11. Projections including buttons each including a magnet or a soft magnetic material may be provided on such a manner that a projection provided with first terminal 160 lies between projections in the longitudinal direction of upper side surface 11. First terminal 160 does not have to be provided. The button does not have to include the magnet or the soft magnetic material, and the projection may be provided only with a button not including the magnet and the soft magnetic material or only with a magnet or a soft magnetic material.

In another manner, outer geometries of upper-surface buttons 110 and 120 themselves may form parts of respective projections 510 and 530. In other words, upper-surface buttons 110 and 120 may be configured such that projections 510 and 530 themselves sink into the inside of controller housing 10 when the user presses upper-surface buttons 110 and 120 in the direction of pressing-down. Third projection 530 does not have to be configured to sink into the inside of controller housing 10.

[Third Manner]

A configuration in a third manner of game controller 1 will now be described. The configuration of the controller according to the present embodiment is different from the first manner mainly in that the upper-surface button does not include a magnet and a soft magnetic material. Features different from those in the first manner will mainly be described below.

Figure 48:
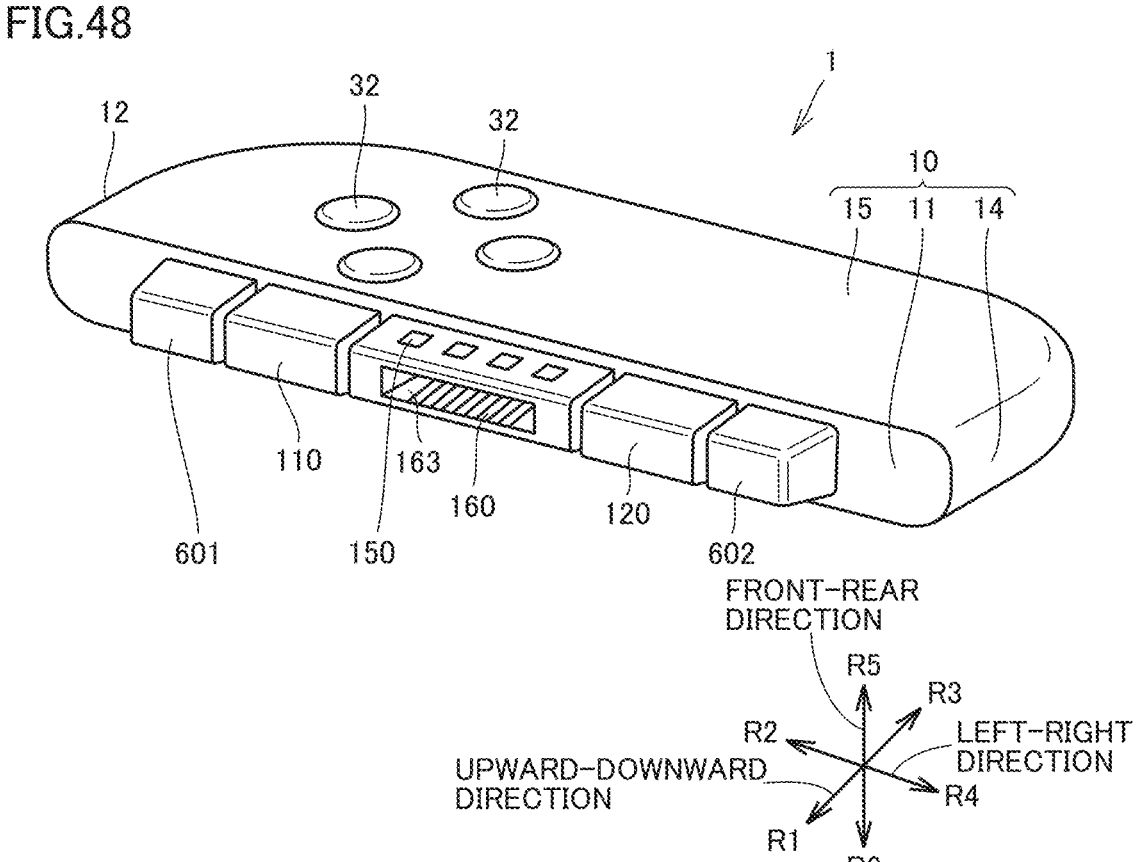
FIG. 48 shows an exemplary illustrative non-limiting drawing of a schematic perspective view showing a configuration in a third manner of the game controller.

FIG. 48 is a schematic perspective view showing the configuration in the third manner of game controller 1. Upper-surface buttons 110 and 120 are comprised of a non-magnetic material. Upper-surface buttons 110 and 120 include neither a magnet nor a soft magnetic material. Upper-surface buttons 110 and 120 are made, for example, of resin. Upper-surface buttons 110 and 120 are provided on upper side surface 11 of controller housing 10. Upper-surface buttons 110 and 120 are exposed through an opening provided on upper side surface 11. Upper-surface buttons 110 and 120 may be placed on upper side surface 11.

A first attraction portion 601 and a second attraction portion 602 are provided on upper side surface 11. First attraction portion 601 and second attraction portion 602 are not buttons. Attraction portions 601 and 602 include a soft magnetic material. First attraction portion 601 and second attraction portion 602 are comprised, for example, of iron. Attraction portions 601 and 602 may include a non-magnetic portion. Attraction portions 601 and 602 may include a magnet. Attraction portions 601 and 602 project from upper side surface 11. Attraction portions 601 and 602 may or may not move in the upward-downward direction. In the longitudinal direction of upper side surface 11, attraction portions 601 and 602 are arranged as being aligned with upper-surface buttons 110 and 120. Attraction portion 601 may be located on a side of a longitudinal end of upper side surface 11. From another point of view, in the left-right direction, upper-surface buttons 110 and 120 may be arranged between attraction portions 601 and 602. In the left-right direction, a projection including first terminal 160 may be provided between upper-surface buttons 110 and 120. Upper-surface buttons 110 and 120 may be pressed down so as to move in a direction of upper side surface 11, with respect to attraction portions 601 and 602 and the projection.

In the present embodiment, at least attraction portions 601 and 602 are attracted to magnetic elements 410 and 420 of main body apparatus 3, so that first game controller 1 is attached to main body apparatus 3. Attraction portions 601 and 602, upper-surface buttons 110 and 120, and first terminal 160 as a whole may be configured in a projecting shape and being matched with recess 310 as a whole. Attraction portions 601 and 602, upper-surface buttons 110 and 120, and first terminal 160 may partially be in a shape compatible with recess 310.

Attraction portions 601 and 602 may be provided on a projection provided on upper side surface 11 and upper-surface buttons 110 and 120 may be provided at positions on upper side surface 11 where they are not matched with recess 310. For example, upper-surface buttons 110 and 120 may be provided at the rear of the projection. Upper-surface buttons 110 and 120 may be provided at positions superimposed on the projection in the left-right direction at the rear of the projection or positions on the outer side of the projection in the left-right direction. Alternatively, upper-surface buttons 110 and 120 may be provided at positions on the outer side of the projection in the left-right direction and superimposed on the projection in the front-rear direction. Alternatively, upper-surface buttons 110 and 120 may be provided at positions projecting upward on upper side surface 11. Alternatively, upper-surface buttons 110 and 120 may be provided on a raised portion that projects rearward on the rear surface.

Modification

Main body apparatus 3 may be able to perform also processing other than game processing. In another manner, main body apparatus 3 may be able to perform only processing other than game processing. In another manner, main body apparatus 3 does not have to include a recess. By way of example, an apparatus where an electronic device including a display such as a game device, a smartphone, or a tablet can be fixed may include a recess, and a projection of the game controller may be attachable to such a recess of the apparatus. By way of example, the apparatus may be an accommodation body where an electronic device is accommodated with the display being exposed. By way of example, the apparatus may be provided with recesses between which a fixed electronic device lies. The apparatus may be or may not be electrically connected to the fixed electronic device.

Though main body apparatus 3 is generally in a shape of a parallelepiped in the first manner, the shape thereof is not limited as such. For example, side surfaces opposite to each other may be inclined with respect to the front surface. From another point of view, when viewed from the front, the main body apparatus may be in a shape other than a quadrangular shape such as a trapezoidal shape. In another manner, main body apparatus 3 may be foldable. For example, main body apparatus 3 may include a display and a keyboard and may be configured such that the display and the keyboard face each other by being folded. A recess may be provided at each of side surfaces between which the display lies or side surfaces between which the keyboard lies.

Though first game controller 1 does not include a magnet for attraction to magnetic elements 410 and 420 of main body apparatus 3 in the first manner, it may include the magnet.

The game controller may include an additional magnetic element other than the upper-surface button comprised of a soft magnetic material. For example, the additional magnetic element may be a magnet. The additional magnetic element may be provided on the top surface of the projection, on the outer peripheral surface of the projection, or in the game controller. Such an additional magnetic element on a side of the game controller may be attracted, together with the upper-surface button, by magnetic force to the magnetic element provided at the bottom of the recess in the main body apparatus. An additional magnetic element may also be provided on the side of the main body apparatus at the bottom of recess 310, and an additional magnetic element on the side of the game controller may be attracted to the additional magnetic element on the side of the main body apparatus.

The upper-surface button (right) and the upper-surface button (left) do not have to be arranged in symmetry.

The shape of the game controller is not limited to the disclosed shape. For example, the game controller may include a raised portion for gripping. For example, the game controller may have a semi-circular front surface.

The game controller may include a portion expanding toward the upper side surface and not matched with the recess of main body apparatus 3. When the game controller is used as the mouse, such an expanding portion may come in contact with the grounding surface in addition to or instead of the projection. Increase in area of contact with the grounding surface or increase in number of locations of contact improves stability in an operation as the mouse.

The upper-surface button does not have to be movable in the direction opposite to the direction of pressing-down. At this time, the game controller does not have to include in the projection, the elastically deformable body compressed by movement of the upper-surface button in the direction opposite to the direction of pressing-down.

The height from the upper side surface, of the top surface of the upper-surface button at the initial position may be equal to or higher than the highest height from the upper side surface, of the top surface of the projection.

The top surface of the projection may be flat. The mouse skate may be placed on the flat top surface of the projection.

The game controller does not have to include the removal mechanism. The game controller may include a mechanism different from the disclosed removal mechanism. For example, the game controller may include such a mechanism that a pusher automatically projects by an operation on a specific input portion. Alternatively, a pusher may automatically project from the recess in accordance with an instruction from the game controller or main body apparatus 3. Alternatively, the removal mechanism may be implemented by a mechanical mechanism different from the pusher or by an electrical mechanism.

The game controller does not have to include an engagement hole. The game controller may include other mechanical holding means instead of the engagement hole. For example, the game controller may include a pushing member that projects toward the outer peripheral surface of the projection and is pushed against the inner peripheral surface of the recess.

The elastically deformable body provided on the outer peripheral surface of the projection of the game controller may be provided from the side of the upper side surface to the top surface of the projection. Alternatively, the elastically deformable body may be provided only on the side of the top surface of the projection. Alternatively, the game controller does not have to include the elastically deformable body on the outer peripheral surface of the projection.

The game controller does not have to perform an operation as the mouse. In other words, the game controller does not have to include the mouse operation sensor. At this time, the game controller does not have to include the mouse skate. Even in such a case, the game controller may include some kind of a buffer material (which may be made of a material the same as that for a general mouse skate) on the top surface of the projection, instead of the mouse skate. By providing such a buffer material, stress produced between the top surface of the projection and the bottom surface of the recess at the time when the game controller is attracted to the main body apparatus by magnetic force can be relaxed.

The mouse sensor opening may be provided on the rear surface of the game controller. Specifically, the user may place the game controller on the grounding surface for performing a mouse operation such that the rear surface is opposed to the grounding surface. The mouse operation sensor may be accommodated in the controller housing.

The Z shoulder button may be provided on a central portion of the rear surface, that is, closer to the center than the right end and the left end of the rear surface. At this time, a wall portion for arrangement of the Z shoulder button may project from the central portion of the rear surface in the rear direction.

Terminals of the game controller and the main body apparatus may be in another shape such as a pin shape. Terminals in the pin shape may electrically be connected to each other by coming in contact such that tip ends thereof are opposed to each other. The terminal of the game controller may be exposed from the top surface of the projection. The terminal of the main body apparatus may substantially be flush with the bottom surface of the recess.

The light emission portion may allow emission of light that forms an image such as moving images or still images, without being limited to simple light.

The game controller and main body apparatus 3 according to the present disclosure can also be regarded as a game system. Specifically, the game system is constituted of a game device configured to perform game processing, a first game controller, and a second game controller, the game device including a recess in each of a right side surface and a left side surface and two magnets at the bottom of each recess, the first game controller including a first input portion provided on a front surface, a projection projecting from a first side surface that extends along a longitudinal direction of the front surface and configured to be matched with the recess at the right side surface of the game device, and two buttons provided on a top surface of the projection and being to be pressed down by a user, each of the buttons being to be attracted by magnetic force to at least one of magnets provided in the recess at the right side surface, the second game controller including a first input portion provided in a front surface, a projection projecting from a first side surface that extends along the longitudinal direction of the front surface and configured to be matched with the recess at the left side surface of the game device, and two buttons provided on the top surface of the projection and being to be pressed down by the user, each of the buttons being to be attracted by magnetic force to at least one of magnets provided in the recess at the left side surface.

In another manner, the game controller does not have to include the projection. At this time, the game controller may include a different mechanism for attachment to main body apparatus 3. Alternatively, the game controller may include at least one or all of an upper-surface button, a terminal, a mouse sensor opening, a mouse skate, and an opening through which a pusher projects, on the upper side surface or on the different mechanism. Alternatively, the game controller may include a mechanism that suppresses position displacement from main body apparatus 3.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A game controller removably attachable to a main body apparatus including a recess, first and second magnets proximal the recess, and a side terminal at least partially within the recess, the main body apparatus being configured to perform game processing, the game controller comprising:

a first user-operable input portion at a front side surface of the game controller, a projection that projects from a first side surface that is transverse to the front side, the projection being elongated along a longitudinal direction of the first side surface, at least part of the projection being insertable into the recess, a first button and a second button positioned along an insertion surface of the projection, the insertion surface being spaced from the first side surface, the first button being configured to be magnetically attracted to the first magnet, the second button being configured to be magnetically attracted to the second magnet, a controller terminal configured to be electrically connected to the side terminal through an opening of a terminal cavity, the terminal cavity opening being located between the first button and the second button, the controller terminal being in the terminal cavity, and, a mouse sensor positioned in a mouse sensor cavity, the mouse sensor cavity having a mouse sensor cavity opening located between the first button and the second button.

2. The game controller according to claim 1, wherein the terminal cavity opening is located in the center of the insertion surface in a longitudinal direction of the insertion surface.

3. The game controller according to claim 1, further comprising:

a third button at a second side surface of the game controller and proximal a first end of the first side surface in the longitudinal direction of the first side surface, the second side surface being between a front side and a rear side of the game controller, wherein the mouse sensor cavity opening is between the first end of the first side surface and the terminal cavity opening.

4. The game controller according to claim 1, further comprising:

a fourth button located at the insertion surface, the terminal cavity being between the mouse sensor cavity and the fourth button, wherein the fourth button and the mouse sensor cavity are located between the first button and the second button.

5. The game controller according to claim 1, wherein the controller terminal is along an inner surface of the terminal cavity.

6. The game controller according to claim 5, wherein the controller terminal is only along a rear side of the inner surface of the terminal cavity.

7. The game controller according to claim 6, further comprising one or more lights configured to illuminate at a front side of an outer peripheral surface of the projection.

8. The game controller according to claim 1, further comprising one or more lights configured to illuminate at a front side of an outer peripheral surface of the projection.

9. The game controller according to claim 1, further comprising:

an ejection button; and a pusher movable through a pusher opening in accordance with a user operation of the ejection button, the pusher opening being located at the insertion surface.

10. The game controller according to claim 9, wherein the pusher, when actuated while the game controller is attached to the main body apparatus, is configured to cause the game controller to separate from the main body apparatus proximal the pusher while pivoting at a portion of the game controller distal the pusher in the longitudinal direction of the first side surface.

11. The game controller according to claim 10, wherein when the pusher is actuated while the game controller is attached to the main body apparatus, both ends of the insertion surface in the longitudinal direction of the first side surface are configured to remain in the recess.

12. The game controller according to claim 10, further comprising one or more lights configured to illuminate through one or more light holes at a front side of an outer peripheral surface of the projection, wherein the one or more light holes are configured to remain in the recess when the pusher is actuated while the game controller is attached to the main body apparatus.

13. The game controller according to claim 9, wherein the ejection button comprises a lever.

14. The game controller according to claim 9, wherein an operation direction of the ejection button includes a component in a direction opposite a movement direction of the pusher.

15. The game controller according to claim 14, further comprising a raised portion projecting from a rear side of the controller, wherein the ejection button is located on the rear side of the controller and is movable into the raised portion in accordance with user operation of the ejection button.

16. The game controller according to claim 9, wherein either the first button is located between the pusher opening and the terminal cavity opening, or the second button is located between the pusher opening and the terminal cavity opening.

17. The game controller according to claim 16, further comprising a third button at a second side surface of the game controller and proximal a first end of the first side surface in the longitudinal direction of the first side surface, the second side surface being between a front side and a rear side of the game controller, wherein the pusher opening is between the first end, and the first button and the second button.

18. The game controller according to claim 1, further comprising a first engagement hole removably engageable with an apparatus, the first engagement hole being located at one end region of an outer peripheral surface of the projection in a longitudinal direction of the projection.

19. The game controller according to claim 18, further comprising:

a second engagement hole located at another end region of the outer peripheral surface of the projection in the longitudinal direction of the projection, wherein the first engagement hole and the second engagement hole are shaped differently.

20. The game controller according to claim 1, further comprising one or more mouse skates located on the insertion surface.

21. The game controller according to claim 20, wherein the one or more mouse skates comprise a first mouse skate and a second mouse skate, the first mouse skate and the second mouse skate being located on the insertion surface on opposing sides of the terminal cavity opening in the longitudinal direction of the first side surface, and the first mouse skate and the second mouse skate being raised relative to the insertion surface.

22. The game controller according to claim 20, further comprising:
an ejection button; and
a pusher movable through a pusher opening in accordance with a user operation of the ejection button, the pusher opening being located on the insertion surface,
wherein at least one of the one or more mouse skates comprises a through hole aligned with the pusher opening.

23. The game controller according to claim 1, wherein a user-operable surface of each of the first button and the second button has a neutral position, in which the first button and the second button are not operated by a user, the user-operable surface of each of the first button and the second button when in the neutral position being closer to the first side surface than a first region of the insertion surface that is farthest from the first side surface.

24. The game controller according to claim 23, wherein the first button and the second button each are user-depressible in a first direction, and are movable in a second direction opposite to the first direction due to magnetic force, the first button and the second button being movable in the second direction at least as far from the first side surface as the first region of the insertion surface is from the first side surface, or farther than the first region is from the first side surface.

25. The game controller according to claim 1, wherein each of the first button and the second button is not a magnet and includes a magnetically susceptible material.

26. The game controller according to claim 25, wherein each of the first button and the second button contains iron.

27. The game controller according to claim 1, wherein a length between the first side surface and a first region of the projection farthest from the first side surface is longer than a depth of the recess.

28. The game controller according to claim 1, wherein the projection is shaped so that the insertion surface and an outer peripheral surface of the projection are visible when viewed from a side in a projecting direction of the projection.

29. The game controller according to claim 1, wherein
the first button is configured to be magnetically attracted to the first magnet through a cover covering a bottom of the recess, and
the second button is configured to be magnetically attracted to the second magnet through the cover.

30. The game controller according to claim 1, wherein the game controller is reversible with respect to the recess such that the first button is also configured to be magnetically attracted to the second magnet, and the second button is also configured to be magnetically attracted to the first magnet.

* * * * *